(12) United States Patent
Nakayama et al.

(10) Patent No.: US 11,567,499 B2
(45) Date of Patent: Jan. 31, 2023

(54) INFORMATION PROCESSING APPARATUS, INFORMATION PROCESSING METHOD, AND INFORMATION MEDIUM

(71) Applicant: Sony Interactive Entertainment Inc., Tokyo (JP)

(72) Inventors: Tetsunori Nakayama, Tokyo (JP); Akichika Tanaka, Kanagawa (JP); Alexis Andre, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 313 days.

(21) Appl. No.: 16/321,600

(22) PCT Filed: May 18, 2017

(86) PCT No.: PCT/JP2017/018665
§ 371 (c)(1),
(2) Date: Jan. 29, 2019

(87) PCT Pub. No.: WO2018/025467
PCT Pub. Date: Feb. 8, 2018

(65) Prior Publication Data
US 2020/0133279 A1    Apr. 30, 2020

Related U.S. Application Data

(60) Provisional application No. 62/414,102, filed on Oct. 28, 2016, provisional application No. 62/371,078, filed on Aug. 4, 2016.

(51) Int. Cl.
G05D 1/02         (2020.01)
A63H 17/39      (2006.01)
(Continued)

(52) U.S. Cl.
CPC ......... *G05D 1/0214* (2013.01); *G05D 1/0223* (2013.01); *G05D 1/0234* (2013.01);
(Continued)

(58) Field of Classification Search
CPC ... E02F 9/24; G06T 7/77; G06T 7/593; G06T 2207/10012; G06T 2207/30164; G06B 11/24
See application file for complete search history.

(56) References Cited

U.S. PATENT DOCUMENTS 7,828,295 B2    11/2010  Matsumoto
2004/0153211 A1*  8/2004  Kamoto ................. A63H 11/00
                                                                              700/245
(Continued)

FOREIGN PATENT DOCUMENTS

JP    H1071276 A  *  3/1993
JP    10071276 A      3/1998
(Continued)

OTHER PUBLICATIONS

Examination Report for corresponding AU Application No. 2017305737, 4 pages, dated Nov. 11, 2019.
(Continued)

*Primary Examiner* — Maceeh Anwari
*Assistant Examiner* — Aarron E Santos
(74) *Attorney, Agent, or Firm* — Matthew B. Dernier, Esq.

(57) ABSTRACT

An information processing apparatus, an information processing method, and an information medium control motion of a moving body according to position information corresponding to a predetermined array pattern. An information processing apparatus includes an information acquisition unit acquires position information from a sensor configured to read a predetermined array pattern, and a motion control (Continued)

unit controls motion of a first moving body including movement in a real space based on the position information.

14 Claims, 74 Drawing Sheets

(51) Int. Cl.
    *A63H 17/40*     (2006.01)
    *A63H 17/395*     (2006.01)

(52) U.S. Cl.
    CPC ............ *A63H 17/395* (2013.01); *A63H 17/40* (2013.01); *G05D 2201/0214* (2013.01)

(56) References Cited

U.S. PATENT DOCUMENTS

| | | | |
|---|---|---|---|
| 2006/0073761 A1* | 4/2006 | Weiss | A63H 17/00 446/456 |
| 2007/0015588 A1 | 1/2007 | Matsumoto | |
| 2008/0267450 A1 | 10/2008 | Sugimoto | |
| 2010/0304640 A1 | 12/2010 | Sofman | |
| 2011/0105205 A1* | 5/2011 | Devecka | A63F 9/143 463/1 |
| 2011/0300939 A1 | 12/2011 | Mao | |
| 2013/0310956 A1* | 11/2013 | Rehkemper | A63F 9/24 700/83 |
| 2013/0324004 A1 | 12/2013 | Schwartz | |
| 2014/0028744 A1 | 1/2014 | Hashi | |
| 2015/0339508 A1 | 11/2015 | Hosogane | |
| 2015/0364060 A1 | 12/2015 | Gupta | |
| 2016/0124431 A1 | 5/2016 | Kelso | |
| 2016/0144288 A1* | 5/2016 | Liu | A63H 17/26 446/454 |
| 2016/0291688 A1 | 10/2016 | Hirota | |
| 2017/0296913 A1 | 10/2017 | Numaguchi | |

FOREIGN PATENT DOCUMENTS

| | | | | |
|---|---|---|---|---|
| JP | 2003205483 | A | | 7/2003 |
| JP | 2004175209 | A | | 6/2004 |
| JP | 2006068489 | A | | 3/2006 |
| JP | 2007209535 | A | * | 8/2007 |
| JP | 2007209535 | A | | 8/2007 |
| JP | 2010240345 | A | | 10/2010 |
| JP | 2014041602 | A | | 3/2014 |
| JP | 2014136141 | A | | 7/2014 |
| JP | 2016048587 | A | | 4/2016 |
| JP | 2016076167 | A | | 5/2016 |
| KR | 20120036680 | A | | 4/2012 |
| WO | WO-2014127288 | A1 | * | 8/2014 ............ G06F 3/033 |
| WO | 2015098211 | A | | 7/2015 |

OTHER PUBLICATIONS

Official Action for corresponding RU Application No. 2019105156, 10 pages, dated Dec. 16, 2019.
Office Action for corresponding JP Application No. 2018-531747, 8 pages, dated Sep. 3, 2020.
Extended European Search Report for corresponding EP Application No. 17836574.8, 11 pages, dated Feb. 6, 2020.
Notification of Reasons for Refusal or corresponding JP Application No. 2018531747, 16 pages, dated Jan. 7, 2020.
International Search Report for corresponding PCT Application No. PCT/JP2017/018665,4 pages, dated Jun. 27, 2017.
Office Action for corresponding KR Application No. 10-2019-7003588, 17 pages, dated Mar. 25, 2020.
Drone Target Tracking Medium, [online], Aug. 2, 2012, [searched on Mar. 23, 2020], internet: <URL: https://www.youtube.com/watch?v=C95bngCOv9Q> 3 pages, dated Aug. 2, 2012.
Written Opinion for corresponding BR Application No. 1120190015914, 6 pages, dated Jan. 29, 2022.
Office Action for corresponding AU Application No. 2020227094, 5 pages, dated Jan. 27, 2022.
Written Opinion for corresponding BR Application No. 112019001591, 6 pages, dated Jan. 29, 2022.

* cited by examiner

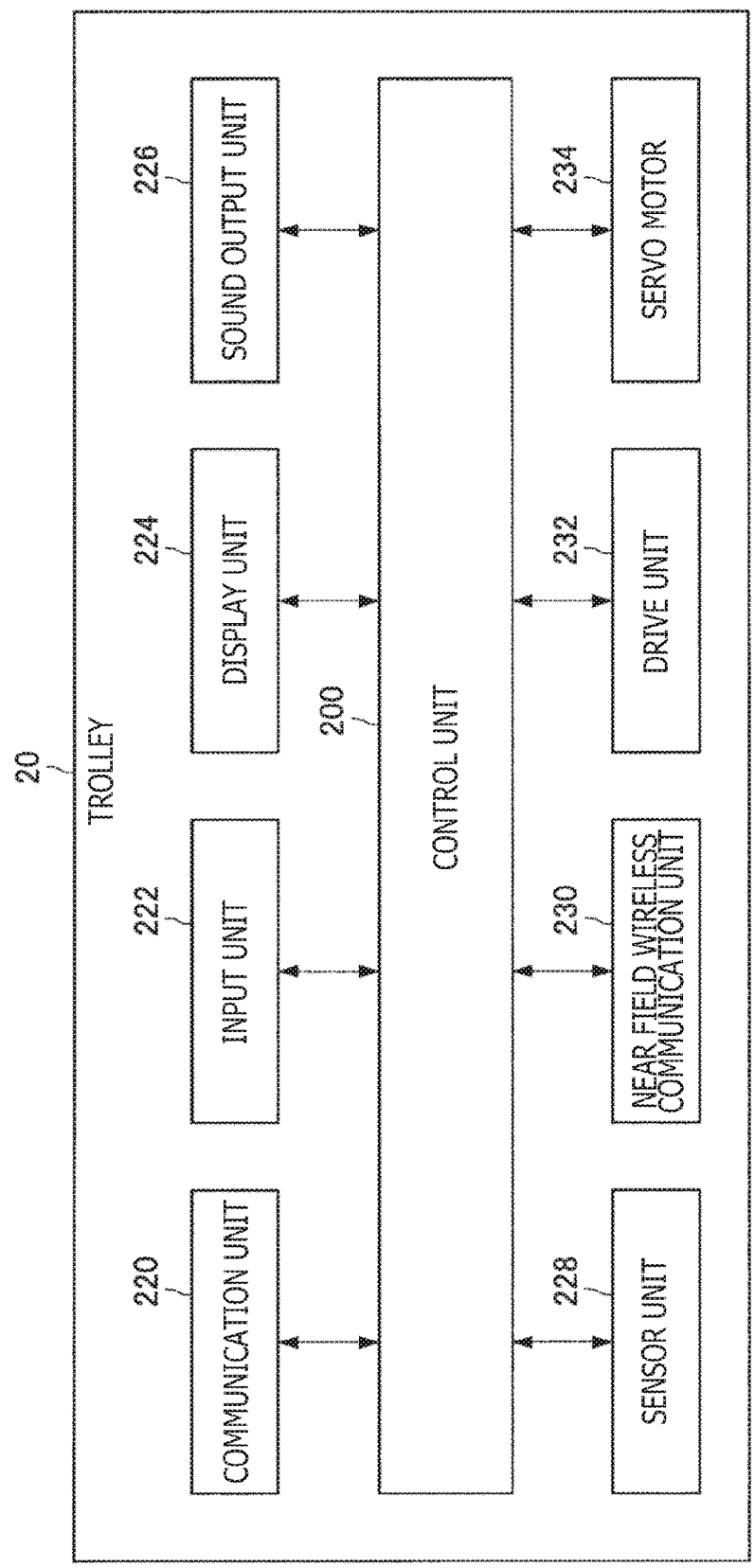
F I G. 7

FIG.48

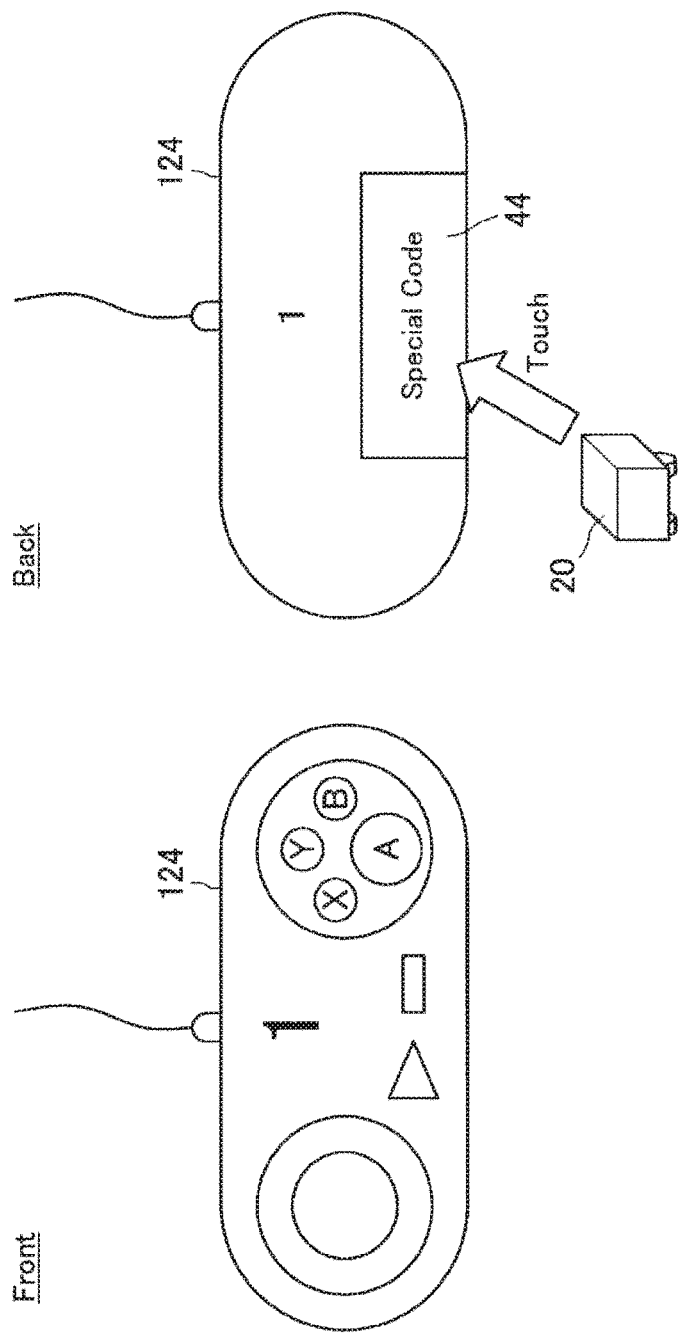

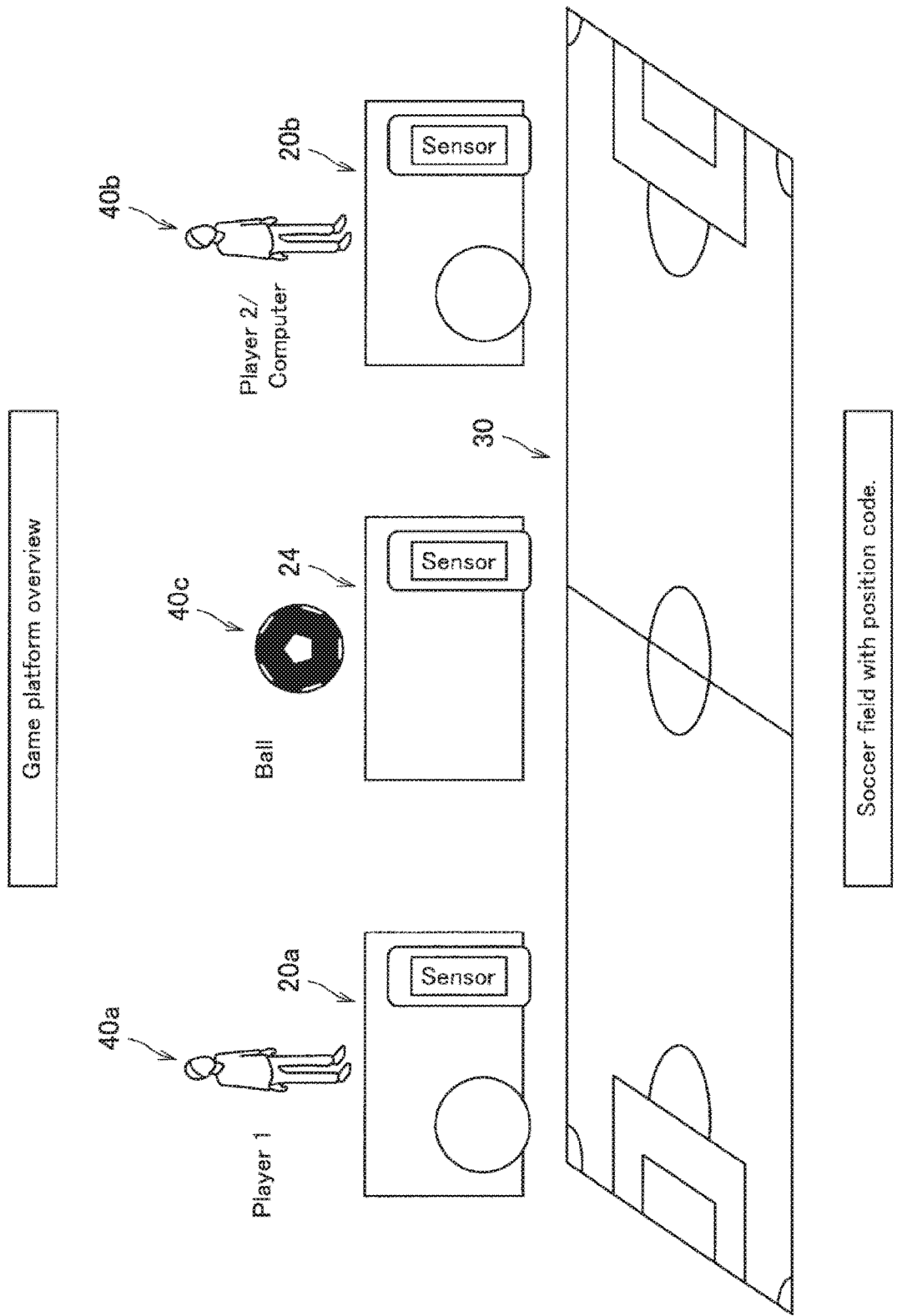
F I G. 5 0

FIG.67
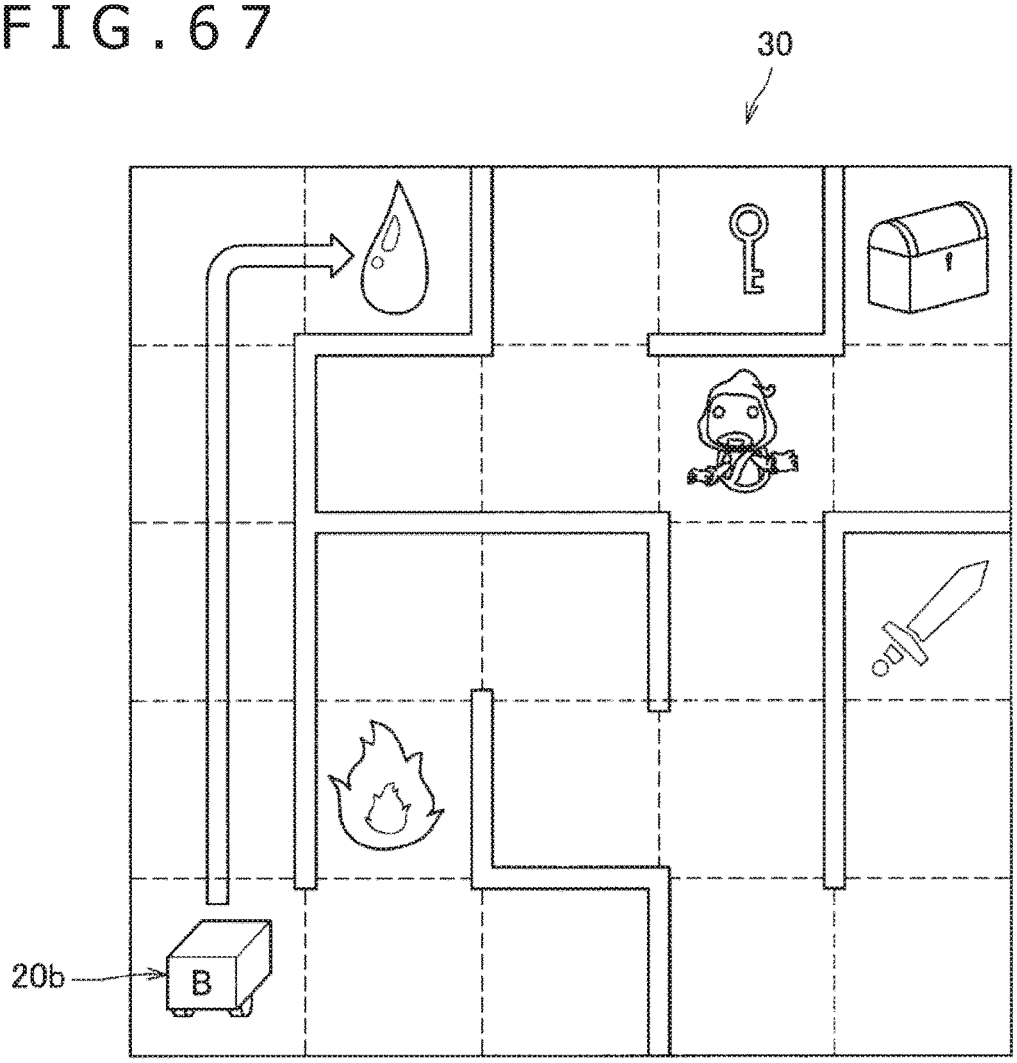
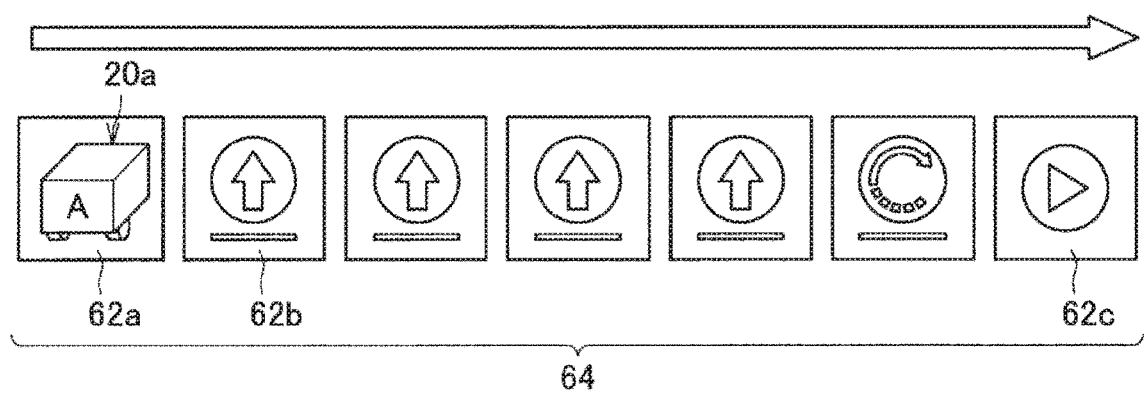

INFORMATION PROCESSING APPARATUS, INFORMATION PROCESSING METHOD, AND INFORMATION MEDIUM

TECHNICAL FIELD

The present disclosure relates to an information processing apparatus, an information processing method, and an information medium.

BACKGROUND ART

In the past, various plays, games, and the like using objects have been proposed. For example, a toy that allows assembling a three-dimensional object by using a plurality of blocks or components has been proposed.

For example, a technique is described in PTL 1, in which an image of a real object positioned on a play field is detected or tracked based on a result of imaging the play field.

CITATION LIST

Patent Literature

[PTL 1] JP 2016-76167A

SUMMARY

Technical Problem

However, controlling the motion of a moving body according to position information corresponding to a predetermined array pattern is not considered in the technique described in PTL 1.

Therefore, the present disclosure proposes new and improved information processing apparatus, information processing method, and information medium that can control the motion of a moving body according to position information corresponding to a predetermined array pattern.

Solution to Problem

The present disclosure provides an information processing apparatus including an information acquisition unit that acquires position information from a sensor configured to read a predetermined array pattern, and a motion control unit that controls motion of a first moving body including movement in a real space based on the position information.

In addition, the present disclosure provides an information processing method including acquiring position information from a sensor configured to read a predetermined array pattern, and using a processor to control motion of a first moving body including movement in a real space based on the position information.

In addition, the present disclosure provides an information medium including a first array pattern including a plurality of different patterns defining position information regarding a real space, the first array pattern having a first area, and a second array pattern defining control information regarding motion of a moving body, the second array pattern having a second area smaller than the first area.

Advantageous Effect of Invention

As described above, according to the present disclosure, the motion of the moving body can be controlled according to the position information corresponding to the predetermined array pattern. Note that the advantageous effect described here may not be limited, and there can be any advantageous effects described in the present disclosure.

BRIEF DESCRIPTION OF DRAWINGS

FIG. 7 is a block diagram illustrating an example of functional configuration of the trolley 20.

FIG. 48 is a diagram illustrating an example of specifying the position information of the substantial center of the trolley 20 according to the ninth embodiment.

FIG. 49 is a diagram illustrating an example of pairing an operation unit 124 and the trolley 20 according to a tenth embodiment.

FIG. 50 is a diagram illustrating an example of a platform of a soccer game according to an eleventh embodiment.

FIG. 67 is a diagram illustrating an example of a maze game according to a fifteenth embodiment.

DESCRIPTION OF EMBODIMENTS

Preferred embodiments of the present disclosure will be described in detail with reference to the attached drawings. Note that in the present specification and the drawings, the same reference signs are provided to constituent elements with substantially the same functional configurations to avoid repeated description.

In addition, in the present specification and the drawings, different alphabets may be provided after the same reference sign to distinguish a plurality of constituent elements with substantially the same functional configurations. For example, a plurality of components with substantially the same functional configurations are distinguished like a trolley 20a and a trolley 20b as necessary. However, only the same reference signs are provided in a case where each of a plurality of constituent elements with substantially the same functional configurations does not have to be particularly distinguished. For example, the trolley 20a and the trolley 20b will be simply referred to as trolleys 20 in a case where the distinction is not particularly necessary.

In addition, the "Description of Embodiments" will be described in the following order of items.
1. Configuration of Information Processing System
2. First Embodiment
3. Second Embodiment
4. Third Embodiment
5. Fourth Embodiment
6. Fifth Embodiment
7. Sixth Embodiment
8. Seventh Embodiment
9. Eighth Embodiment
10. Ninth Embodiment
11. Tenth Embodiment
12. Eleventh Embodiment
13. Twelfth Embodiment
14. Thirteenth Embodiment
15. Fourteenth Embodiment
16. Fifteenth Embodiment
17. Sixteenth Embodiment
18. Seventeenth Embodiment
19. Hardware Configuration
20. Modifications

1. Configuration of Information Processing System

Figure 1:
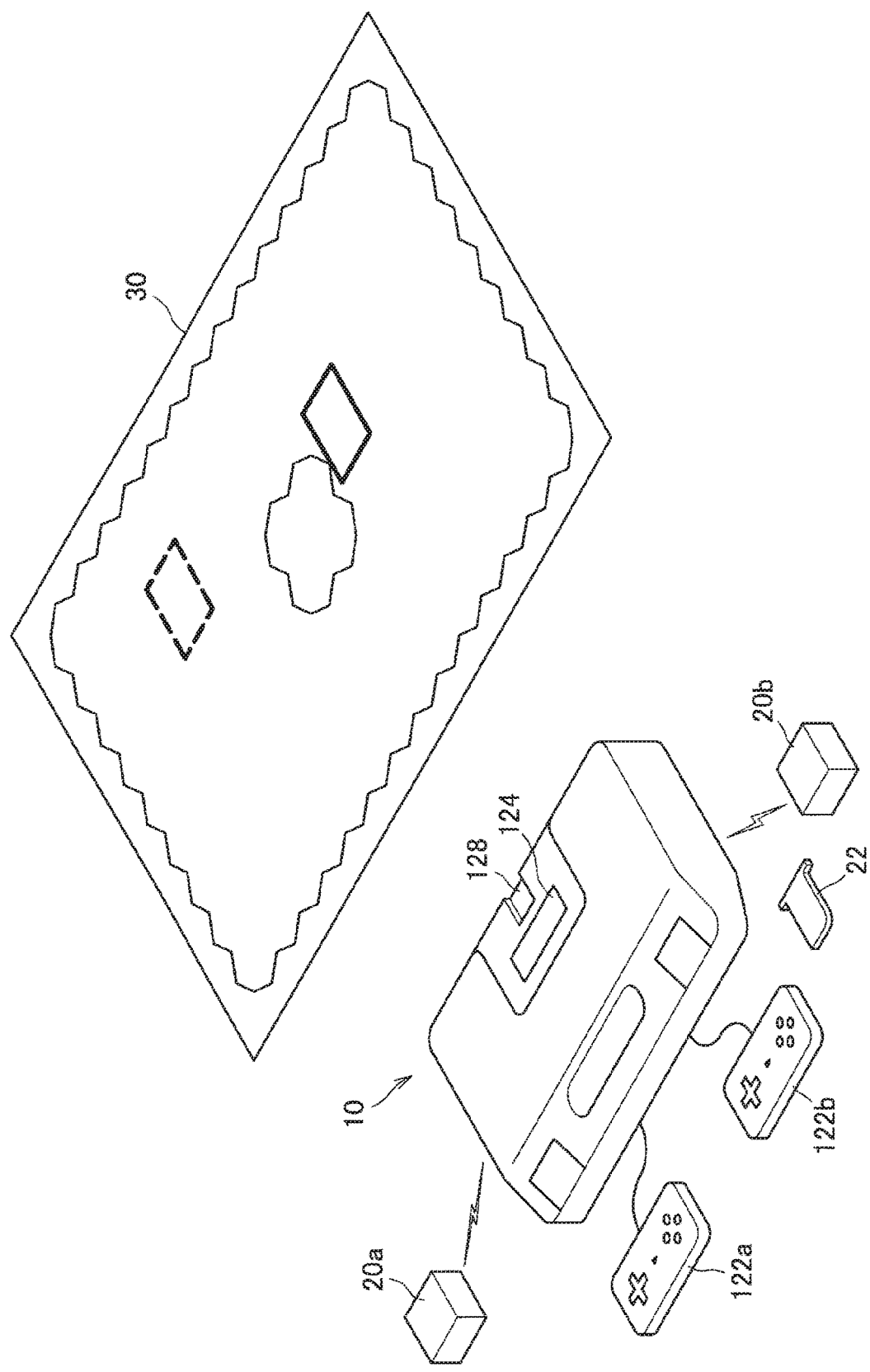
FIG. 1 is an explanatory view illustrating a configuration example of an information processing system common to embodiments of the present disclosure.

First, a configuration example of an information processing system common to the embodiments of the present disclosure will be described with reference to FIG. 1. As illustrated in FIG. 1, the information processing system common to the embodiments includes an information processing apparatus 10, one or more trolleys 20, and a mat 30.

1-1. Information Processing Apparatus 10

The information processing apparatus 10 is an apparatus that controls motion of the one or more trolleys 20. The information processing apparatus 10 may further control execution of various applications such as a game application. For example, the information processing apparatus 10 controls the execution of the game application and then controls the motion of the one or more trolleys 20 during the execution of the game application. Note that although the information processing apparatus 10 is provided on hardware different from the trolleys 20 in FIG. 1, at least part of the configuration of the information processing apparatus 10 for controlling the trolleys 20 may be provided on the trolleys 20.

As illustrated in FIG. 1, the information processing apparatus 10 may include operation units 122, a display unit 124, and a cassette connection unit 128.

1-1-1. Cassette Connection Unit 128

The cassette connection unit 128 is a mechanism for connecting a cassette 22. The cassette 22 stores, for example, binary data, video data, music data, and the like of various applications (such as a game application).

For example, once the cassette 22 is set in the cassette connection unit 128, a control unit 100 described later reads an application stored in the cassette 22 and activates the application.

1-1-2. Operation Units 122

The operation units 122 receive an operation of the user regarding, for example, the motion of the trolleys 20. Although the details will be described later, the individual operation units 122 may be associated with the individual trolleys 20. In this case, the operation units 122 may receive operations for the trolleys 20 associated with the operation units 122. In addition, the information processing apparatus 10 may control the motion of the trolleys 20 according to operation information received from the operation units 122.

1-1-3. Display Unit 124

The display unit 124 may include, for example, a liquid crystal display (LCD), an organic light emitting diode (OLED), or the like. For example, the display unit 124 may be configured as a touch display.

The display unit 124 displays various types of information (for example, status information and various types of notification information regarding the activated application) according to the control of the control unit 100 described later.

1-2. Mat 30

The mat 30 is an example of a first sheet-like medium (information medium) according to the present disclosure. A predetermined array pattern is printed (recorded) on the mat 30. The predetermined array pattern may include a first array pattern including a plurality of different patterns defining position information on the mat 30. The position information on the mat 30 may be regarded as position information associated with a real space. For example, a plurality of unit areas in a grid pattern are defined in the mat 30, and for each unit area, a pattern associated with the position information of the unit area is printed (recorded). Note that as disclosed in a sixth embodiment described later, the information medium may have a shape of a book. More specifically, it is only necessary that the information medium according to the present disclosure have a surface including a predetermined array pattern, and it should be noted that the surface including the predetermined array pattern is not limited to a plane. In addition, the predetermined array pattern may be one of a pattern that reflects visible light and a pattern that reflects invisible light or may be a combination of these. In a case where the pattern that reflects invisible light is adopted, a pattern that reflects infrared light may be printed on the mat 30, and an infrared (IR) sensor for the mat 30 may sense the light to recognize the pattern, for example.

Furthermore, the predetermined array pattern may include a second array pattern defining control information regarding the motion of the trolleys 20. For example, the control information includes information for controlling at least one of the movement speed, the motion pattern, and the rotation motion of the trolleys 20.

1-3. Trolley 20

1-3-1. External Configuration

Figure 2:
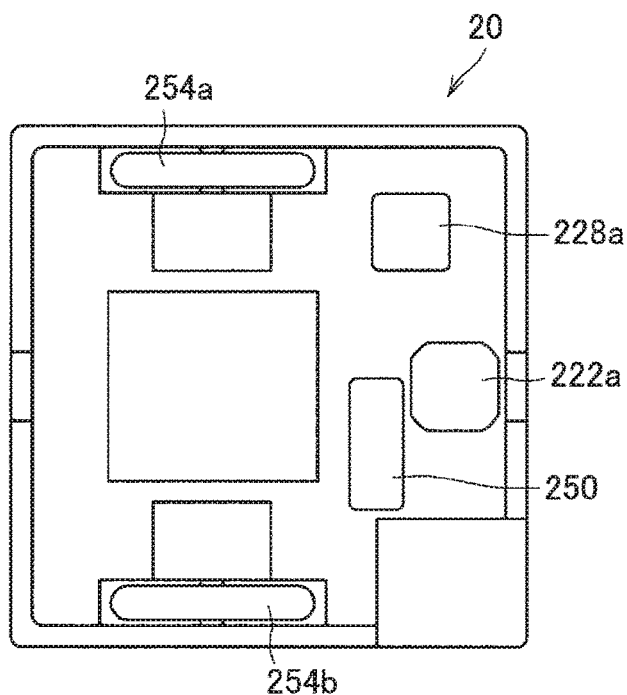
FIG. 2 is an example of a bottom view of a trolley 20 according to the embodiments.
Figure 3:
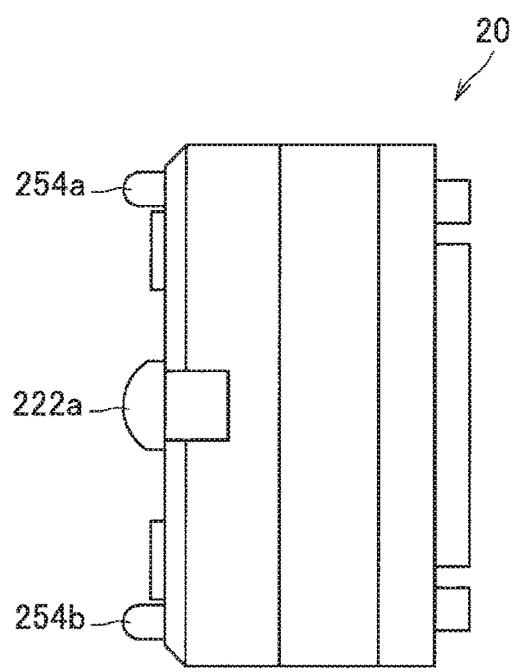
FIG. 3 is an example of a front view of the trolley 20 according to the embodiments.
Figure 4:
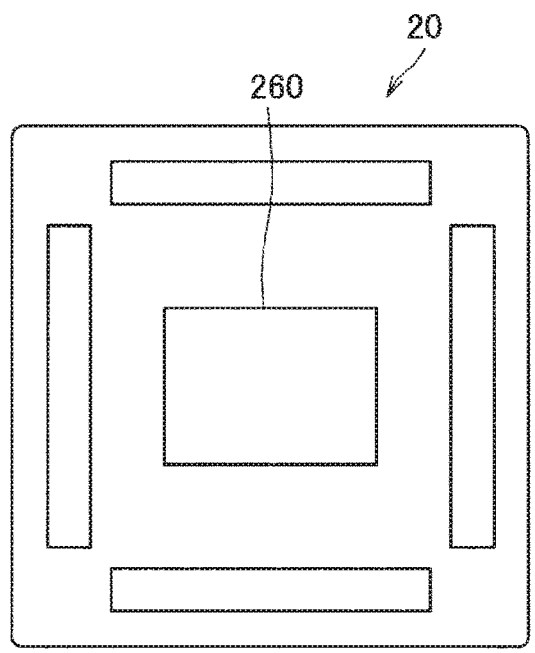
FIG. 4 is an example of a plan view of the trolley 20 according to the embodiments.
Figure 5:
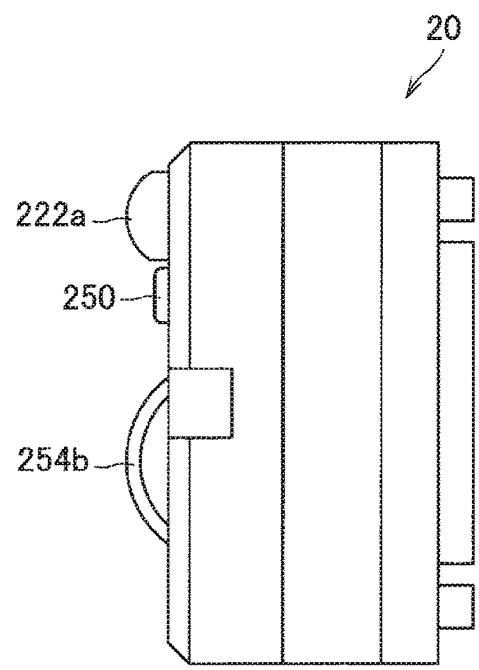
FIG. 5 is an example of a side view of the trolley 20 according to the embodiments.

The trolley 20 is an example of a moving body according to the present disclosure. The trolley 20 performs an operation (such as traveling) including a movement based on the operation of the user on the operation unit 122 or based on the control of the information processing apparatus 10. FIGS. 2 to 5 are diagrams illustrating an example of an external configuration of the trolley 20. FIG. 2 is an example of a bottom view of the trolley 20. FIG. 3 is an example of a front view of the trolley 20. FIG. 4 is an example of a plan view of the trolley 20. FIG. 5 is an example of a side view of the trolley 20. Note that the "movement" described in the present disclosure may be regarded as a movement of a moving body (for example, trolley 20) mainly in a horizontal direction.

As illustrated in FIG. 2, the trolley 20 includes a power switch 250, a position sensor 228a, a switch 222a, and two wheels 254. For each wheel 254, the trolley 20 may further include one motor (not illustrated) that rotates the wheel 254. For example, three components including the switch 222a and the two wheels 254 are in contact with the ground, and in this state, the trolley 20 travels on the surface where the trolley 20 is positioned.

1-3-1-1. Sensor Unit 228

A sensor unit 228 includes the position sensor 228a. The position sensor 228a may include an image sensor (camera). For example, in a case where the trolley 20 is placed on the mat 30, the position sensor 228a takes an image of the mat 30 and applies a process, such as decoding, to the taken image. In this way, the position sensor 228a reads the array pattern recorded in the mat 30 to acquire the position information on the mat 30. More specifically, the position sensor 228a reads the array pattern recorded in the unit area positioned directly under the position sensor 228a among the plurality of unit areas in the mat 30.

As illustrated in FIG. 2, the position sensor 228a may be attached apart from a substantial center of the trolley 20 in the horizontal direction of the trolley 20. Furthermore, the position sensor 228a may be attached on a front part of the trolley 20 in the horizontal direction of the trolley 20.

Although not illustrated, the sensor unit 228 may further include an acceleration sensor, a rotation sensor of motor, and a force sensor. For example, the force sensor may sense the strength of force applied to the trolley 20 from the outside. For example, the force sensor may be installed in place of the switch 222a.

1-3-1-2. Attachment Unit 260

As illustrated in FIGS. 3 to 5, an attachment unit 260 may be installed on an upper surface of the trolley 20. The attachment unit 260 includes a predetermined electrical interface. For example, the attachment unit 260 includes a pulse width modulation (PWM) interface, an inter-integrated circuit (I2C) bus, a serial peripheral interface (SPI), a general purpose input/output (GPIO), and the like.

Figure 6:
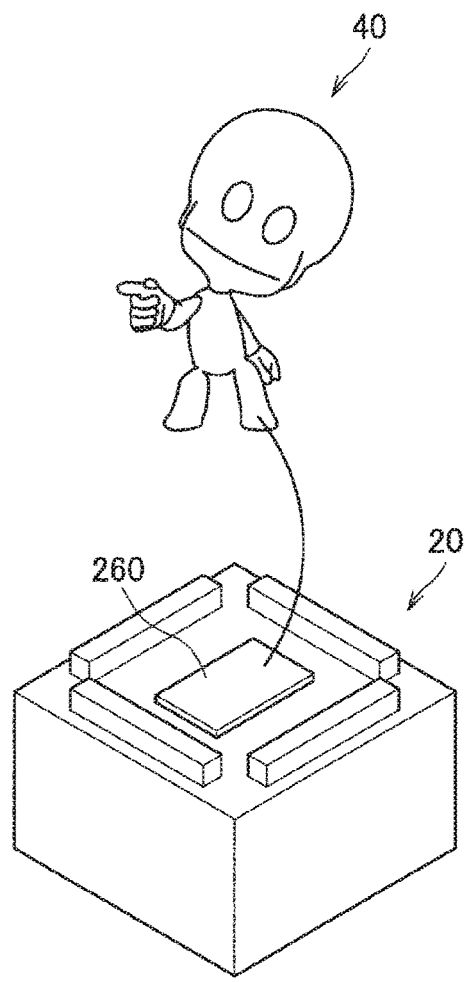
FIG. 6 is a diagram illustrating an example in which a toy 40 is attached to the trolley 20.

As illustrated in FIG. 6, a toy 40 may be attached to the attachment unit 260. The toy 40 includes a combination of one or more blocks (Construction set). The toy 40 may further include, for example, an LED, a motor, a buzzer, and the like.

In the case where the toy 40 is attached to the attachment unit 260, the trolley 20 can control the motion of the toy 40 (for example, light emission of LED, rotation of motor, output of sound, and the like). Although the details will be described later, when, for example, the user brings the toy 40 or the trolley 20 provided with the toy 40 close to or into contact with paper (such as a card) or the like recording a predetermined array pattern (also referred to as fourth array pattern), the toy 40 or the trolley 20 may be associated with the fourth array pattern. In this case, the information processing apparatus 10 or the trolley 20 may use a motion pattern corresponding to the fourth array pattern to control the motion of the toy 40.

1-3-2. Functional Configuration

Here, a functional configuration of the trolley 20 will be described with reference to FIG. 7. FIG. 7 is a block diagram illustrating an example of functional configuration of the trolley 20. As illustrated in FIG. 7, the trolley 20 includes a control unit 200, a communication unit 220, an input unit 222, a display unit 224, a sound output unit 226, the sensor unit 228, a near field wireless communication unit 230, a drive unit 232, and a servo motor 234. Note that the same content as in the description above will not be described.

1-3-2-1. Control Unit 200

The control unit 200 may include, for example, a processing circuit such as a central processing unit (CPU). The control unit 100 comprehensively controls the motion of the trolley 20.

For example, the control unit 100 causes the communication unit 220 to transmit, to the information processing apparatus 10, position information read by the sensor unit 228 from the mat 30. Note that instead of the sensor unit 228, the control unit 100 may specify the position information corresponding to the array pattern read by the sensor unit 228 from the mat 30.

1-3-2-2. Input Unit 222

The input unit 222 receives an operation of the user for the trolley 20. The input unit 222 may include the switch 222a, a push button, and the like.

1-3-2-3. Display Unit 224

The display unit 224 includes, for example, an LED (such as a four color LED), an LCD, an OLED, or the like. The display unit 224 displays various types of information according to the control of the control unit 200. For example, during activation of a game application, the display unit 224 displays various types of notification information and the like regarding the trolley 20.

1-3-2-4. Sound Output Unit 226

The sound output unit 226 includes, for example, a speaker and the like. The sound output unit 226 outputs various sounds according to the control of the control unit 200. For example, during activation of a game application, the sound output unit 226 outputs various notification sounds (such as a buzzer), sound effects, and the like regarding the trolley 20.

1-3-2-5. Near Field Wireless Communication Unit 230

The near field wireless communication unit 230 includes, for example, near field communication (NFC) reader and writer. For example, the near field wireless communication unit 230 reads information from an NFC tag brought close to the near field wireless communication unit 230 or writes information to the NFC tag.

1-3-2-6. Drive Unit 232

The drive unit 232 is a mechanism for driving the trolley 20. The drive unit 232 may include, for example, a left motor and a right motor. The motors may rotate according to the control of the control unit 200. In this way, the individual wheels 254 of the trolley 20 rotate, and the trolley 20 can move on the surface where the trolley 20 is positioned.

1-3-2-7. Servo Motor 234

The servo motor 234 is a motor for a servo mechanism included in the trolley 20 to control the position, the speed, and the like. For example, the servo motor 234 rotates according to the control of the control unit 200. As a result, the trolley 20 collides with (such as a kick) another object, or the trolley 20 tumbles.

The configuration of the information processing system common to the embodiments of the present disclosure has been described. Hereinafter, the embodiments will be sequentially described in detail.

2. First Embodiment

First, a first embodiment according to the present disclosure will be described. The background of creating the first embodiment will be described first. It is generally desirable that the types of the mat 30 (for example, illustrations of the mat 30) vary according to the types of games and applications. In this case, the information processing apparatus 10 needs to be able to specify the type of the mat 30 that the user is using.

As described later, according to the first embodiment, one or more trolleys 20 can be placed on the mat 30, and the information processing apparatus 10 can specify the type of the mat.

2-1. Configuration

Figure 8:
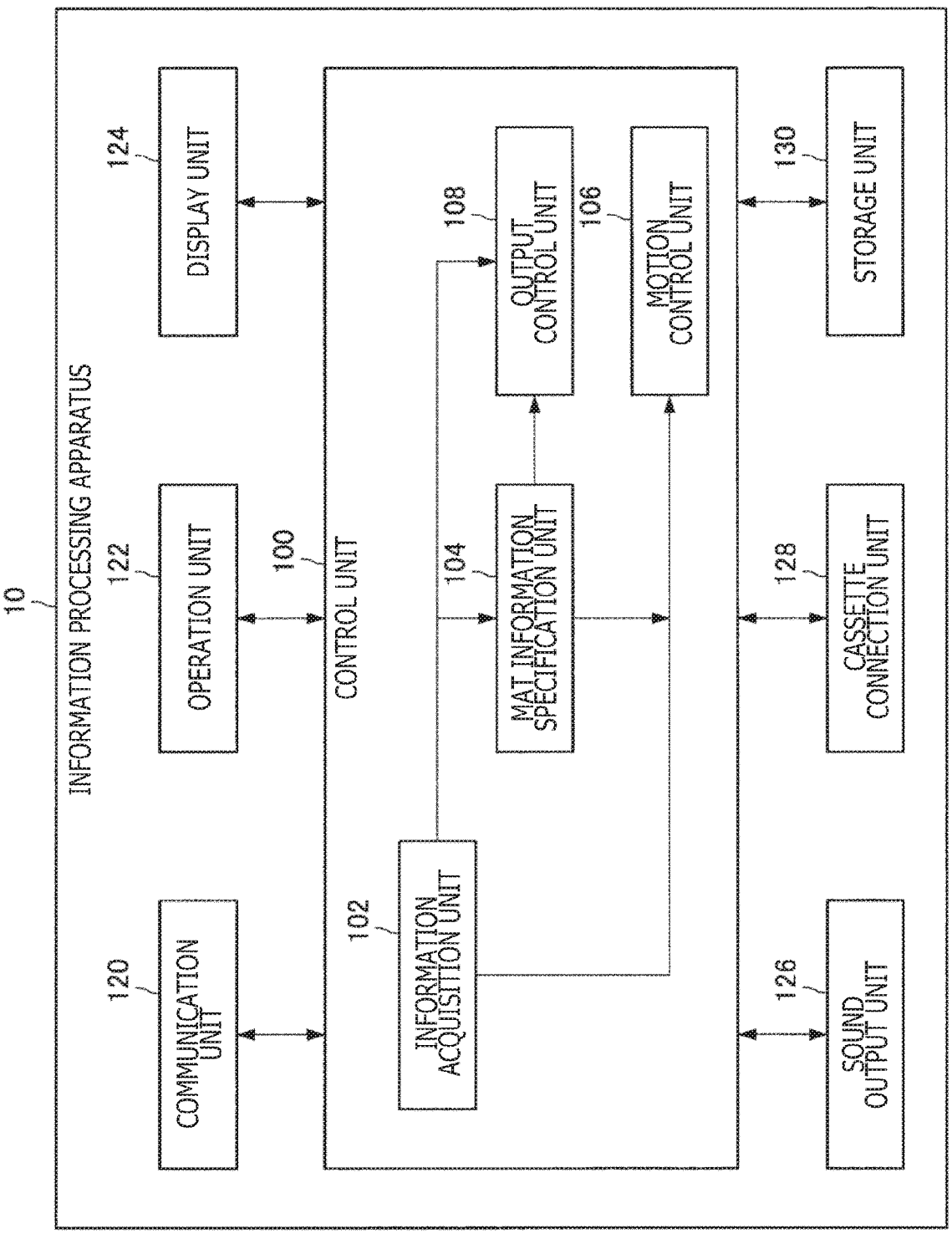
FIG. 8 is a functional block diagram illustrating a configuration example of an information processing apparatus 10 according to a first embodiment.

Next, a configuration according to the first embodiment will be described in detail. FIG. 8 is a functional block diagram illustrating an example of configuration of the information processing apparatus 10 according to the first embodiment. As illustrated in FIG. 8, the information processing apparatus 10 includes the control unit 100, a communication unit 120, the operation unit 122, the display unit 124, a sound output unit 126, the cassette connection unit 128, and a storage unit 130.

2-1-1. Control Unit 100

The control unit 100 may include, for example, a processing circuit such as a CPU 150 described later. The control unit 100 comprehensively controls the motion of the information processing apparatus 10. In addition, as illustrated in FIG. 8, the control unit 100 includes an information acquisition unit 102, a mat information specification unit 104, a motion control unit 106, and an output control unit 108.

2-1-2. Information Acquisition Unit 102

The information acquisition unit 102 acquires information sensed by the trolley 20 from the trolley 20. For example, the information acquisition unit 102 receives, from the trolley 20, position information or control information read by the trolley 20 from the mat 30 to acquire the information.

The information acquisition unit 102 may further acquire, from the operation unit 122, operation information of the user input to the operation unit 122. The information acquisition unit 102 may further acquire, from the cassette connection unit 128, information (for example, binary data, music data, and the like of application) read from the cassette connected to the cassette connection unit 128.

2-1-3. Mat Information Specification Unit 104

The mat information specification unit 104 specifies identification information (mat ID) of the mat 30 provided with the trolley 20 based on the information acquired by the information acquisition unit 102.

2-1-3-1. Example of Specification 1

Figure 9:
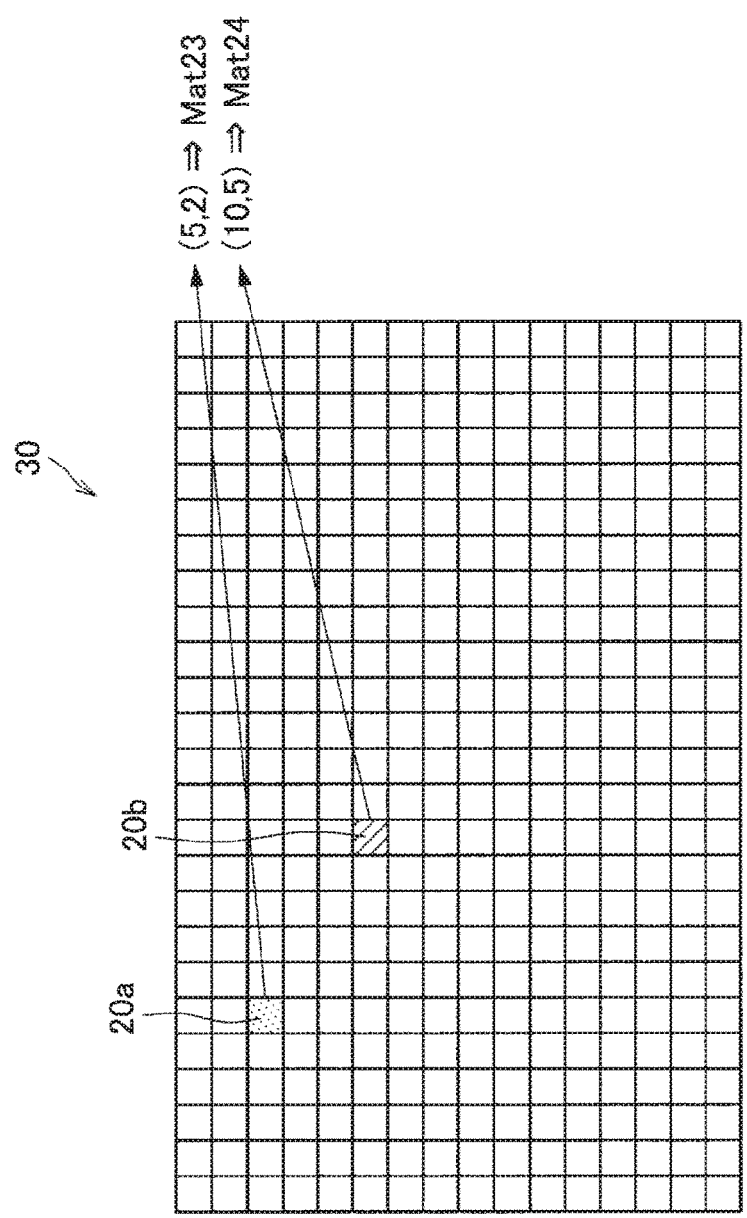
FIG. 9 is a diagram illustrating an example of specifying a mat identification (ID) according to the first embodiment.

For example, a start position may be defined in the mat 30, and the position information of the start position and the mat ID may be associated one-to-one in advance. In this case, when, for example, the trolley 20 is placed at the start position and a start button included in the operation unit 122 is pressed, the mat information specification unit 104 may specify, as the mat ID of the mat 30, the mat ID associated with the position information acquired by the trolley 20 from the start position. For example, as illustrated in FIG. 9, the mat information specification unit 104 specifies that a mat ID "Mat23" associated with position information (5, 2) acquired by the trolley 20a from the start position on the mat 30 is the mat ID of the mat 30 provided with the trolley 20a.

2-1-3-2. Example of Specification 2

Figure 10:
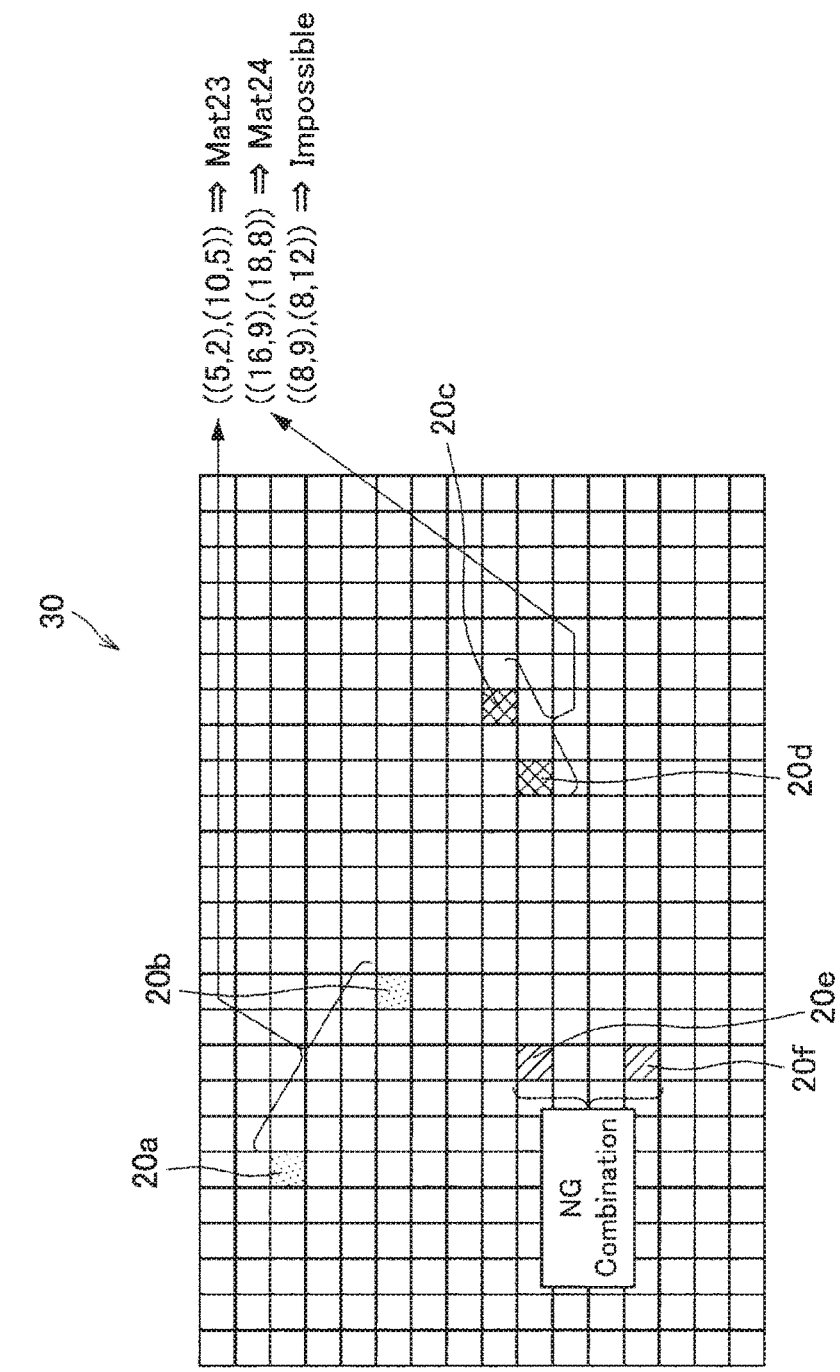
FIG. 10 is a diagram illustrating an example of specifying the mat ID according to the first embodiment.

Alternatively, start positions of two trolleys 20 may be defined in the mat 30, and the combination of the position information of the two start positions and the mat IDs may be associated one-to-one in advance. In this case, when one trolley 20 is placed on each of the two start positions and the start button included in the operation unit 122 is pressed, the mat information specification unit 104 may specify, as the mat ID of the mat 30, the mat ID associated with the combination of the position information acquired by the two trolleys 20 from the mat 30. In an example illustrated in FIG. 10, the position information acquired by the trolley 20a from a first start position on the mat 30 is (5, 2), and the position information acquired by the trolley 20b from a second start position on the mat 30 is (10, 5). In this case, the mat information specification unit 104 may specify that the mat ID "Mat23" associated with the combination of (5, 2) and (10, 5) is the mat ID of the mat 30 provided with the two trolleys 20.

2-1-3-3. Example of Specification 3

Figure 11:
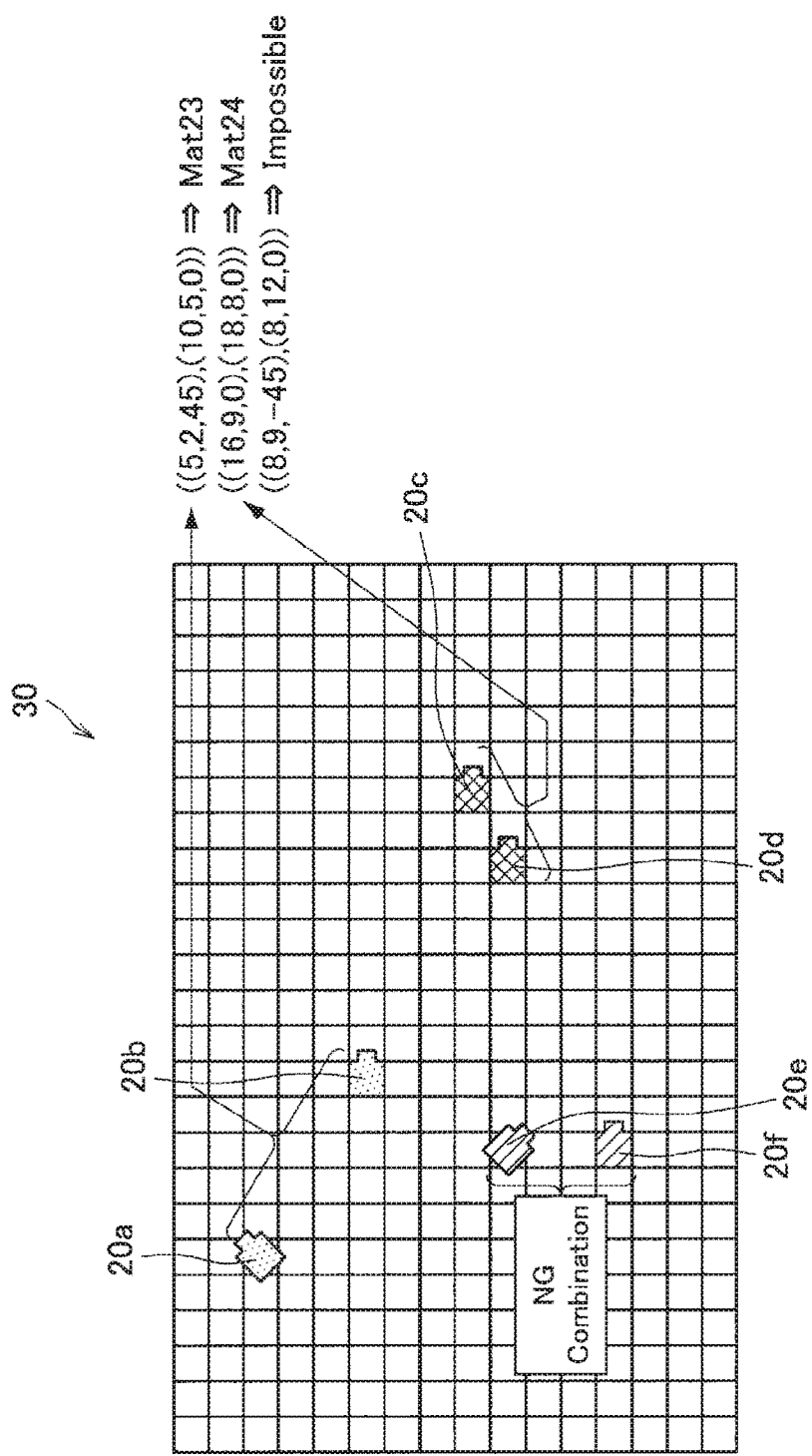
FIG. 11 is a diagram illustrating an example of specifying the mat ID according to the first embodiment.

Alternatively, the combination of the position information and the angle information of two trolleys 20 and the mat ID at the start of an application (such as a game) may be associated one-to-one in advance. In this case, when one trolley 20 is placed at each of two start positions on the mat 30 at each angle designated in advance and, for example, the start button included in the operation unit 122 is pressed, the mat information specification unit 104 may specify, as the mat ID of the mat 30, the mat ID associated with the combination of the position information and the angle information acquired by the two trolleys 20 from the mat 30. In an example illustrated in FIG. 11, the position information acquired by the trolley 20a from the first start position on the mat 30 is (5, 2), and the angle of the trolley 20a with respect to the mat 30 is "45 degrees." The position information acquired by the trolley 20b from the second start position on the mat 30 is (10, 5), and the angle of the trolley 20b with respect to the mat 30 is "0 degrees." In this case, the mat information specification unit 104 specifies that the mat ID "Mat23" associated with the combination of information is the mat ID of the mat 30 provided with the two trolleys 20. According to the example of specification 3, the robustness of the determination of the mat ID can be improved.

2-1-3-4. Example of Specification 4

Alternatively, a start position or a start area recording the mat ID (instead of the position information) may be printed on the mat 30. Alternatively, a sheet-like medium (such as paper and sticker) including printed information (character string or image) indicative of the start area and recording the mat ID may be pasted on the mat 30.

Figure 12:
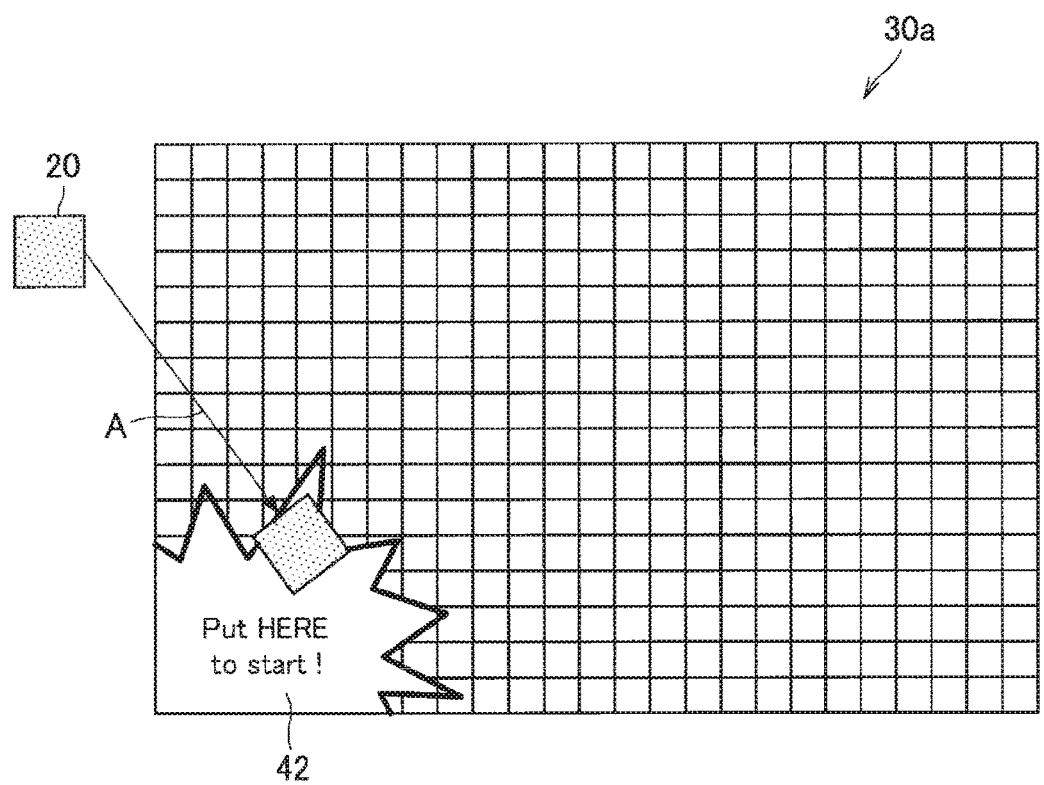
FIG. 12 is a diagram illustrating an example of specifying the mat ID according to the first embodiment.
Figure 13:
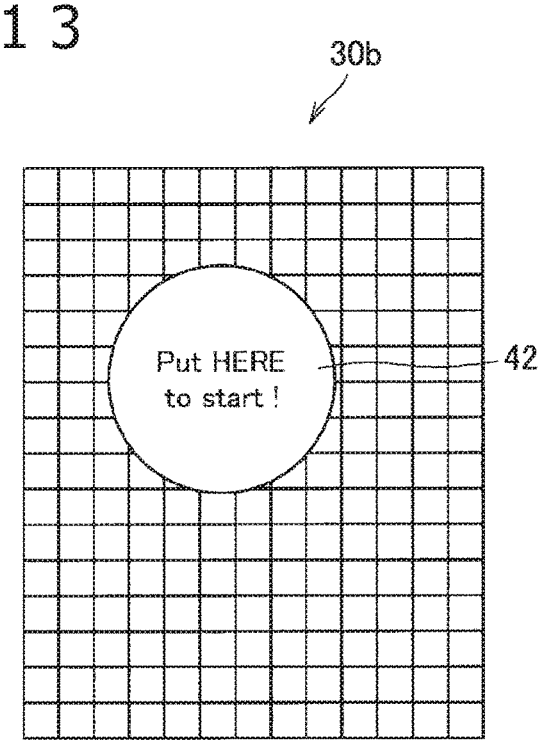
FIG. 13 is a diagram illustrating an example of specifying the mat ID according to the first embodiment.
Figure 14:
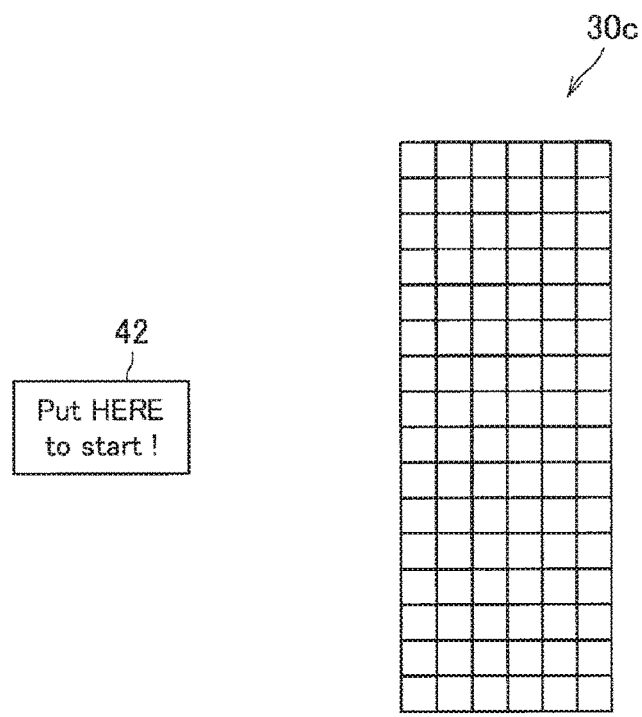
FIG. 14 is a diagram illustrating an example of specifying the mat ID according to the first embodiment.

In these cases, as illustrated, for example, in FIG. 12, the mat information specification unit 104 may specify, as the mat ID of the mat 30, the mat ID read by the trolley 20 from a start area 42 at the timing of the placement of the trolley 20 in the start area 42 (that is, the start area printed on the mat 30 or the sheet-like medium pasted on the mat 30 and indicative of the start area). As illustrated in FIGS. 12 and 13, the start area 42 may be arranged in the mat 30, or as illustrated in FIG. 14, the start area 42 may be arranged out of the mat 30.

2-1-3-5. Example of Specification 5

Figure 15:
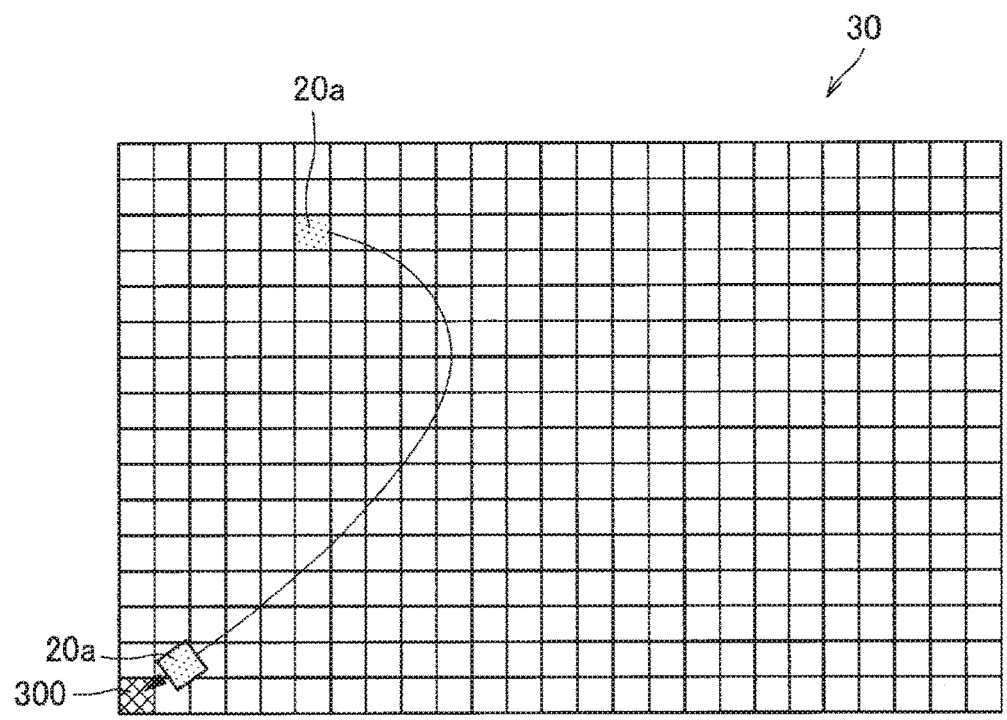
FIG. 15 is a diagram illustrating an example of specifying the mat ID according to the first embodiment.
Figure 16:
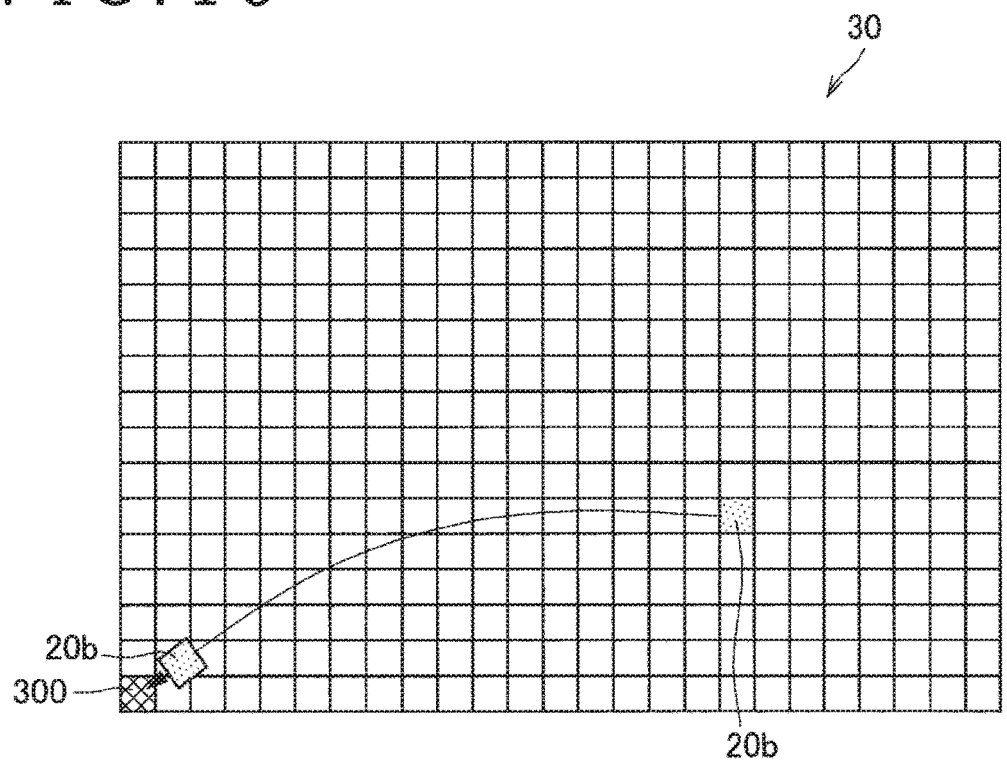
FIG. 16 is a diagram illustrating an example of specifying the mat ID according to the first embodiment.

Alternatively, the mat ID may be recorded on a predetermined unit area (for example, (0, 0) or the like) in the mat 30. In this case, for example, in a case where the mat ID is not specified yet, the trolley 20 may first automatically move to the predetermined unit area 300 as illustrated in FIG. 15 or 16. The mat information specification unit 104 may then specify that the mat ID read by the trolley 20 from the predetermined unit area 300 is the mat ID of the mat 30 provided with the trolley 20.

2-1-3-6. Example of Specification 6

Alternatively, in individual unit areas in the mat 30, coordinate values encoded by using the positions of the unit areas and a predetermined function may be recorded. Furthermore, the combination of the encoded coordinate values associated with a plurality of consecutive unit areas and the mat ID may be associated one-to-one. In this case, when, for example, the trolley 20 is placed at the start position defined in advance in the mat 30, the trolley 20 may first automatically move in the plurality of consecutive unit areas. The mat information specification unit 104 may then specify that the mat ID associated with the combination of the encoded coordinate values read by the trolley 20 from the plurality of consecutive unit areas is the mat ID of the mat 30 provided with the trolley 20.

Figure 17:
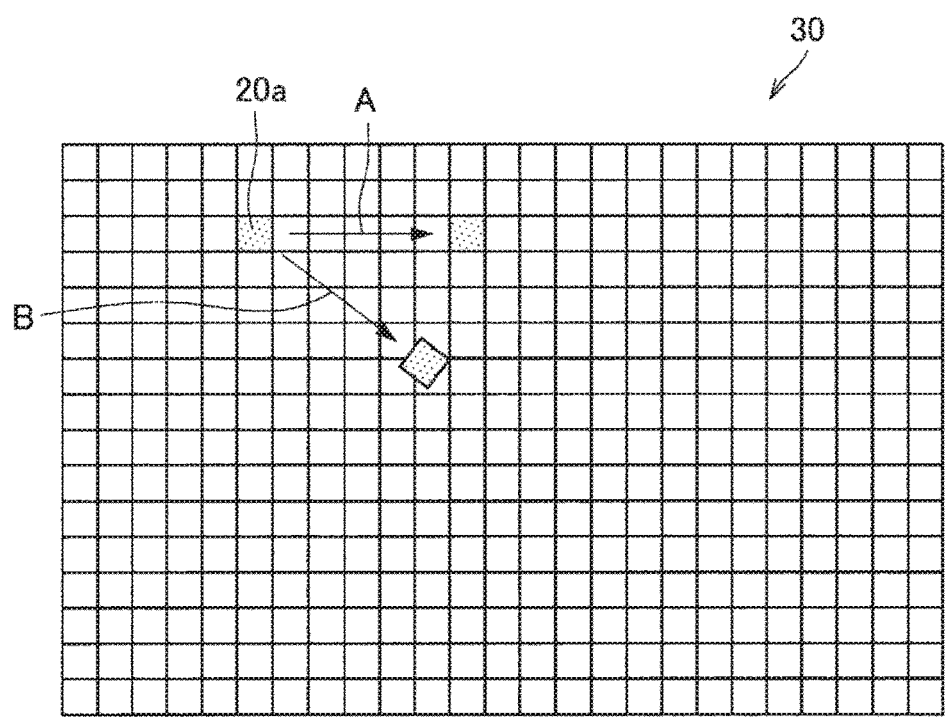
FIG. 17 is a diagram illustrating an example of specifying the mat ID according to the first embodiment.

Note that the direction is not particularly limited regarding the plurality of consecutive unit areas. For example, as indicated by an arrow A in FIG. 17, the trolley 20 may be configured to move in the horizontal direction or may be configured to move in the vertical direction. Alternatively, the trolley 20 may be configured to move diagonally as indicated by an arrow B in FIG. 17.

2-1-4. Motion Control Unit 106

The motion control unit 106 controls the motion of the trolley 20 based on the information (position information, angle information, sensing result of acceleration, and the like) regarding the trolley 20 acquired by the information acquisition unit 102 and based on the mat ID specified by the mat information specification unit 104. For example, the motion control unit 106 controls the movement, the display, and/or the output of sound of the trolley 20 based on the acquired information regarding the trolley 20 and the specified mat ID.

The motion control unit 106 also controls the motion of the trolley 20 based on operation information of the user on the operation unit 122. For example, in a case where the operation information indicates a movement direction, the motion control unit 106 causes the trolley 20 to move in the movement direction.

2-1-5. Output Control Unit 108

The output control unit 108 controls the output of various types of information based on the information acquired by the information acquisition unit 102 and the mat ID specified by the mat information specification unit 104. For example, the output control unit 108 causes the display unit 124 to display the display information of the application (for example, menu screen, status information of the application, notification information, and the like) acquired by the information acquisition unit 102. The output control unit 102 also causes the sound output unit 126 to output the audio data of the application (for example, background music (BGM), warning sound, sound effect, and the like) of the application acquired by the information acquisition unit 102.

2-1-6. Communication Unit 120

The communication unit 120 may include, for example, a communication apparatus 166 described later. The communication unit 120 transmits and receives information to and from other apparatuses (such as the trolleys 20). For example, the communication unit 120 transmits and receives information to and from individual trolleys 20 through wireless communication (for example, Bluetooth (registered trademark) low energy (BLE) or Wi-Fi (registered trademark)). For example, the communication unit 120 transmits motion control information to the trolleys 20 according to the control of the motion control unit 106. The communication unit 120 also receives information (such as position information and acceleration) sensed by the trolley 20 from the trolley 20.

2-1-7. Sound Output Unit 126

The sound output unit 126 may include, for example, an output apparatus 162 described later. The sound output unit 126 outputs sound according to the control of the output control unit 108.

2-1-8. Storage Unit 130

The storage unit 130 may include, for example, a storage apparatus 164 described later. The storage unit 130 stores various types of data and various types of software.

2-1-9. Modification

Note that the configuration of the information processing apparatus 10 according to the first embodiment is not limited to the example described above. For example, one or more of the display unit 124, the sound output unit 126, and the cassette connection unit 128 may not be included in the information processing apparatus 10. For example, the display unit 124 may be, for example, a smartphone, a tablet terminal, a television receiver, or the like, and in this case, the display unit 124 and the information processing apparatus 10 may be able to communicate through wired communication or wireless communication.

In addition, although the operation unit 122 is connected to the information processing apparatus 10 through a cable in the example illustrated in FIG. 1, the example is not limited to this. The operation unit 122 and the information processing apparatus 10 may be separated and may be able to communicate through wireless communication (for example, BLE, Wi-Fi (registered trademark), or the like).

2-2. Flow of Process

Figure 18:
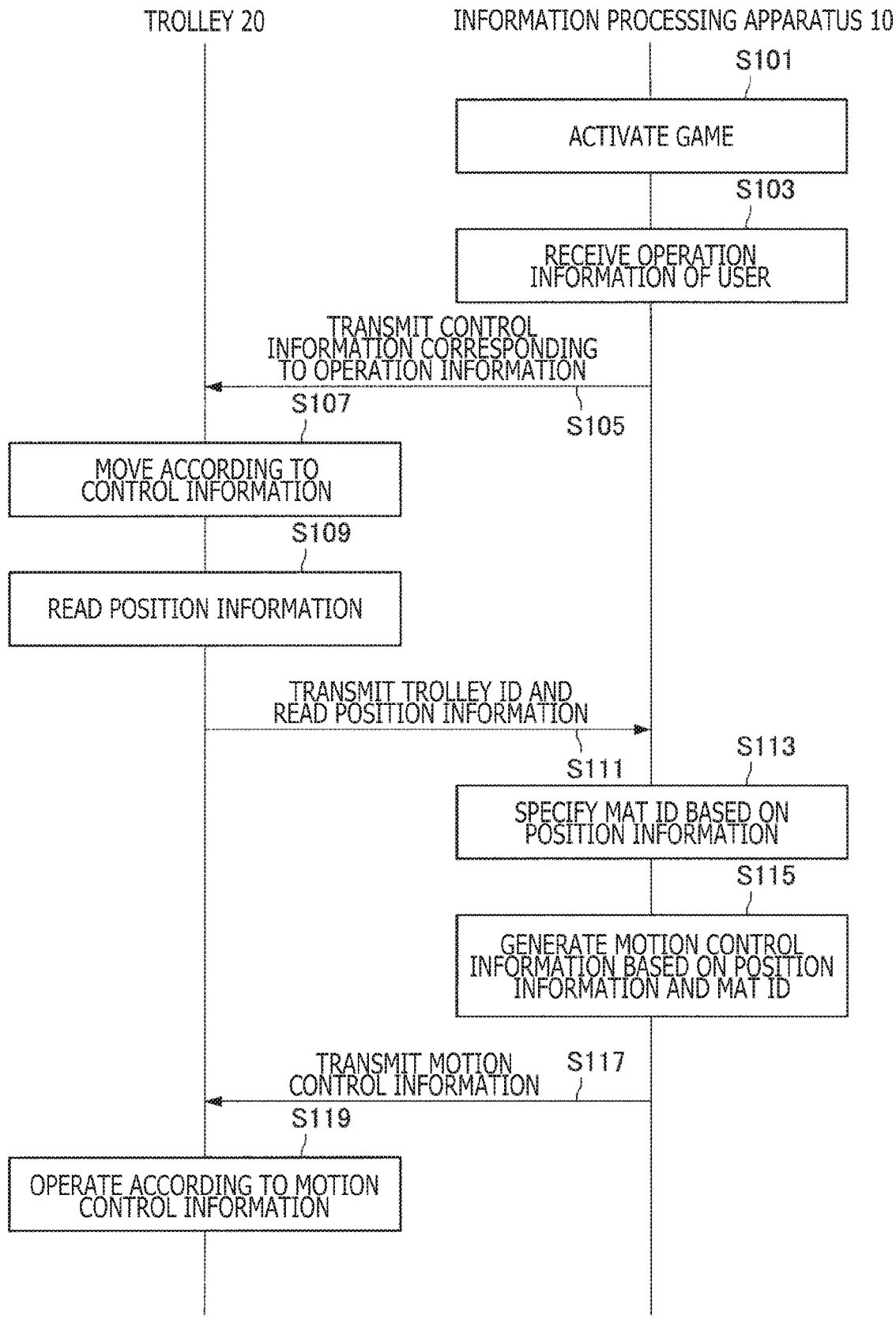
FIG. 18 is a sequence diagram illustrating a flow of a process according to the first embodiment.

The configuration according to the first embodiment has been described. Next, a flow of a process according to the first embodiment will be described with reference to FIG. 18. FIG. 18 is a sequence diagram illustrating an example of the flow of the process according to the first embodiment.

As illustrated in FIG. 18, the user first connects the cassette to the cassette connection unit 128 of the information processing apparatus 10. The cassette connection unit 128 then reads the data of the game application stored in the cassette. Next, the control unit 100 activates the game application based on the read data (S101).

Subsequently, the user operates the operation unit 122 to move the trolley 20 placed on the mat 30. The information acquisition unit 102 of the information processing apparatus 10 then receives and acquires the operation information received by the operation unit 122 from the operation unit 122 (S103).

Next, the motion control unit 106 generates control information for controlling the motion of the trolley 20 based on the acquired operation information. The communication unit 120 then transmits the control information to the trolley 20 according to the control of the motion control unit 106 (S105).

Subsequently, the trolley 20 moves on the mat 30 according to the received control information (S107). Furthermore, every time the trolley 20 moves to another unit area, the trolley 20 reads the position information recorded in the unit area (S109). The trolley 20 then transmits the read position information and the identification information of the trolley 20 to the information processing apparatus 10 (S111).

Subsequently, the mat information specification unit 104 of the information processing apparatus 10 specifies the mat ID of the mat 30 provided with the trolley 20 based on the received position information (S113).

Next, the motion control unit 106 generates motion control information for controlling the motion of the trolley 20 based on the position information received in S111 and the mat ID specified in S113 (S115). The communication unit 120 then transmits the motion control information to the trolley 20 according to the control of the motion control unit 106 (S117).

Subsequently, the trolley 20 operates according to the received motion control information (S119).

2-3. Advantageous Effects

As described above, the information processing apparatus 10 according to the first embodiment can specify the mat ID of the mat 30 based on the information (such as position information) read by the trolley 20 placed on the mat 30 from the mat 30. Therefore, even in a case where different types of mats 30 are created for different types of game applications, the information processing apparatus 10 can accurately specify the type of the mat 30 that the user is using. In addition, an appropriate process can be executed according to the type of the mat 30.

3. Second Embodiment

The first embodiment has been described. Next, a second embodiment will be described. First, the background of creating the second embodiment will be described. As described above, the position information is basically recorded in each of the individual unit areas in the mat 30.

Figure 19:
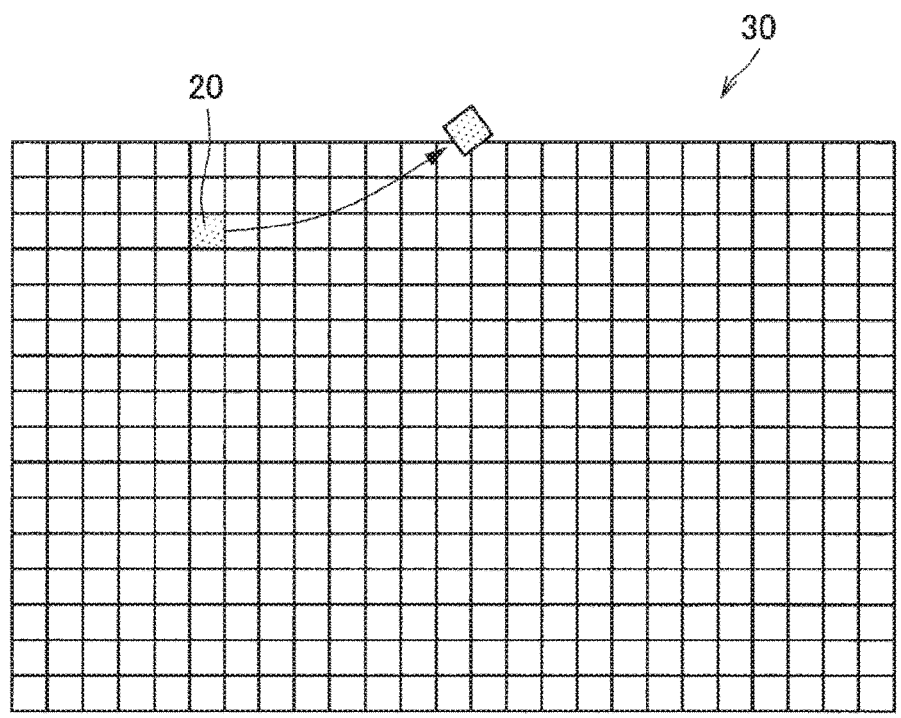
FIG. 19 is an explanatory view illustrating a problem of a second embodiment.

Incidentally, as illustrated in FIG. 19, the trolley 20 may be moved out of the mat 30 during the game. In such a case, the trolley 20 cannot acquire the position information, and the information processing apparatus 10 cannot recognize the position information of the trolley 20. As a result, continuation of the game may be difficult.

As described later, according to the second embodiment, the trolley 20 can be appropriately returned to the mat 30 in the case where the trolley 20 is moved out of the mat 30.

3-1. Configuration

Figure 20:
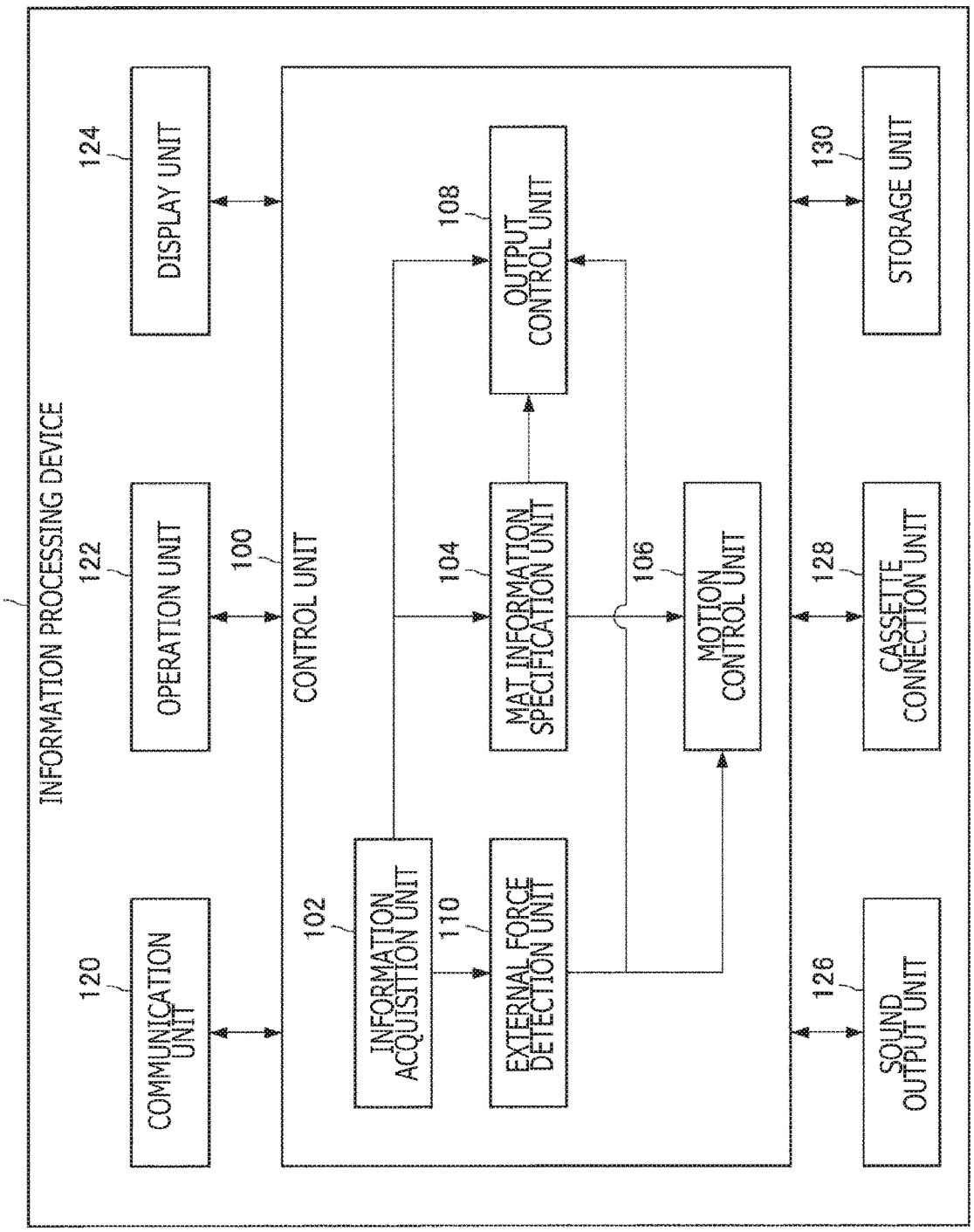
FIG. 20 is a functional block diagram illustrating a configuration example of the information processing apparatus 10 according to the second embodiment.

Next, a configuration according to the second embodiment will be described. FIG. 20 is a functional block diagram illustrating a configuration example of the information processing apparatus 10 according to the second embodiment. As illustrated in FIG. 20, compared to the first embodiment (illustrated in FIG. 8), the information processing apparatus 10 according to the second embodiment further includes an external force detection unit 110. Hereinafter, only the constituent elements with different functions from the first embodiment will be described.

3-1-1. External Force Detection Unit 110

The external force detection unit 110 detects whether or not there is external force to the trolley 20 and detects a degree of strength of the external force based on the information acquired by the information acquisition unit 102. For example, the external force detection unit 110 detects whether or not there is external force and detects the degree of strength of the external force based on a history of a value sensed by the motor rotation sensor (sensor unit 228) in the trolley 20. Alternatively, the external force detection unit 110 detects whether or not there is external force and detects the degree of strength of the external force by comparing a value sensed by the acceleration sensor (sensor unit 228) in the trolley 20 and an estimation result of the movement speed of the trolley 20 (that is, movement speed of the trolley 20 estimated based on the difference between the time that the position information is acquired last time and the time that the position information is newly acquired).

3-1-2. Motion Control Unit 106

The motion control unit 106 according to the second embodiment controls the trolley 20 such that the trolley 20 automatically moves to a predetermined position in a case where there is an abnormality in the acquisition of the position information by the information acquisition unit 102. Alternatively, the motion control unit 106 controls the movement direction of the trolley 20 based on the movement direction of the trolley 20 just before the generation of an abnormality in the acquisition of the position information by the information acquisition unit 102. Here, specific examples of the case where there is an abnormality in the acquisition of the position information include a case where the position information cannot be acquired (for example, a case where the trolley 20 moves out of the mat 30), a case where the relationship between pieces of position information acquired before and after is inconsistent, and a case where the position information cannot be correctly detected due to a malfunction of the sensor unit 228 of the trolley 20. For example, in the case where the motion control unit 106 determines that the trolley 20 is moved out of the mat 30, the motion control unit 106 controls the trolley 20 such that the trolley 20 moves to the mat 30.

3-1-2-1. Example of Control 1

Figure 21:
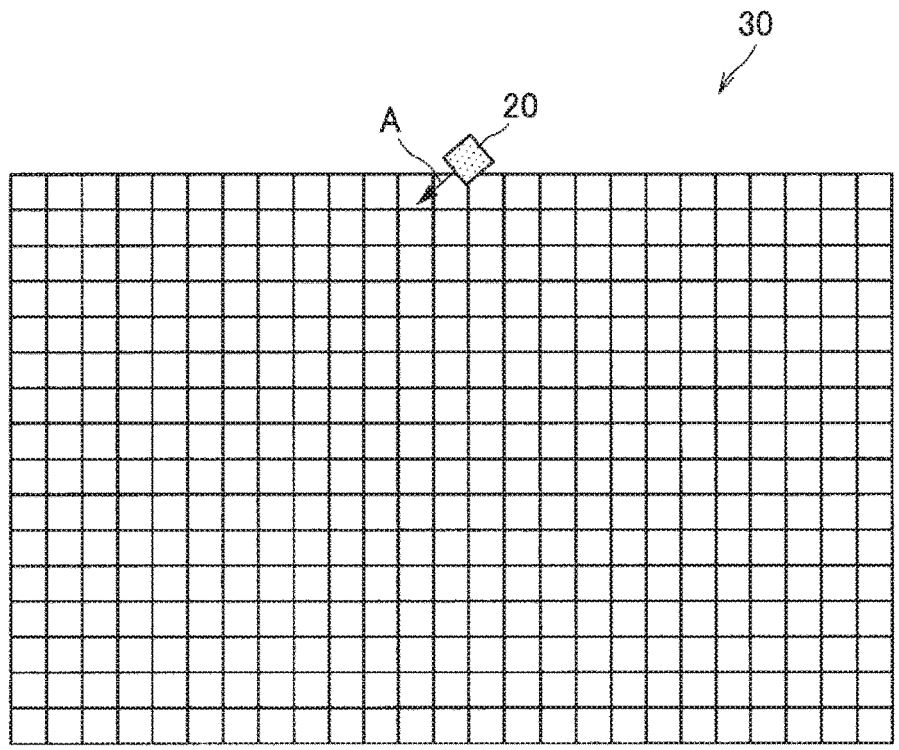
FIG. 21 is a diagram illustrating an example of controlling the movement of the trolley 20 according to the second embodiment.

For example, in the case where the motion control unit 106 determines that the trolley 20 is moved out of the mat 30, the motion control unit 106 may cause the trolley 20 to move back until the trolley 20 can acquire the position information again as indicated by an arrow A in FIG. 21.

3-1-2-2. Example of Control 2

Figure 22:
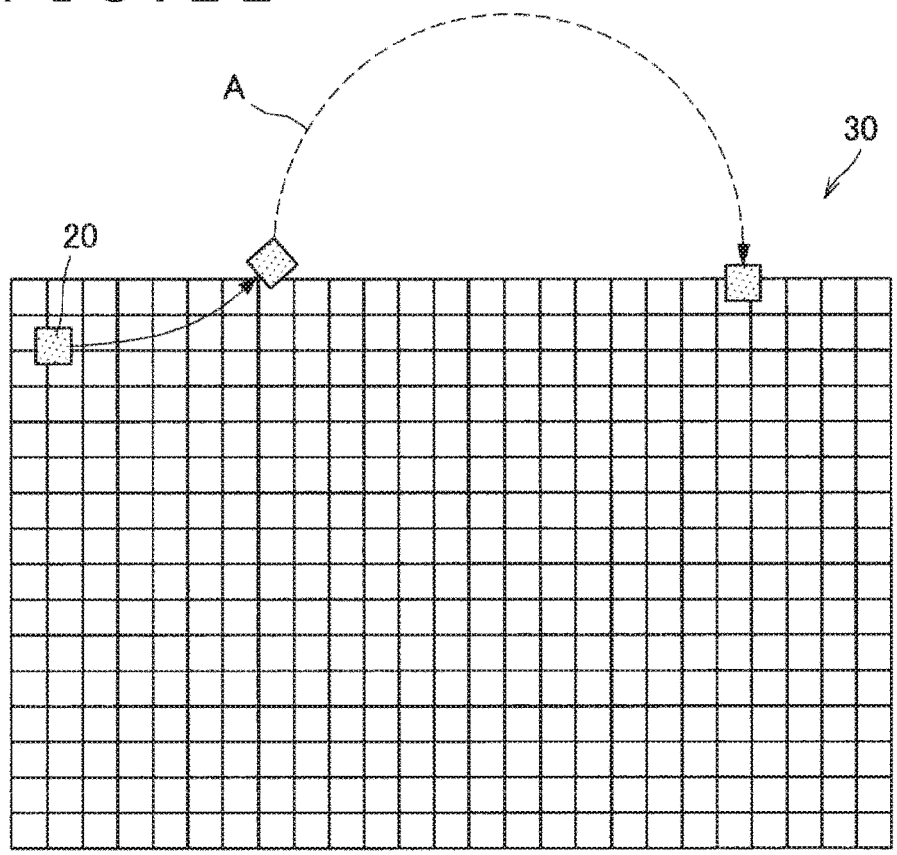
FIG. 22 is a diagram illustrating an example of controlling the movement of the trolley 20 according to the second embodiment.
Figure 23:
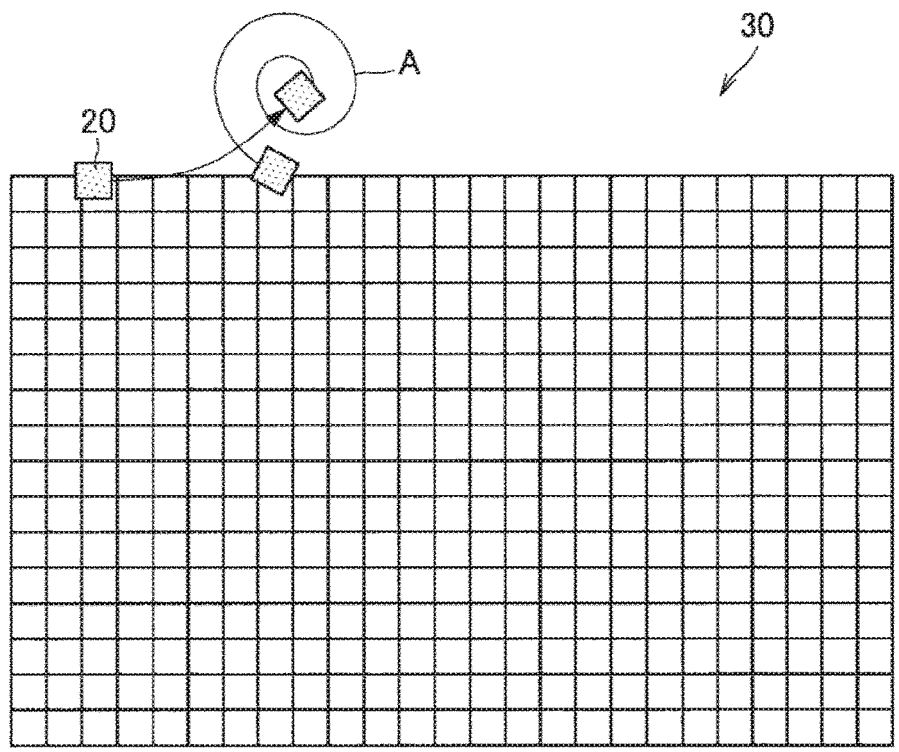
FIG. 23 is a diagram illustrating an example of controlling the movement of the trolley 20 according to the second embodiment.

Alternatively, in the case where the motion control unit 106 determines that the trolley 20 is moved out of the mat 30, the motion control unit 106 may cause the trolley 20 to move forward in an arc shape at a predetermined radius until the trolley 20 can acquire the position information again as indicated by an arrow A in FIG. 22. Alternatively, the motion control unit 106 may cause the trolley 20 to move forward in a spiral shape (with gradually increasing radius, for example) until the trolley 20 can acquire the position information again as indicated by an arrow A in FIG. 23. According to the example of control 2, in a case where, for example, the trolley 20 provided with the toy 40 (for example, a special creature) in a shape that is unnatural to advance forward is positioned out of the mat 30, the trolley 20 can be moved to the mat 30 while giving the user a natural feeling.

3-1-2-3. Example of Control 3

Figure 24:
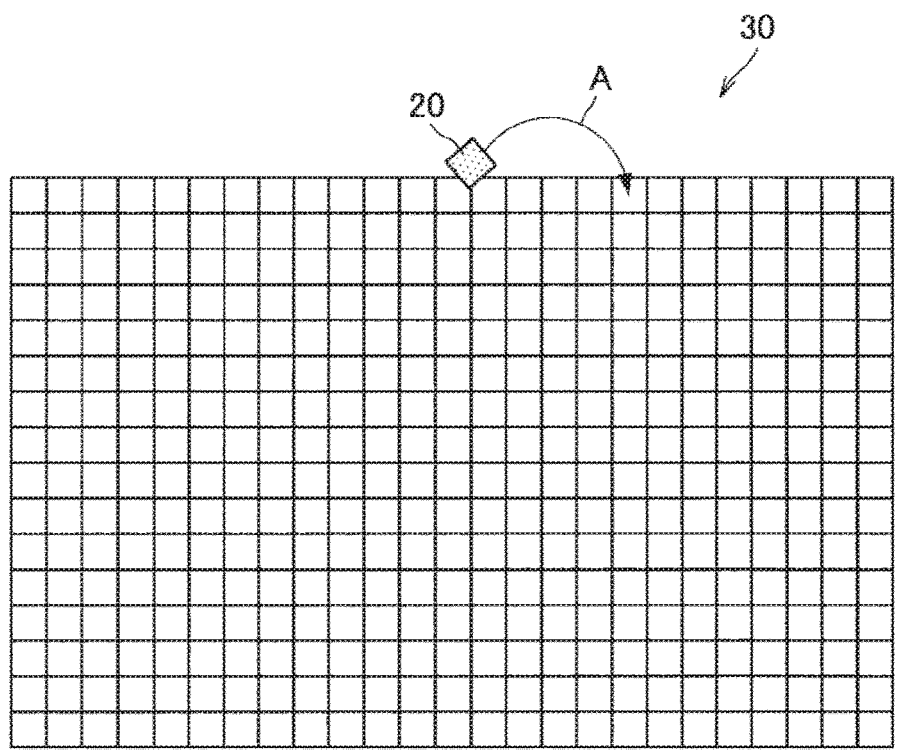
FIG. 24 is a diagram illustrating an example of controlling the movement of the trolley 20 according to the second embodiment.

Alternatively, in the case where the motion control unit 106 determines that the trolley 20 is moved out of the mat 30, the motion control unit 106 may first specify the current positional relationship between the trolley 20 and the mat 30 based on the sensing result of the trolley 20 acquired by the information acquisition unit 102 and then cause the trolley 20 to move according to the specified positional relationship until the trolley 20 can acquire the position information again as indicated by, for example, an arrow A in FIG. 24.

Hereinafter, a specific example of a method of specifying the positional relationship between the trolley 20 and the mat 30 will be described. For example, the motion control unit 106 may specify the current positional relationship between the trolley 20 and the mat 30 based on the history of the value that is sensed by the motor rotation sensor (sensor unit 228) in the trolley 20 and that is acquired by the information acquisition unit 102. For example, the motion control unit 106 may specify the current positional relationship between the trolley 20 and the mat 30 based on the position information lastly acquired by the trolley 20 and based on the history of the sensing result of the number of rotations of the motor in the trolley 20 from the time of the acquisition of the position information by the trolley 20.

Alternatively, the motion control unit 106 may further specify the current positional relationship between the trolley 20 and the mat 30 based on the detection result of the external force detected by the external force detection unit 110. For example, the motion control unit 106 may specify the current positional relationship between the trolley 20 and the mat 30 based on the position information lastly acquired by the trolley 20 and based on the degree of strength of the external force (for example, amount of change in acceleration) detected by the external force detection unit 110.

3-2. Advantageous Effect

As described above, the information processing apparatus 10 according to the second embodiment can appropriately return the trolley 20 to the mat 30 in the case where it is determined that the trolley 20 is moved out of the mat 30. Therefore, even if, for example, the trolley 20 is moved out of the mat 30 during the game, the game can be continued without a problem.

4. Third Embodiment

The second embodiment has been described. Next, a third embodiment will be described. First, the background of creating the third embodiment will be described. As described above, the information processing apparatus 10 and the individual trolleys 20 basically communicate through wireless communication. Therefore, if the connection between the information processing apparatus 10 and the trolley 20 is temporarily cut off, the information processing apparatus 10 cannot control the trolley 20. In addition, the user generally cannot recognize the disconnection of the information processing apparatus 10 and the trolley 20, and the user may become confused.

As described later, according to the third embodiment, the disconnection between the information processing apparatus 10 and the trolley 20 can be reported to the user.

4-1. Trolley 20

4-1-1. Example of Motion 1

Figure 25:
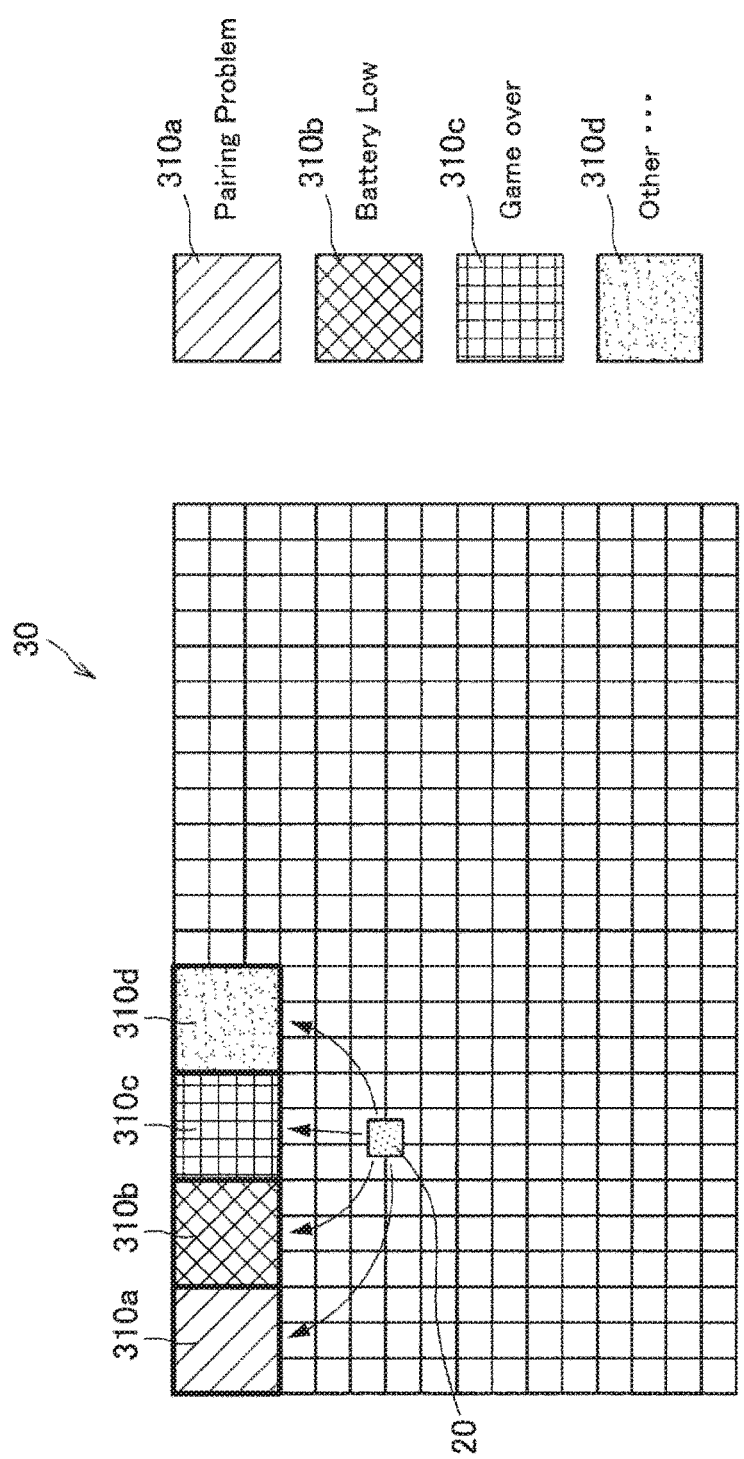
FIG. 25 is a diagram illustrating an example of the movement of the trolley 20 when there is an abnormality according to a third embodiment.

The trolley 20 according to the third embodiment can automatically move to a predetermined area 310 in the mat 30 as illustrated in FIG. 25 in the case where the connection to the information processing apparatus 10 is cut off. Here, the predetermined area 310 may be printed on the mat 30. As illustrated in FIG. 25, not only an area 310a for a problem of pairing, but also, for example, an area 310b for a lack of battery in the trolley 20, an area 310c for game over, an area 310d for other abnormalities, and the like may be printed on the mat 30. Furthermore, for each area 310, an image and a message indicating the type of the area 310 may be printed on the mat 30 in association with the area 310 or may be displayed on the display unit 124 as illustrated in FIG. 25. This allows the user to recognize that there is currently an abnormality or the like and recognize the type of abnormality.

4-1-2. Example of Motion 2

Figure 26:
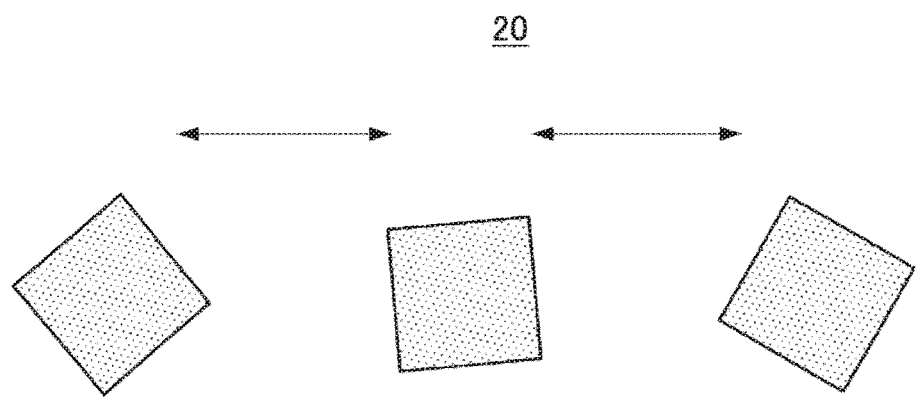
FIG. 26 is a diagram illustrating an example of the movement of the trolley 20 when there is an abnormality according to the third embodiment.

Alternatively, the movement pattern of the trolley 20 and the meaning indicated by the movement pattern may be associated in advance. For example, when the information processing apparatus 10 and the trolley 20 are disconnected, the trolley 20 may automatically move in a movement pattern associated with "disconnection." Alternatively, in a case where the trolley 20 is waiting for an instruction or the like from the information processing apparatus 10, the trolley 20 may automatically move in a ticking motion (like a clock) as illustrated in FIG. 26. Alternatively, when there is a lack of battery in the trolley 20, the trolley 20 may automatically tumble.

4-2. Advantageous Effect

As described above, according to the third embodiment, the disconnection can be reported to the user in the case where the information processing apparatus 10 and the trolley 20 are disconnected.

5. Fourth Embodiment

The third embodiment has been described. Next, a fourth embodiment will be described. First, the background of creating the fourth embodiment will be described.

Figure 27:
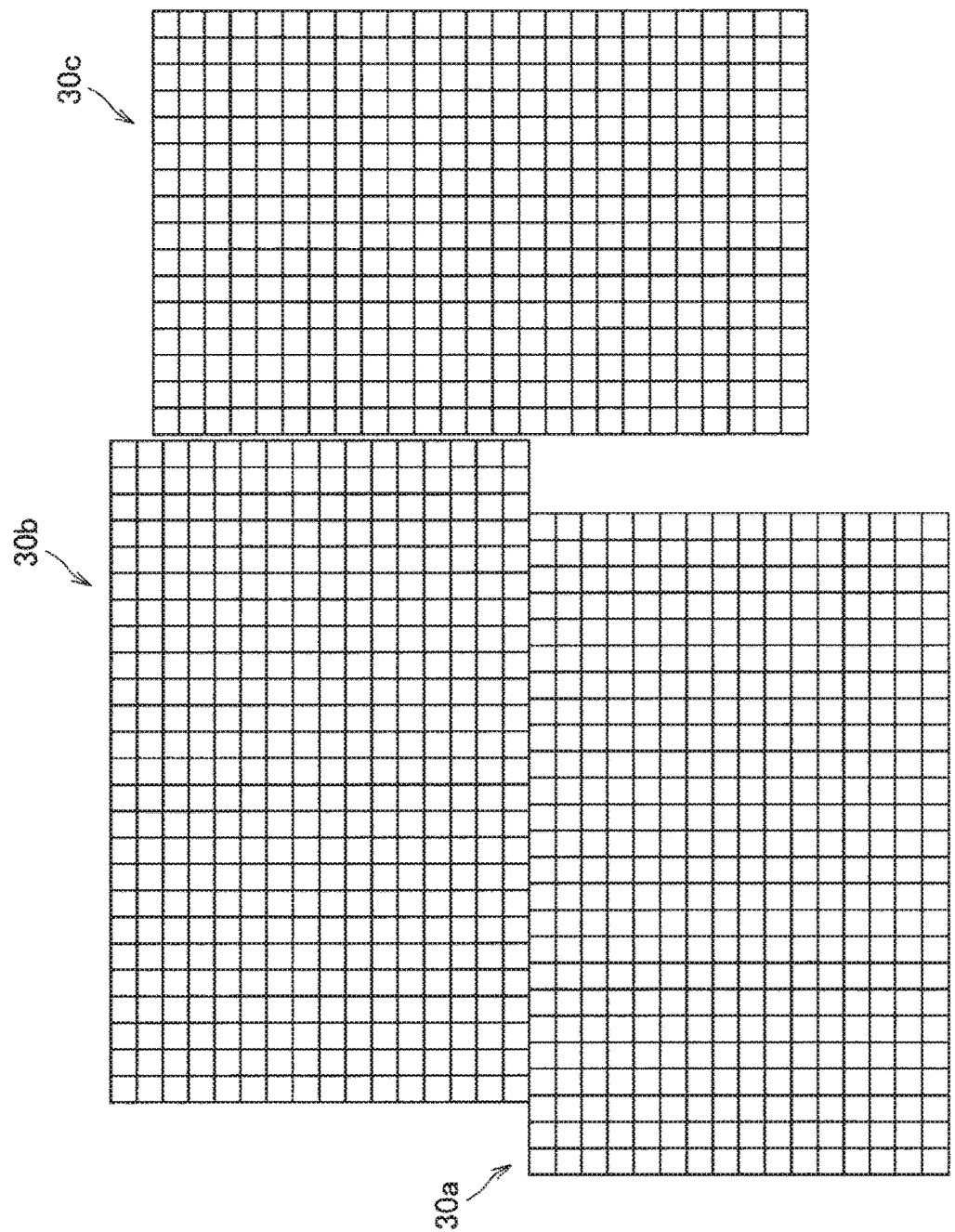
FIG. 27 is a diagram illustrating an example of connecting a plurality of mats 30 according to a fourth embodiment.

Basically, the size of one mat 30 is defined in advance. Therefore, if a plurality of mats 30 can be connected as illustrated, for example, in FIG. 27, the user can freely enlarge the size of the mat 30, and this is desirable.

Figure 28:
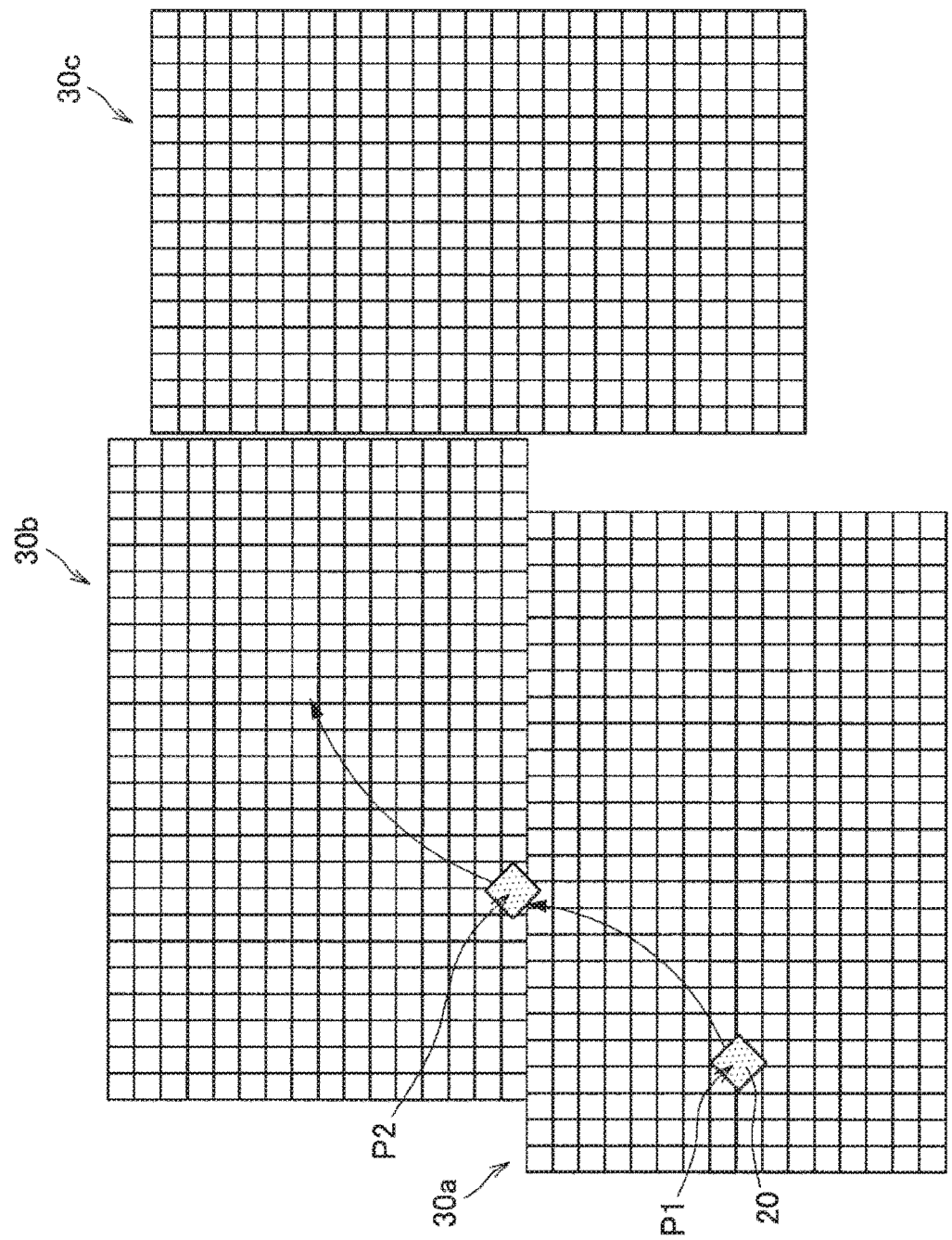
FIG. 28 is a diagram illustrating an example in which the trolley 20 moves on the plurality of connected mats 30.

However, the same position information is basically recorded in the same unit areas in different mats 30. Therefore, when the trolley 20 goes across the mats 30, if the position information recorded in the mat 30 after the movement is used as the position information of the trolley 20, the position of the trolley 20 is falsely recognized. For example, when the trolley 20 moves from an edge of a mat 30a (upper edge illustrated in FIG. 28) to an edge of a mat 30b as indicated by a point P2 in FIG. 28, the trolley 20 reads, from the mat 30b, the same position information as the position information recorded in another edge of the mat 30a (lower edge illustrated in FIG. 28).

As described later, according to a fourth embodiment, the position of the trolley 20 can be accurately specified even in the case where a plurality of mats 30 are connected and the trolley 20 goes across the mats 30.

5-1. Connection of Mats 30

In the fourth embodiment, in the case where the user connects a plurality of mats 30, initial setting may be performed to set the plurality of mats 30 as a group. For example, in the initial setting, the trolley 20 may continuously move through all of the plurality of mats 30, once for each, for example, based on the control of the information processing apparatus 10 or based on the operation of the user. As a result, the information processing apparatus 10 can recognize the plurality of mats 30 as a group.

Figure 29:
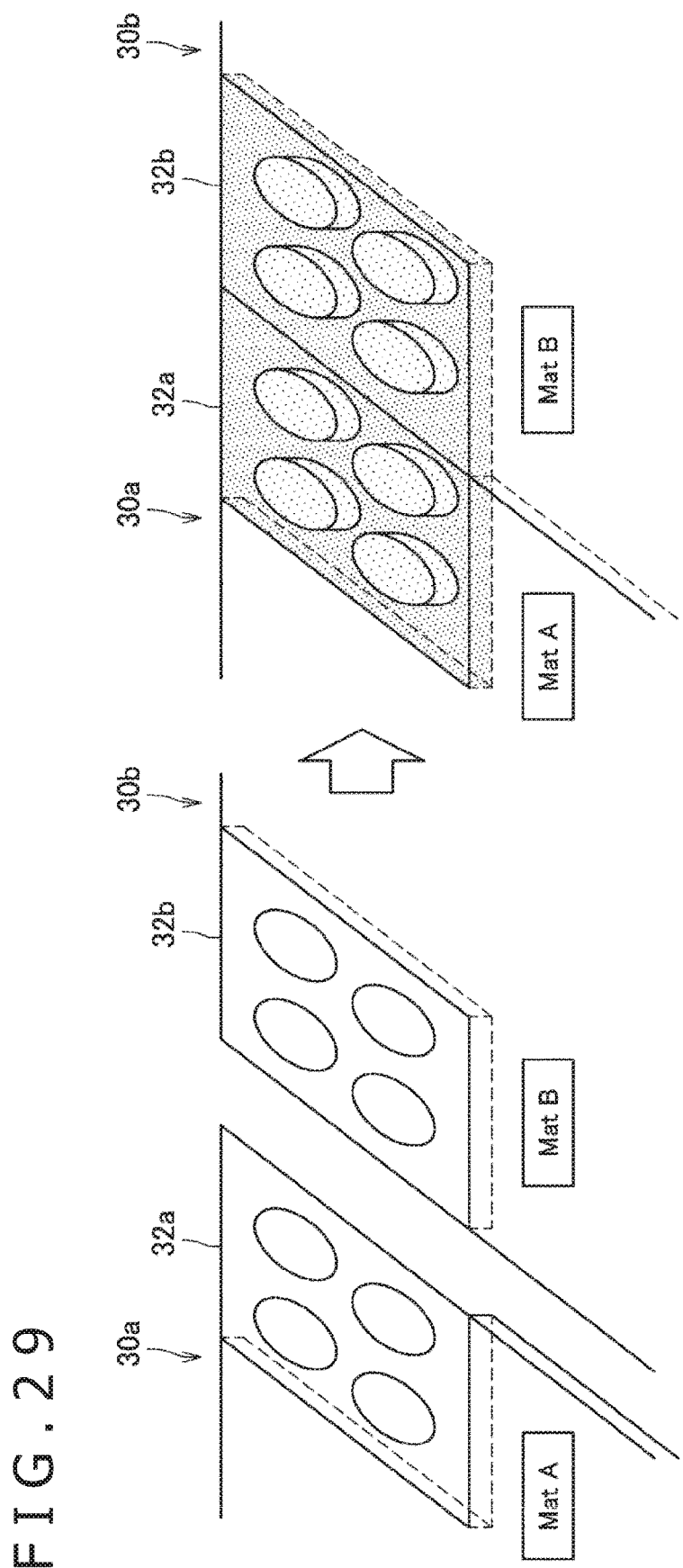
FIG. 29 is a diagram illustrating an example of the structure of corners of the individual mats 30 according to the fourth embodiment.

Note that as illustrated in FIG. 29, it is desirable that individual corners 32 of the individual mats 30 be provided with holes that can be connected by using blocks (Construction set). This allows the user to easily connect and separate the plurality of mats 30 as illustrated in the diagram on the right in FIG. 29.

5-2. Configuration

Next, a configuration according to the fourth embodiment will be described. The constituent elements included in the information processing apparatus 10 according to the fourth embodiment may be the same as in the second embodiment (illustrated in FIG. 20). Hereinafter, only the constituent elements with different functions from the second embodiment will be described.

5-2-1. Control Unit 100

5-2-1-1. Determination of Going Across Mats 30

Example of Determination 1

The control unit 100 according to the fourth embodiment can determine whether or not the trolley 20 has moved to another mat 30 based on the difference between the position information acquired last time and the newly acquired position information and based on the detection result of the external force detection unit 110. For example, in a case where the absolute value of the difference between the position information acquired last time and the newly acquired position information regarding the trolley 20 is greater than a predetermined threshold, and the external force detection unit 110 determines that external force is not applied to the trolley 20, the control unit 100 determines that the trolley 20 has moved to another mat 30. In the example illustrated in FIG. 28, the control unit 100 determines that the trolley 20 has moved from the mat 30a to the mat 30b when the trolley 20 reaches the point P2.

Note that when the control unit 100 determines that the trolley 20 has moved to another mat 30, the information processing apparatus 10 can also specify the positional relationship between two mats 30 (such as an angle between the mats 30) based on the position information acquired last time, the newly acquired position information, and the movement direction of the trolley 20.

Example of Determination 2

Alternatively, the control unit 100 can also determine whether or not the trolley 20 has moved to another mat 30 based on the recognition result for the image taken by the position sensor 228a (sensor unit 228) of the trolley 20. For example, in a case where it is recognized that there is an area (gap) without the mat 30 directly under the position sensor 228a based on the image taken by the position sensor 228a, and it is determined that the width of the gap is within a predetermined range, the control unit 100 may determine that the trolley 20 has moved to another mat 30. Note that whether or not there is a mat 30 directly under the position sensor 228a may be determined based on, for example, the amount of change in the focal length of the position sensor 228a (camera).

5-2-1-2. Determination of Connection to Another Mat 30

Figure 30:
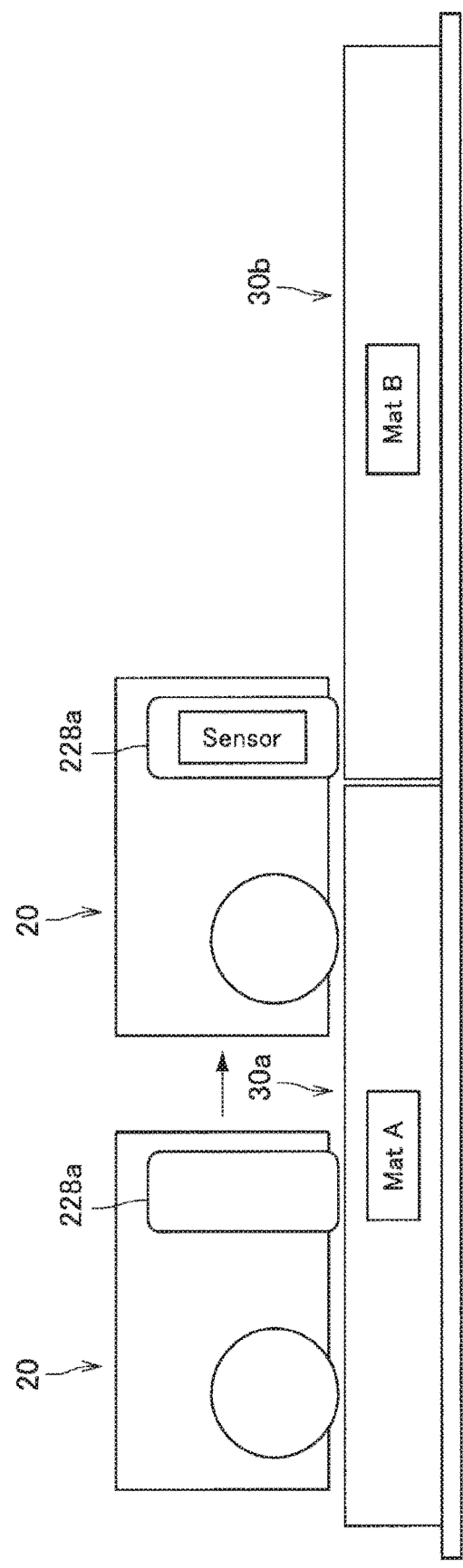
FIG. 30 is a diagram illustrating an example of determining whether a mat 30a and another mat 30b are connected when the trolley 20 is positioned at an edge of the mat 30a according to the fourth embodiment.
Figure 31:
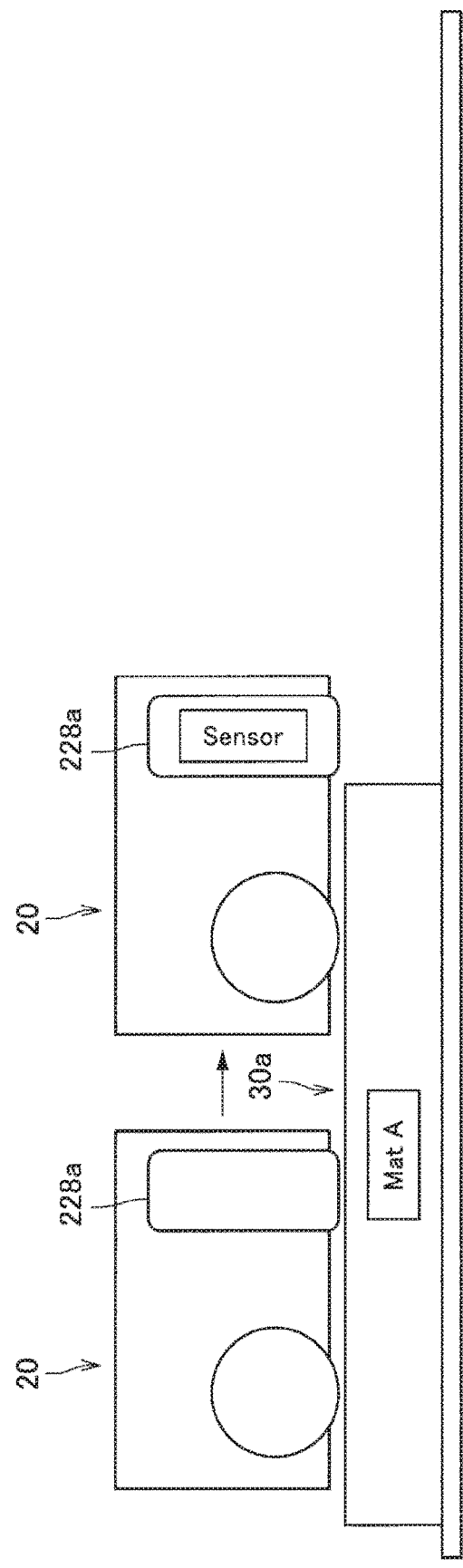
FIG. 31 is a diagram illustrating an example of determining whether the mat 30a and the other mat 30b are connected when the trolley 20 is positioned at the edge of the mat 30a according to the fourth embodiment.

Note that as described above, the position sensor 228a may be positioned at an edge of the trolley 20. Therefore, when the trolley 20 reaches an edge of the mat 30a on which the trolley 20 is moving, the control unit 100 can also specify whether or not the mat 30a is connected to another mat 30b based on the recognition result for the image taken by the position sensor 228a. For example, as illustrated in FIG. 30, the control unit 100 specifies that the mat 30a is connected to another mat 30b in a case where it is recognized that there is another mat 30b directly under the position sensor 228a based on the recognition result for the image taken by the position sensor 228a at the time that the center of the trolley 20 reaches the edge of the mat 30a. In addition, as illustrated in FIG. 31, the control unit 100 specifies that the mat 30a is not connected to another mat 30b in a case where it is recognized that another mat 30b does not exist directly under the position sensor 228a based on the recognition result for the image taken by the position sensor 228a at the time that the center of the trolley 20 reaches the edge of the mat 30a. The example of specification can prevent the trolley 20 from falling off from the mat 30a.

5-3. Advantageous Effect

As described above, according to the fourth embodiment, the movement of the trolley 20 to another mat 30 can be accurately determined when the trolley 20 moves between a plurality of mats 30 in the case where the plurality of mats 30 are connected.

6. Fifth Embodiment

The fourth embodiment has been described. Next, a fifth embodiment will be described. First, the background of creating the fifth embodiment will be described.

Figure 32:
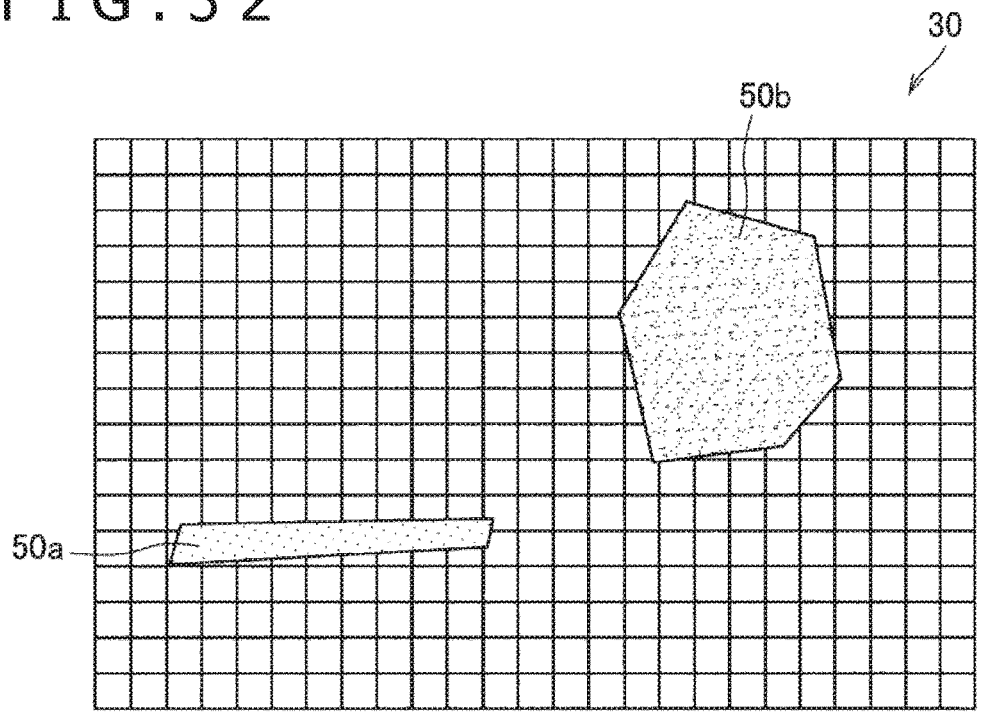
FIG. 32 is a diagram illustrating an example of adding polygons 50 to the mat 30 according to a fifth embodiment.

If the user can add objects of a game (for example, obstacles, zones, items, courses of racing game, and the like) to the existing mat 30, the degree of freedom of the game improves, and this is desirable. For example, as illustrated in FIG. 32, it is desirable that the user can add polygons 50 corresponding to individual objects to the existing mat 30.

As described later, according to the fifth embodiment, the user can freely and easily add objects of a game (for example, obstacles, zones, items, courses of a racing game, and the like) to the existing mat 30.

6-1. Setting of Polygon

6-1-1. Setting Example 1

Figure 33:
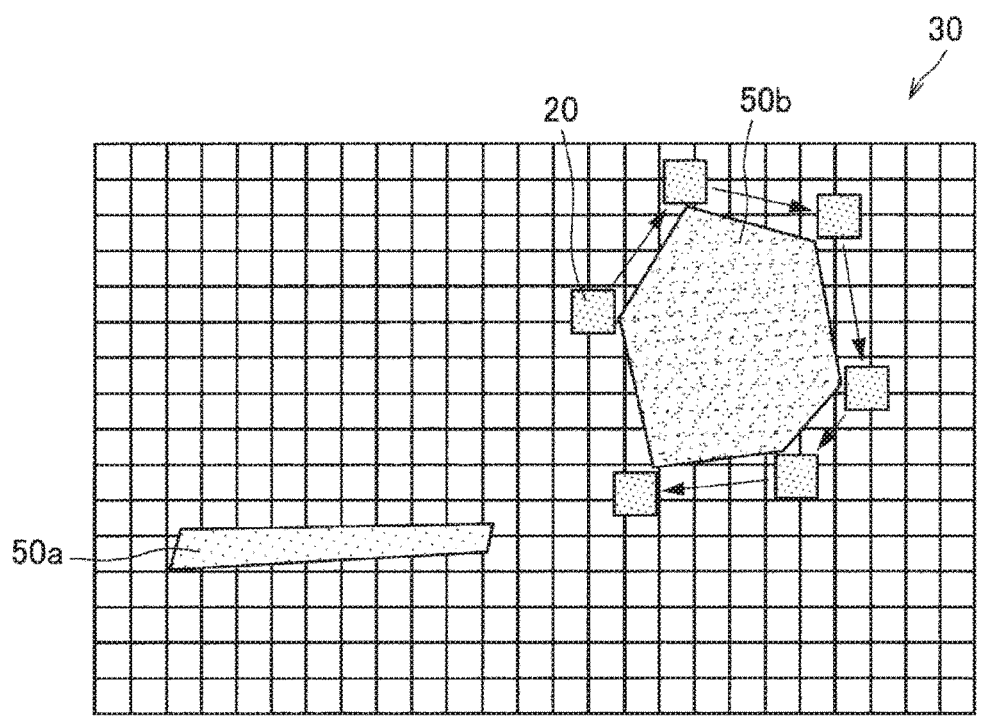
FIG. 33 is a diagram illustrating an example of adding the polygons 50 to the mat 30 according to the fifth embodiment.

First, a setting example of a polygon corresponding to an object according to the fifth embodiment will be described. For example, as illustrated in FIG. 33, the trolley 20 may be moved on the mat 30 to add a polygon 50 corresponding to an object of the game. For example, every time the user presses the switch 222a of the trolley 20, one vertex of the polygon 50 may be added at the same position as or near the position of the trolley 20 at the timing of the press. Alternatively, in a case where the user moves the trolley 20 on the mat 30 while pressing the switch 222a of the trolley 20, the same position as or near the movement trajectory of the trolley 20 may be set as a contour of the polygon 50. Note that the set position information of the polygon 50 may be stored in the storage unit 130.

6-1-2. Setting Example 2

Figure 34:
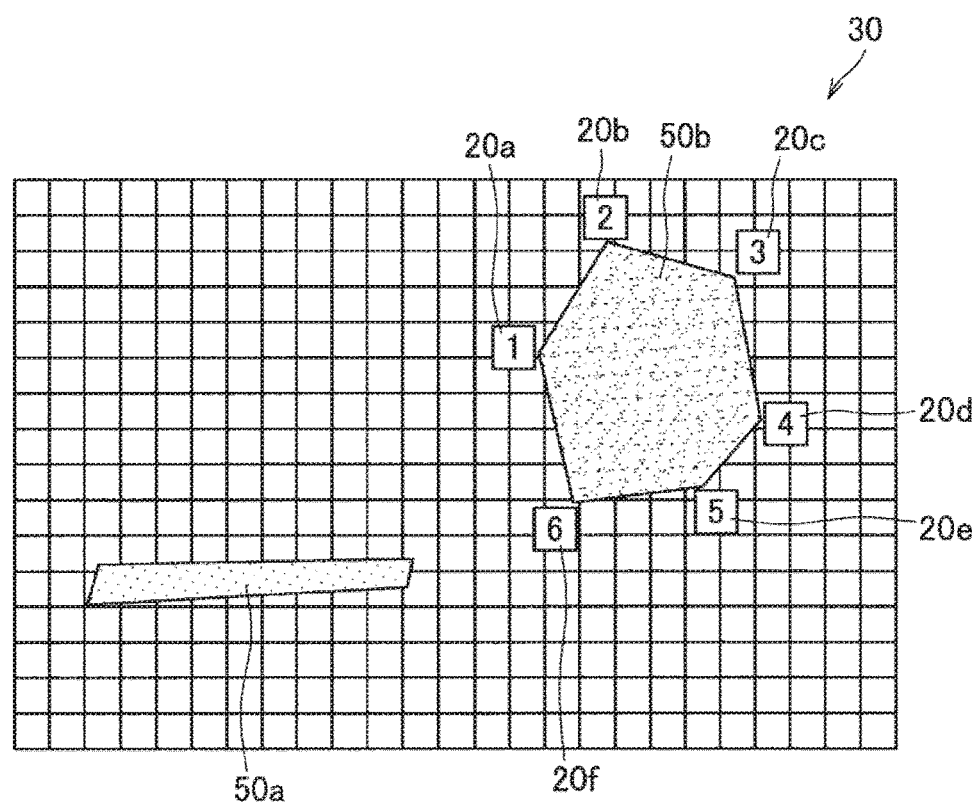
FIG. 34 is a diagram illustrating an example of adding the polygon 50 to the mat 30 according to the fifth embodiment.

Alternatively, as illustrated in FIG. 34, a plurality of trolleys 20 may be arranged on the mat 30 in, for example, a predetermined setting mode. In this case, the same position as or near the position of each of the plurality of trolleys 20 may be set as position information of each vertex of the polygon 50.

Alternatively, a Bezier curve may be formed based on the detection results of the angles the plurality of trolleys 20 arranged on the mat 30 with respect to the mat 30, and then the position and the shape of the polygon 50 may be determined based on the Bezier curve. For example, the angle of each trolley 20 with respect to the mat 30 may be defined as a direction of each line segment of the polygon 50.

6-1-3. Setting Example 3

Figure 35:
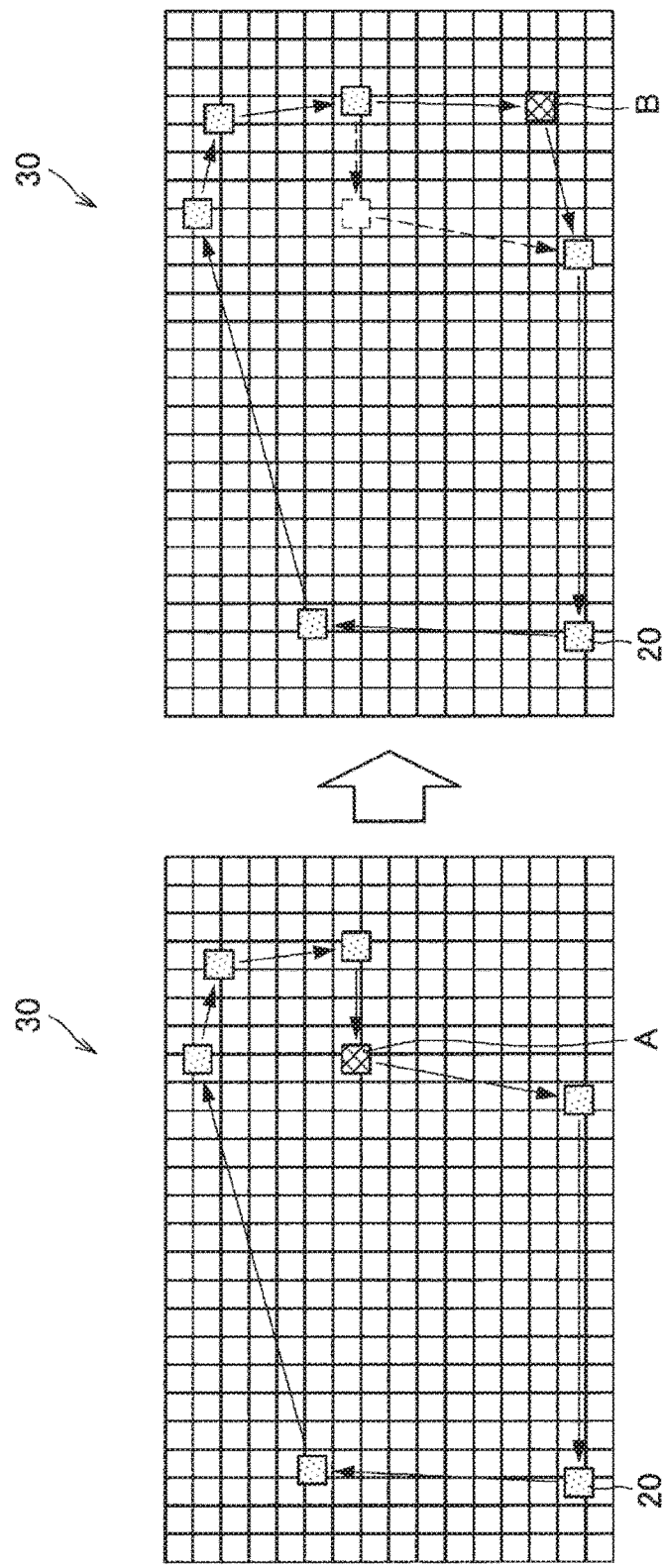
FIG. 35 is a diagram illustrating an example of changing an already set course according to the fifth embodiment.

Alternatively, particularly in a case of a racing game or the like, the user may be able to dynamically change the course once set for the mat 30. For example, as illustrated in the diagram on the left in FIG. 35, the trolley 20 first automatically loops the already set course in a predetermined setting mode. The user then picks up the trolley 20 from the mat 30 when the trolley 20 reaches a position in the course (point A in the example illustrated in FIG. 35) where the user desires to change. Then, as illustrated in the diagram on the right in FIG. 35, once the trolley 20 is placed on a desirable position (point B in the example illustrated in FIG. 35) on the mat 30, the shape of the course may be changed so that the course includes the point B (in place of the point A).

Note that the shape of the course may also be changed in a similar procedure in the case where the course is defined by the Bezier curve. For example, when the trolley 20 is looping the already set course, the user may change the shape of the course by moving the trolley 20 on the mat 30 while pressing the switch 222a of the trolley 20.

Figure 36:
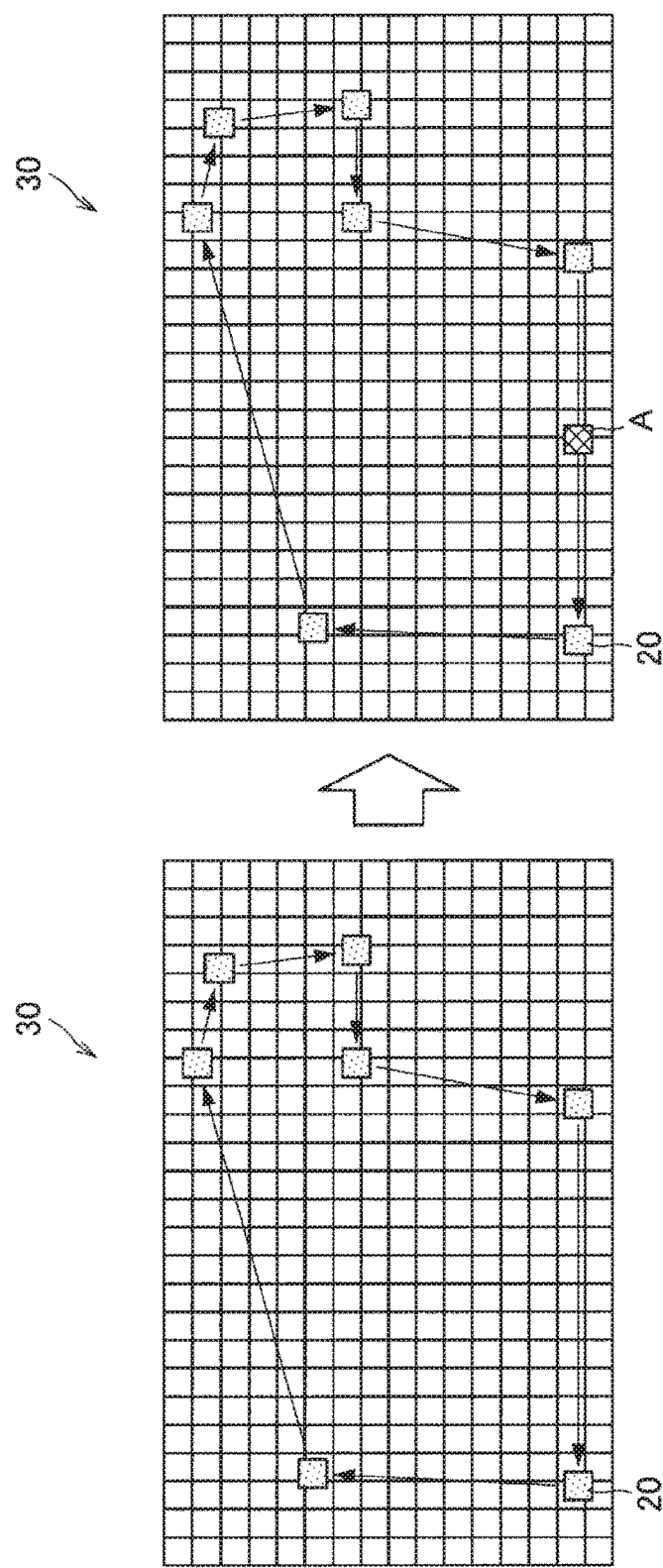
FIG. 36 is a diagram illustrating an example of changing the already set course according to the fifth embodiment.

In addition, as illustrated in FIG. 36, the user may be able to dynamically add a new vertex (or point) to the course once set. For example, as illustrated in the diagram on the left in FIG. 36, the trolley 20 first automatically loops the already set course in a predetermined setting mode. Then, once the user presses the switch 222a of the trolley 20 when the trolley 20 reaches the position (point A in the example illustrated in FIG. 36) where the user desires to add a vertex, a new vertex may be added to the position in the course.

6-1-4. Setting Example 4

6-1-4-1. Paper or Sticker

Alternatively, the user may arrange, on the mat 30, a sheet-like medium recording special information different from the position information to thereby add the polygon 50. Here, the sheet-like medium is an example of a second sheet-like medium according to the present disclosure. The special information may be an array pattern (second array pattern) of a type different from the array pattern printed on the mat 30 and associated with the position information. For example, the second array pattern may be associated with the type of object. Alternatively, the second array pattern may define the control information regarding the motion of the trolley 20. For example, the control information includes information for controlling at least one of the movement speed, the motion pattern, and the rotation motion of the trolley 20. In addition, the area of the second array pattern is basically smaller than the area of the first pattern corresponding to the mat 30.

Figure 37:
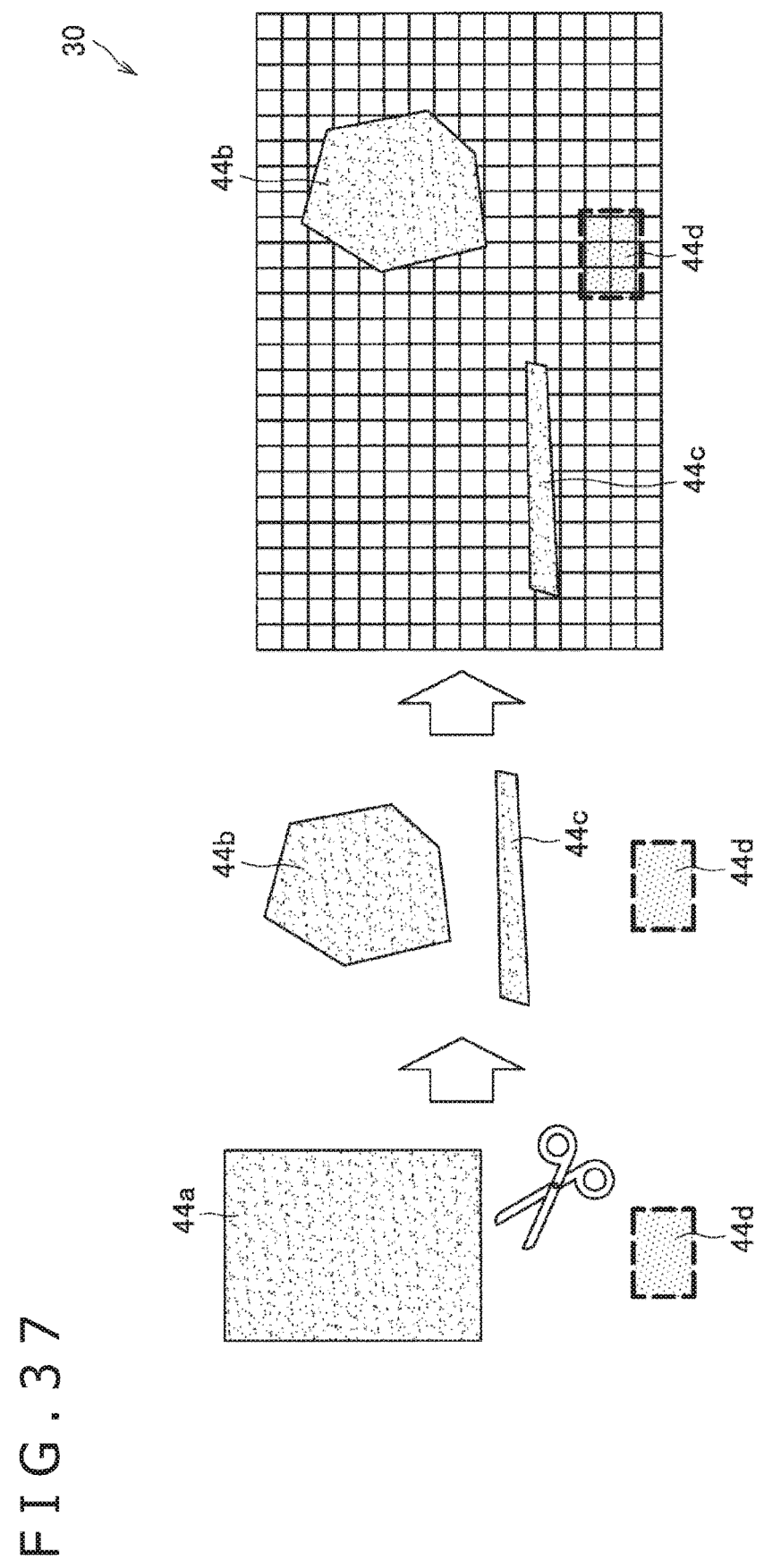
FIG. 37 is a diagram illustrating an example of adding the polygons 50 to the mat 30 according to the fifth embodiment.

The sheet-like medium is, for example, paper, a sticker, or the like. For example, as illustrated in FIG. 37, the user uses scissors or a cutter to cut paper (or sticker) 44a into desirable shapes and then arranges cut paper 44b and paper 44c on desirable positions of the mat 30. As a result, each of the arrangement area of the paper 44b and the arrangement area of the paper 44c in the mat 30 becomes an area recording the special information. For example, when the trolley 20 reaches the arrangement area of the paper 44b or the arrangement area of the paper 44c, the trolley 20 may read the information recorded in the paper 44b or the paper 44c (instead of the position information).

Figure 38:
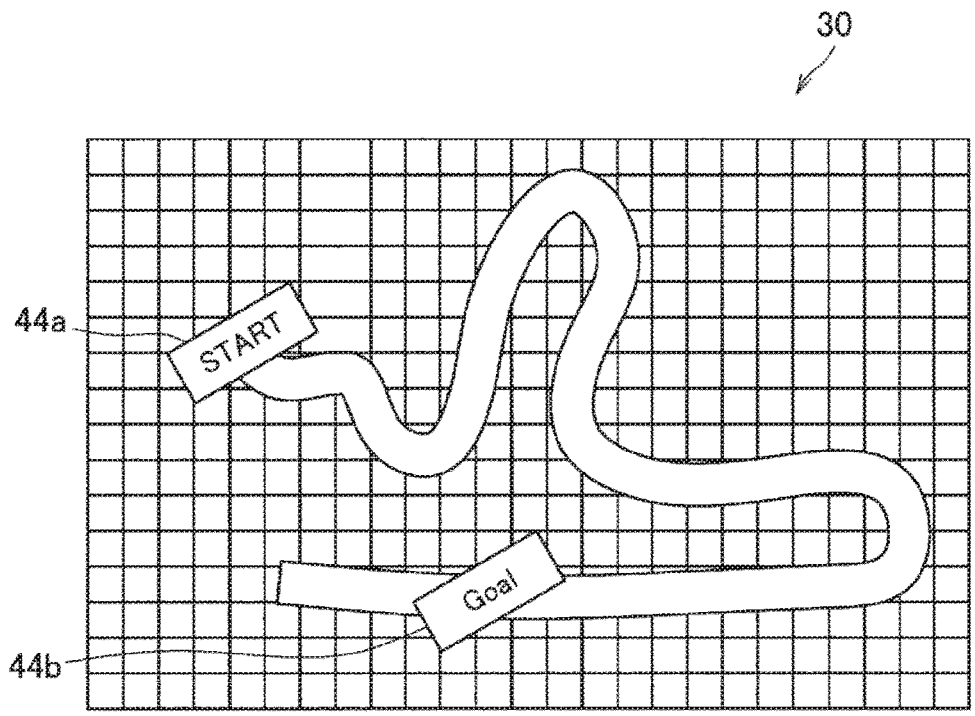
FIG. 38 is a diagram illustrating an example of arranging, on the mat 30, paper 44 recording special information according to the fifth embodiment.

For example, in the case of a racing game, the paper 44a recording the information corresponding to a starting point and the paper 44b recording the information corresponding to a goal are arranged on the mat 30 as illustrated in FIG. 38, and the user can designate the starting point and the goal in the racing game.

Figure 39:
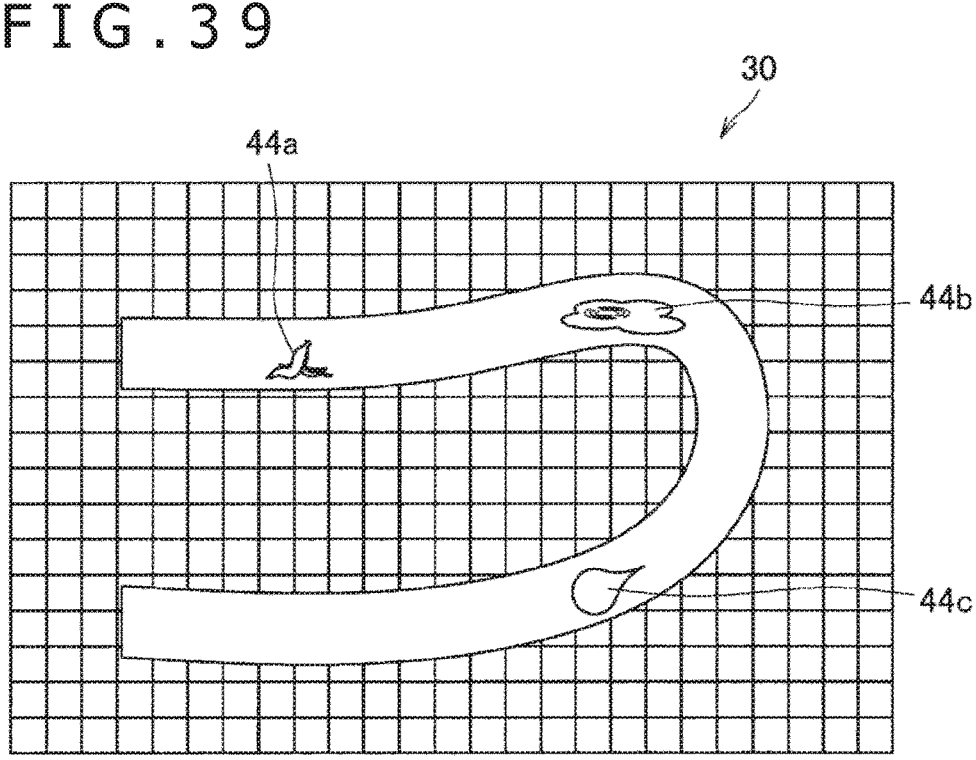
FIG. 39 is a diagram illustrating an example of arranging, on the mat 30, the paper 44 recording the special information according to the fifth embodiment.

Alternatively, as illustrated in FIG. 39, pieces of paper 44 recording information indicating various items (such as banana, ice, oil, puddle, and the like) may be arranged in the course of the racing game. In this case, in a case where the trolley 20 reaches the pieces of paper 44, the motion control unit 106 may control the movement of the trolley 20 to spin. Alternatively, pieces of paper recording information of special items for increasing or decreasing the speed of the trolley 20 may be further arranged in the course.

Alternatively, in a case of a role-playing game (RPG), paper recording information indicating a treasure chest, paper recording information indicating a trap, and the like may be arranged on the mat 30.

6-1-4-2. Transparent Sticker

Furthermore, for example, an infrared filter or the like can be used to create a transparent sticker 44 recording the special information. As illustrated in FIG. 37, the transparent sticker 44 can be arranged on the mat 30 to add the special information to the mat 30 without reducing the visibility of the image on the background (that is, image printed on the mat 30).

6-1-4-3. Calculation of Position Information

Figure 40:
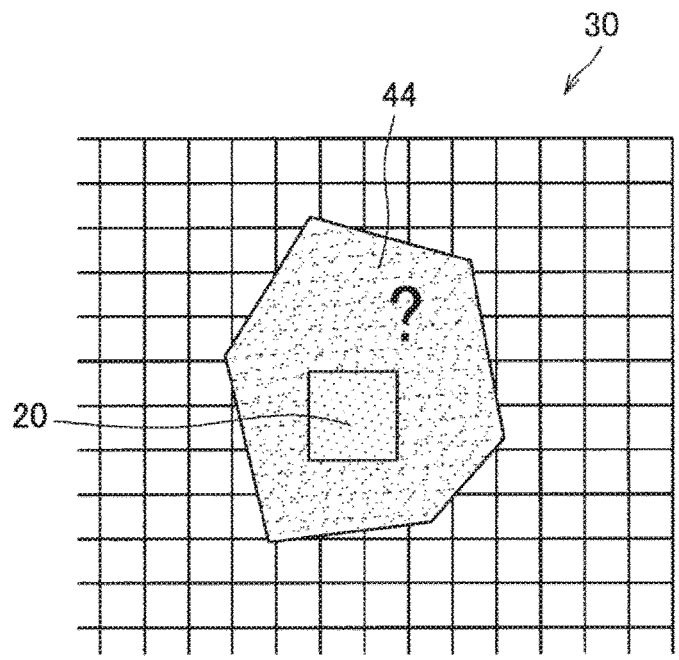
FIG. 40 is a diagram illustrating an example in which the trolley 20 is positioned on the paper 44.

Note that as illustrated in FIG. 40, when the trolley 20 moves on the sheet-like medium 44 recording the special information, the trolley 20 temporarily cannot acquire the position information (because the mat 30 is covered by the sheet-like medium 44). Therefore, the information processing apparatus 10 cannot recognize the position information of the trolley 20.

Thus, when the position information is not received from the trolley 20, the information acquisition unit 102 may virtually specify the current position information of the trolley 20 based on the position information lastly received from the trolley 20 and a sensing result of another type received from the trolley 20. For example, the information acquisition unit 102 may virtually specify the current position information of the trolley 20 based on the position information lastly received from the trolley 20 and the history of the sensing result of the number of rotations of the motor in the trolley 20 from the time of the acquisition of the position information by the trolley 20.

6-2. Advantageous Effect

As described above, according to the fifth embodiment, the user can freely and easily add objects of a game (for example, obstacles, zones, items, courses of a racing game, and the like) to the existing mat 30.

7. Sixth Embodiment

The fifth embodiment has been described. Next, a sixth embodiment will be described. As described later, according to the sixth embodiment, a plurality of mats 30 can be used to realize a role playing game (RPG).

7-1. Configuration of Book

Figure 41:
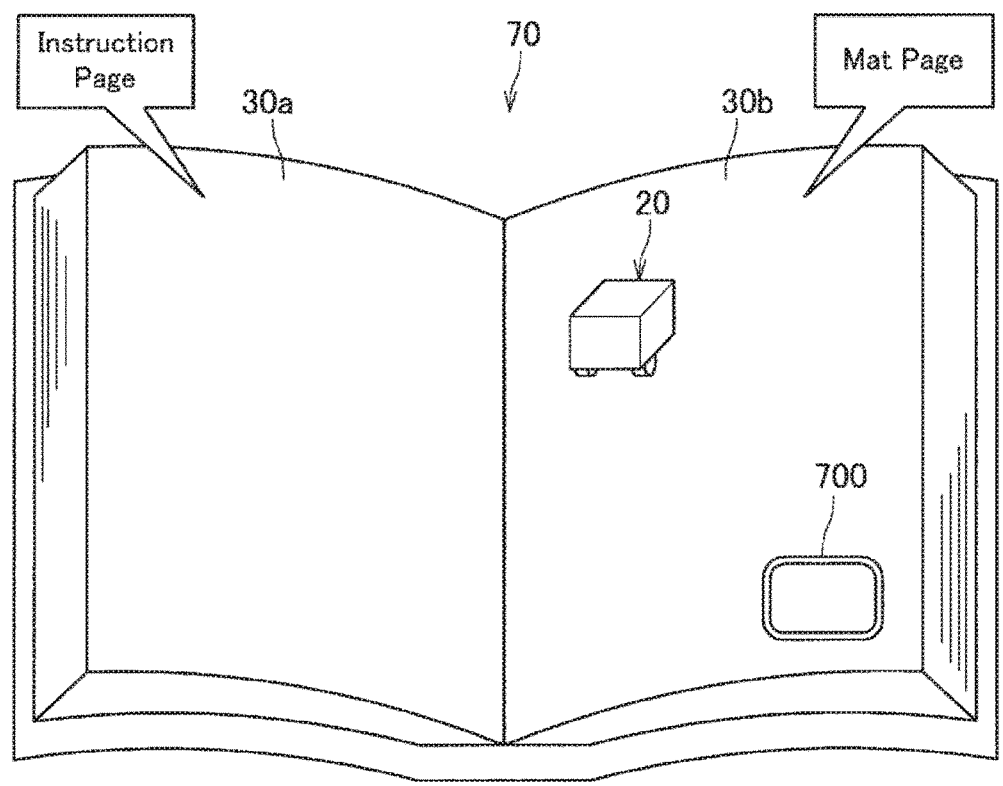
FIG. 41 is a diagram illustrating an example of a book 70 including a plurality of mats 30 according to a sixth embodiment.

In the sixth embodiment, each page is provided by the mat 30 to form a book 70 as illustrated in FIG. 41. For example, as illustrated in FIG. 41, explanation may be written on each page on the left included in the book 70, and a game page may be written on each page on the right. For example, a transition to "page 22" may be instructed when a predetermined event has failed, and a transition to "page 50" may be instructed when the game is cleared. In this way, for example, a book 70 titled "Choose your own adventure" may be formed. The user can turn pages and repeat moving the trolley 20 on the turned pages to enjoy the RPG.

Furthermore, as illustrated in FIG. 41, holes 700 may be formed on edges of part or all of the pages (mats 30). As a result, when the trolley 20 moving on a page is dropped into the hole 700 in the page, the user can easily turn the page to the destination page.

Figure 42:
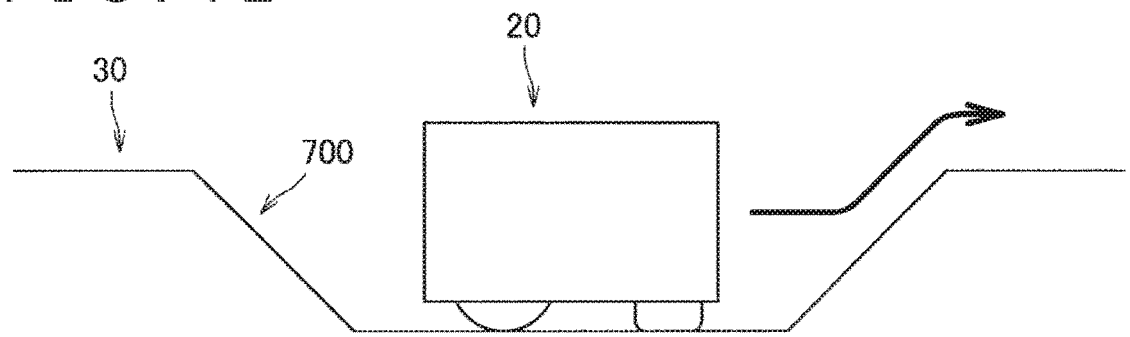
FIG. 42 is a diagram illustrating an example of the movement of the trolley 20 from a hole in the mat 30 according to the sixth embodiment.

Furthermore, as illustrated in FIG. 42, it is desirable to provide an inclination around the hole 700. As a result, when the page is turned, the trolley 20 can be easily moved (escaped) from the hole 700 in the turned page.

8. Seventh Embodiment

Figure 43:
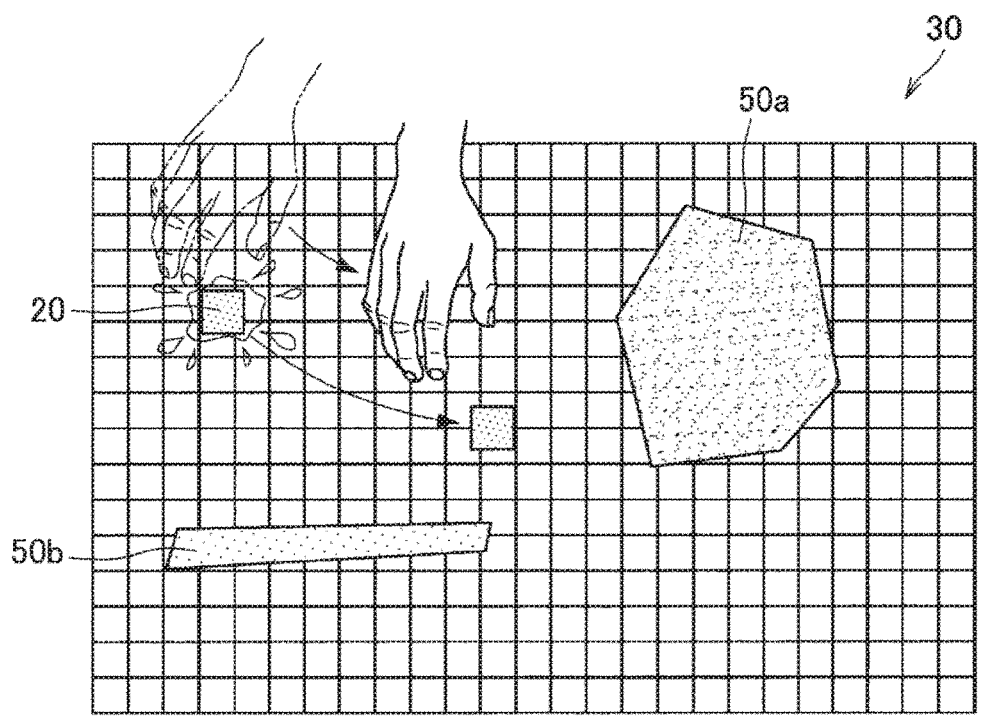
FIG. 43 is a diagram illustrating a problem of a seventh embodiment.

The sixth embodiment has been described. Next, a seventh embodiment will be described. First, the background of creating the seventh embodiment will be described. Some users may cheat or disturb the opponents in games. For example, as illustrated in FIG. 43, some users may touch or move their trolleys 20 or the trolleys 20 of the opponents without permission. Therefore, it is desirable to be able to appropriately determine the cheating.

As described later, according to the sixth embodiment, whether or not there is cheating can be appropriately determined.

8-1. Configuration

Next, a configuration according to the seventh embodiment will be described. The constituent elements included in the information processing apparatus 10 according to the seventh embodiment may be the same as in the second embodiment (illustrated in FIG. 20). Hereinafter, only the constituent elements with different functions from the second embodiment will be described.

8-1-1. External Force Detection Unit 110

In a case where the external force detection unit 110 according to the seventh embodiment detects application of external force to the trolley 20, the external force detection unit 110 can further determine whether the external force is generated by a human hand or by another object (for example, an object placed on the mat 30). For example, the external force detection unit 110 determines that the external force is generated by a human hand in a case where the external force detection unit 110 determines that the movement direction of the trolley 20 specified from the value sensed by the acceleration sensor (sensor unit 228) in the trolley 20 and the movement direction specified from the value sensed by the motor rotation sensor (sensor unit 228) in the trolley 20 are opposite. A specific example of the case includes a case in which although the motor in the trolley 20 tries to move backward, the trolley 20 is actually moved backward by the human hand.

8-2. Advantageous Effect

As described above, according to the seventh embodiment, whether or not there is cheating for the trolley 20 during the game can be appropriately determined.

9. Eighth Embodiment

The seventh embodiment has been described. Next, an eighth embodiment will be described. First, the background of creating the eighth embodiment will be described. It is also desirable that the user can select a desired game from a plurality of types of games. It is also desirable that the user can intuitively select the desired game.

As described later, according to the eighth embodiment, the user can intuitive select the desired game from a plurality of types of games.

9-1. Configuration

Figure 44:
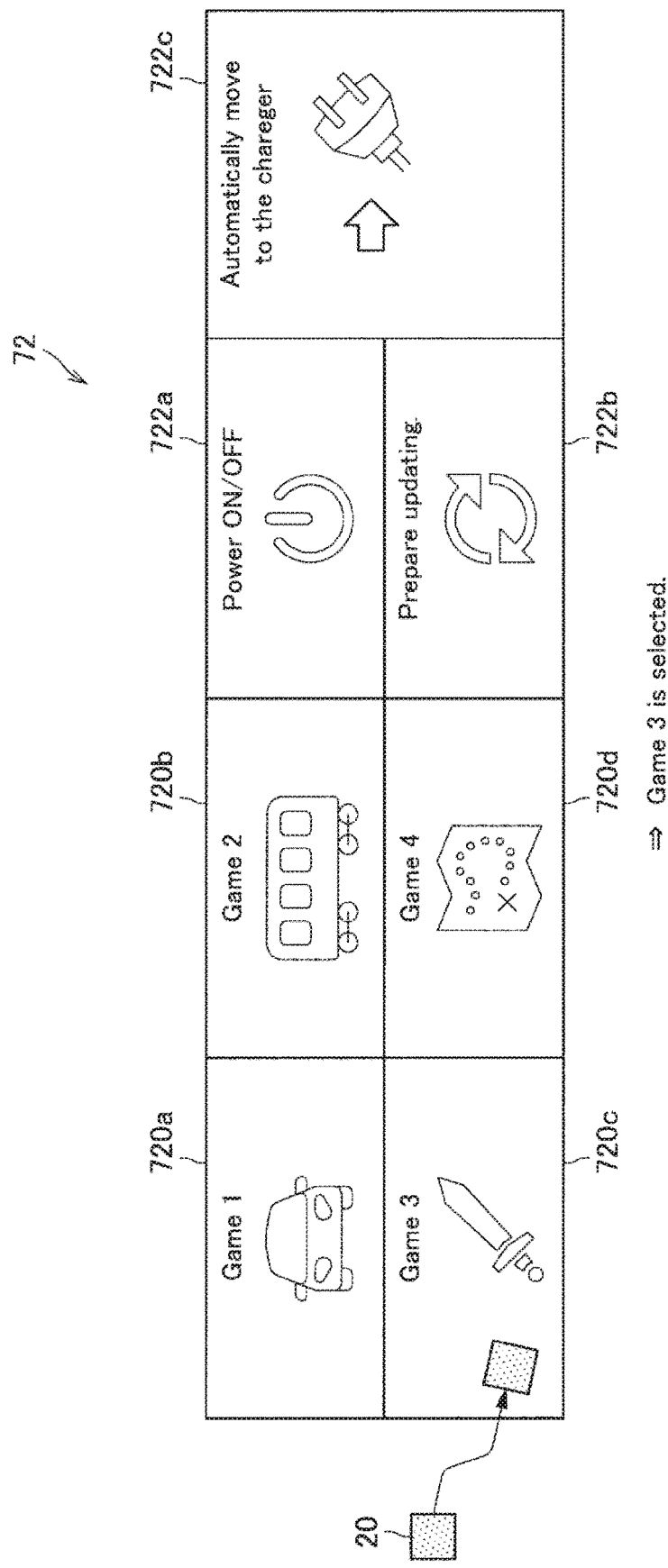
FIG. 44 is a diagram illustrating an example of a game selection menu according to an eighth embodiment.

In the eighth embodiment, paper 72 provided with a printed "game selection menu" as illustrated in FIG. 44 may be used. The game selection menu may include a plurality of game selection areas 720 and a plurality of selection areas 722 for other functions. Information (such as array pattern) corresponding to the area may be recorded in each of the game selection areas 720 and the selection areas 722 for other functions, and the trolley 20 may be capable of reading the information.

For example, in a case where the user puts the trolley 20 positioned outside of the paper 72 on a selection area 720c of a game 3 as illustrated in FIG. 44, the trolley 20 may read the information recorded in the area 720c, and the information processing apparatus 10 may receive the information from the trolley 20 to specify that the "game 3" is selected. The information processing apparatus 10 may then start the "game 3."

Alternatively, the trolley 20 may automatically move on the paper 72 based on a predetermined algorithm (for example, random selection of a game). In this case, the information processing apparatus 10 may receive the information read by the trolley 20 from the paper 72 at the position where the trolley 20 is stopped, and the information processing apparatus 10 may specify that the game corresponding to the information is selected.

Furthermore, as illustrated in FIG. 44, the selection areas 722 for other functions include, for example, a power ON/OFF switch area 722a, an application update area 722b, a charge start area 722c, a volume adjustment area 722d, and the like. For example, in a case where the trolley 20 is placed on the power ON/OFF switch area 722a, the information processing apparatus 10 may switch the ON/OFF of the power of the trolley 20 (and/or the information processing apparatus 10). Alternatively, in a case where the trolley 20 is placed on the application update area 722b, the information processing apparatus 10 may start to update, for example, a predetermined application stored in the information processing apparatus 10 (for example, through a communication network such as the Internet). Alternatively, in a case where the trolley 20 is placed on the charge start area 722c, the information processing apparatus 10 may move the trolley 20 to a predetermined charging station. Note that the "game selection menu" may be printed on a specific mat 30 instead of the paper 72.

9-2. Advantageous Effect

As described above, according to the eighth embodiment, the user can intuitively and easily select the desired game among the plurality of types of games.

10. Ninth Embodiment

Figure 45:
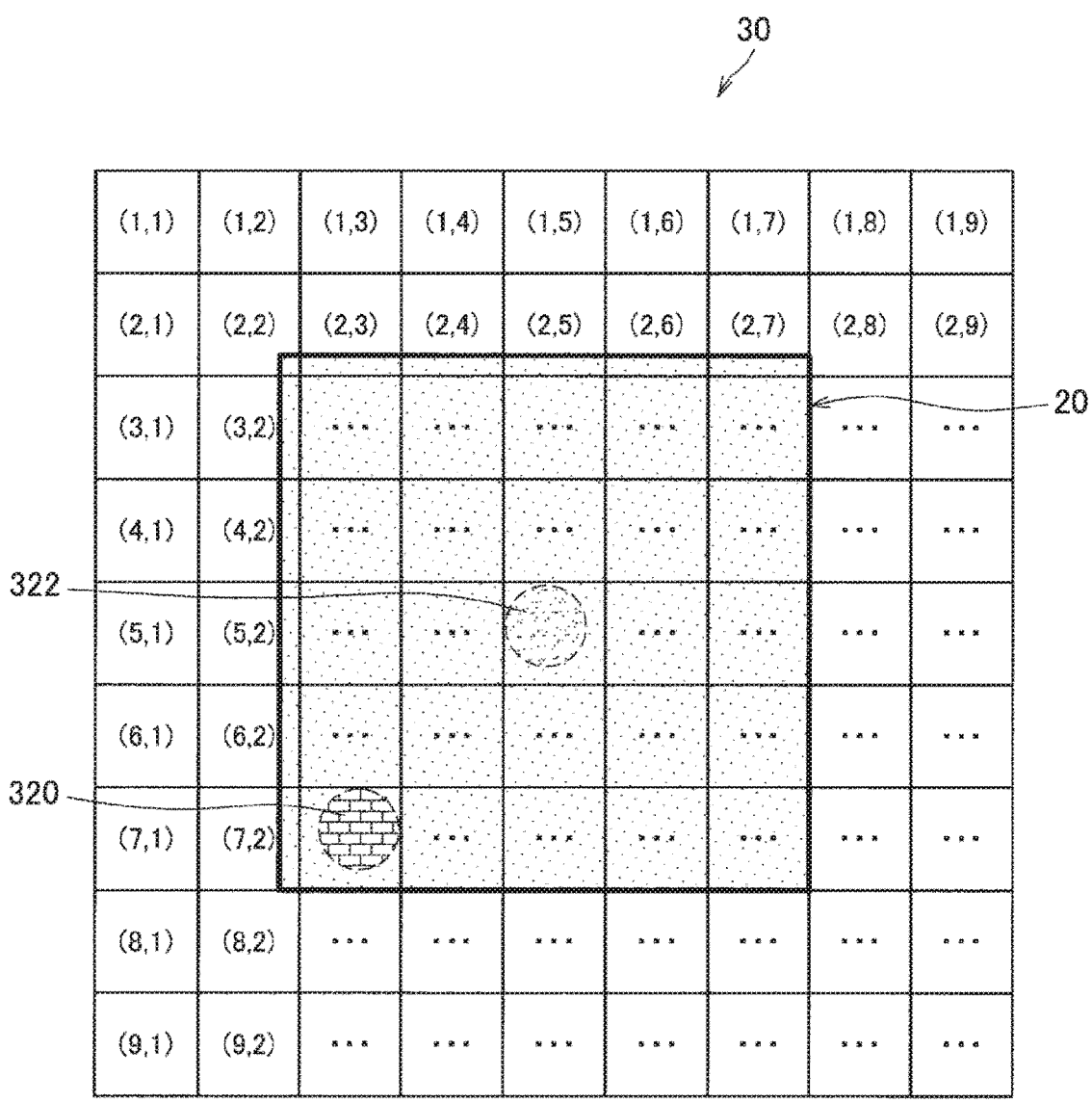
FIG. 45 is a diagram illustrating a problem of a ninth embodiment.

The eighth embodiment has been described. Next, a ninth embodiment will be described. First, the background of creating the ninth embodiment will be described. As described with reference to FIG. 2 and the like, the position sensor 228a (of the trolley 20) may be attached apart from the center of the trolley 20 in the horizontal direction due to, for example, a mechanical or electrical reason. Therefore, the position information read by the trolley 20 from the mat 30 and the position information corresponding to the center of the trolley 20 may significantly vary. For example, in an example illustrated in FIG. 45, position information 320 corresponding to the position sensor 228a is (7, 3), while position information 322 corresponding to the center of the trolley 20 is (5, 5). Therefore, the position information of the trolley 20 recognized by the information processing apparatus 10 and the position information of the trolley 20 recognized by the user may significantly vary, and, for example, the user may become confused or may feel inconvenient during the game.

As described later, according to the ninth embodiment, the position information corresponding to the substantial center of the trolley 20 can be specified based on the position information sensed by the trolley 20.

10-1. Configuration

Figure 46:
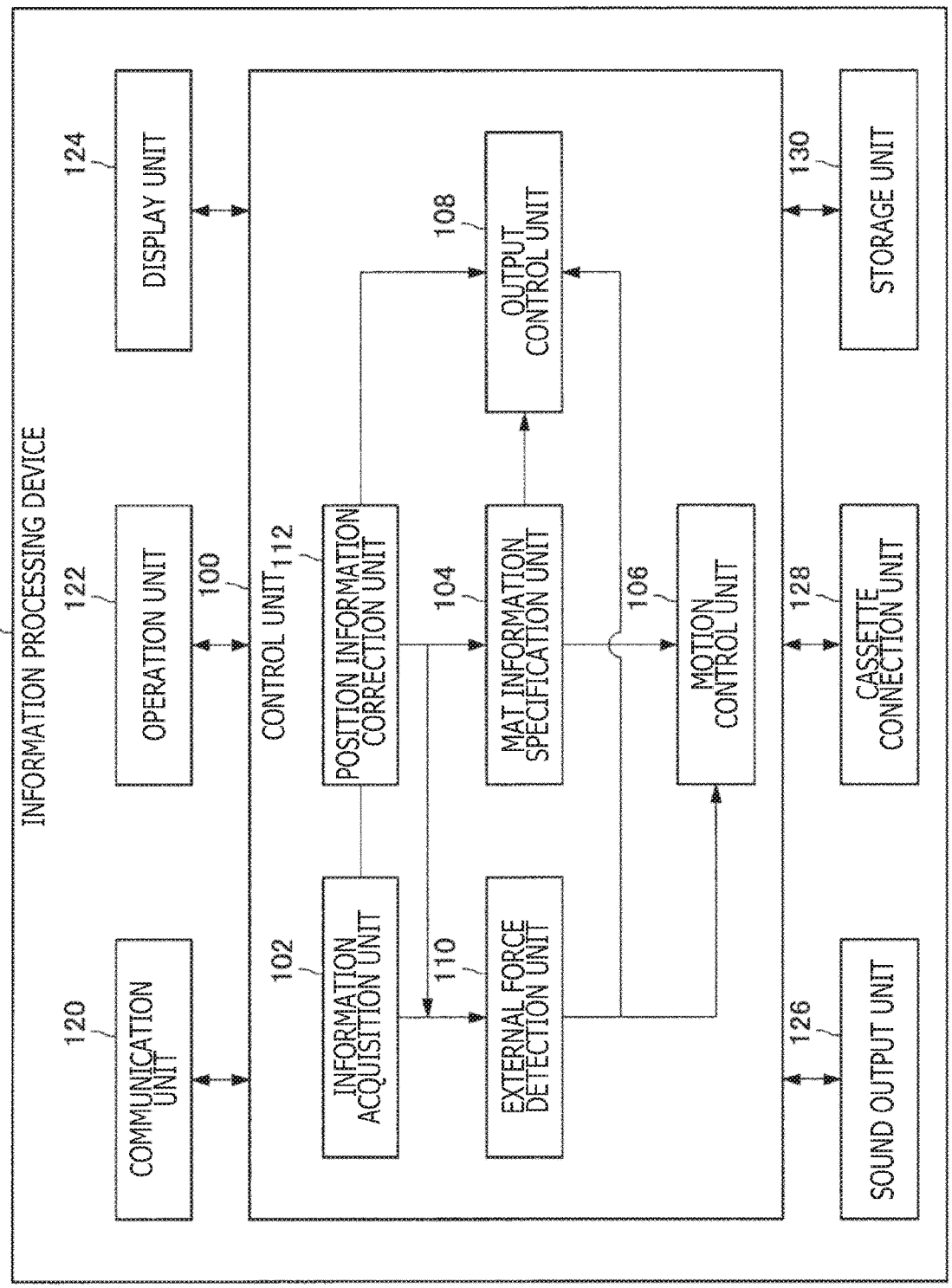
FIG. 46 is a functional block diagram illustrating a configuration example of the information processing apparatus 10 according to the ninth embodiment.

Next, a configuration according to the ninth embodiment will be described. FIG. 46 is a functional block diagram illustrating a configuration example of the information processing apparatus 10 according to the ninth embodiment. As illustrated in FIG. 46, compared to the second embodiment (illustrated in FIG. 20), the information processing apparatus 10 according to the ninth embodiment further includes a position information correction unit 112. Hereinafter, only the constituent elements with different functions from the second embodiment will be described.

10-1-1. Position Information Correction Unit 112

Figure 47:
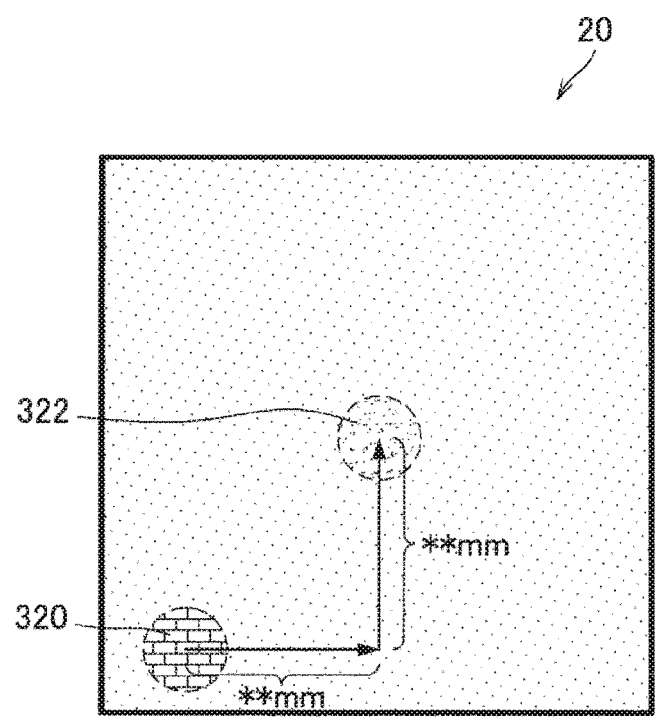
FIG. 47 is a diagram illustrating an example of specifying position information of a substantial center of the trolley 20 according to the ninth embodiment.
Figure 48:
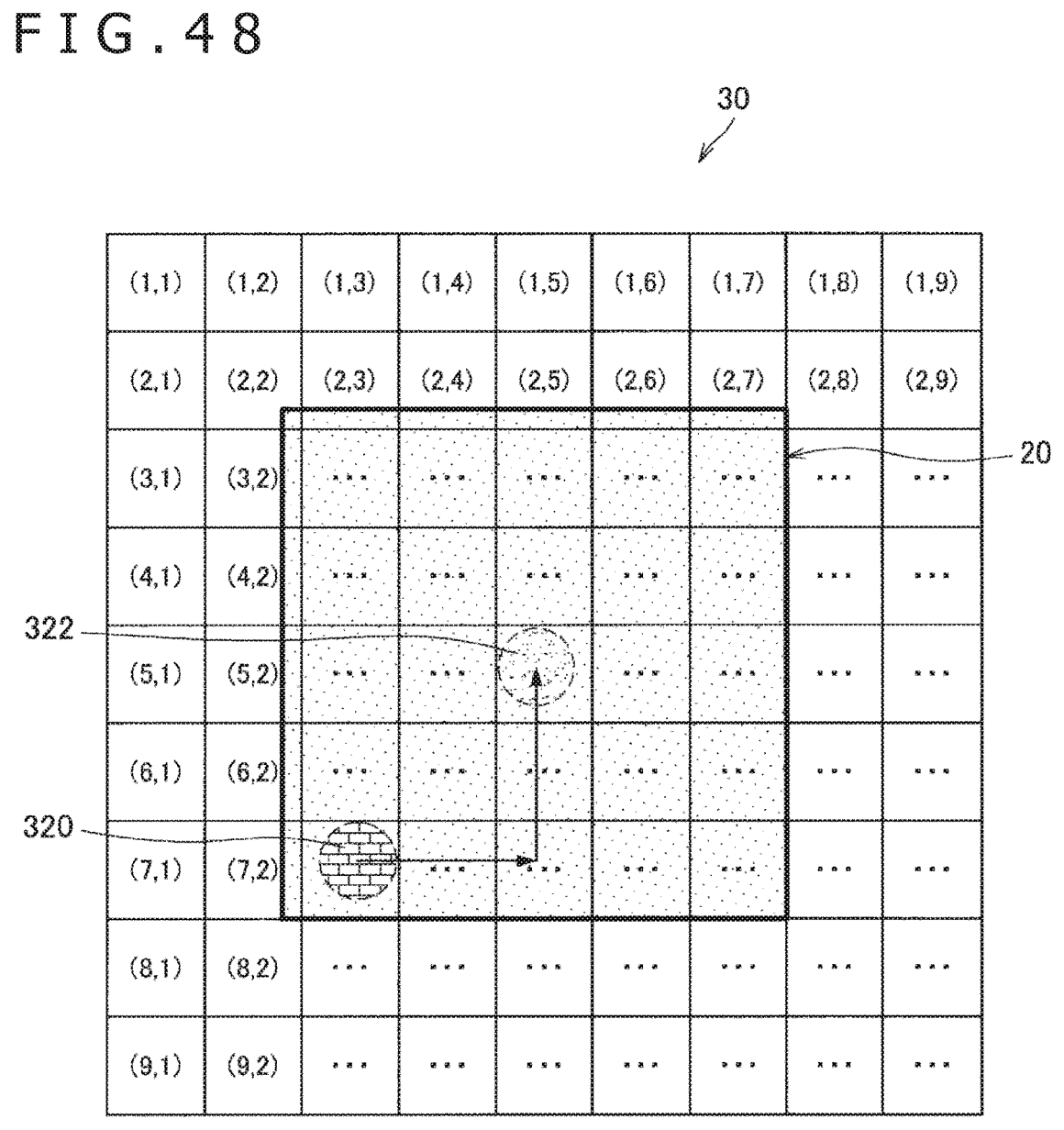

The position information correction unit 112 corrects the position information acquired from the trolley 20 based on the attachment position of the position sensor 228a on the trolley 20. For example, the position information correction unit 112 corrects the position information acquired from the trolley 20 to the position information that is specified from the attachment position of the position sensor 228a and that corresponds to the substantial center of the trolley 20. For example, as illustrated in FIG. 47, the distances in the x-direction and the y-direction between the attachment position of the position sensor 228a and the center point of the trolley 20 may be specified in advance at, for example, the design of the trolley 20. In this case, as illustrated in FIG. 48, the position information correction unit 112 first uses the distance in the x-direction between the attachment position of the position sensor 228a and the center point of the trolley 20 to correct the x-coordinate acquired from the trolley 20 and then uses the distance in the y-direction between the attachment position of the position sensor 228a and the center point of the trolley 20 to correct the y-coordinate acquired from the trolley 20. As a result, the position information corresponding to the substantial center of the trolley 20 is acquired.

10-1-2. Motion Control Unit 106

The motion control unit 106 according to the ninth embodiment controls the motion of the trolley 20 based on the position information of the trolley 20 corrected by the position information correction unit 112.

10-2. Advantageous Effect

As described above, the information processing apparatus 10 according to the ninth embodiment corrects the position information acquired from the trolley 20 to the position information corresponding to the substantial center of the trolley 20. Therefore, the position information of the trolley 20 recognized by the information processing apparatus 10 and the position information of the trolley 20 recognized by the user become substantially the same, and the user can play the game without a problem.

11. Tenth Embodiment

The ninth embodiment has been described. Next, a tenth embodiment will be described. First, the background of creating the tenth embodiment will be described. For example, when the numbers of operation units 122 and trolleys 20 used in the same environment are large, the user may not be able to recognize the correspondence between the individual operation units 122 and the individual trolleys 20. In addition, the user may not be able to recognize the trolley 20 to be operated by the user among the plurality of trolleys 20. As a result, the user may mistake another trolley 20b for the trolley to be operated by the user and operate the trolley 20b (for example, the user may arbitrarily place the toy 40 on the other trolley 20b).

As described later, according to the tenth embodiment, the user can easily associate the individual operation units 122 and the individual trolleys 20.

11-1. Pairing

In the tenth embodiment, as illustrated in FIG. 49, special information (such as array patterns) may be printed on the individual operation units 122, or sheet-like media (such as paper and stickers) recording the special information may be pasted on the individual operation units 122. In this case, when the user brings the trolley 20 close to or into contact with the area 44 including the printed special information (or the area including the pasted sheet-like medium recording the special information), the trolley 20 may read the special information and then transmit the read information to the information processing apparatus 10. The information processing apparatus 10 may then pair the operation unit 122 and the trolley 20 based on the received information.

11-2. Output Control Unit 108

For each set of the paired trolley 20 and operation unit 122, the output control unit 108 according to the eleventh embodiment may cause the display unit 224 (such as LED) of the trolley 20 and a display unit (such as LED and LCD) installed on the operation unit 122 to emit light in the same color or in the same blink pattern.

11-3. Advantageous Effects

As described above, according to the eleventh embodiment, the user can easily associate the individual operation units 122 and the individual trolleys 20. Furthermore, the correspondence between the individual operation units 122 and the individual trolleys 20 can be reported to the user.

12. Eleventh Embodiment

The tenth embodiment has been described. Next, an eleventh embodiment will be described. First, the background of creating the eleventh embodiment will be described. It is also desirable to be able to use a plurality of trolleys 20 arranged on the mat 30 to realize a soccer game.

Incidentally, in well-known robot soccer games, the ball is often recognized based on recognition of images captured by cameras. However, the cameras and the image recognition system may increase the design cost.

Furthermore, one user can operate only one robot player in many cases. Therefore, there can be a method in which a computer automatically controls the movement of the other robot players. In this case, it is desirable that the other robot players can be appropriately operated during the game.

As described later, according to the eleventh embodiment, a plurality of trolleys 20 arranged on the mat 30 can be used to inexpensively realize the soccer game.

12-1. Game Platform

First, a game platform according to the eleventh embodiment will be described with reference to FIG. 50. As illustrated in FIG. 50, at least two player trolleys 20 and a ball trolley 24 may be arranged on the mat 30. The player trolleys 20 may be normal trolleys 20 (described above). As described later, the ball trolley 24 may be a trolley in a special shape.

As illustrated in FIG. 50, the toy 40 in a shape of a player may be arranged on the player trolley 20. A toy 40c in a shape of a ball may be arranged on the ball trolley 24. For example, the user moves the player trolley 20 to cause the toy 40 on the player trolley 20 to collide with the toy 40c on the ball trolley 24. In this way, as described later, the ball trolley 24 may be physically moved or may be moved by the control of the information processing apparatus 10 according to the collision. In addition, as illustrated in FIG. 50, an illustration of a soccer field may be printed on the mat 30.

12-1-1. Ball Trolley 24

Figure 51:
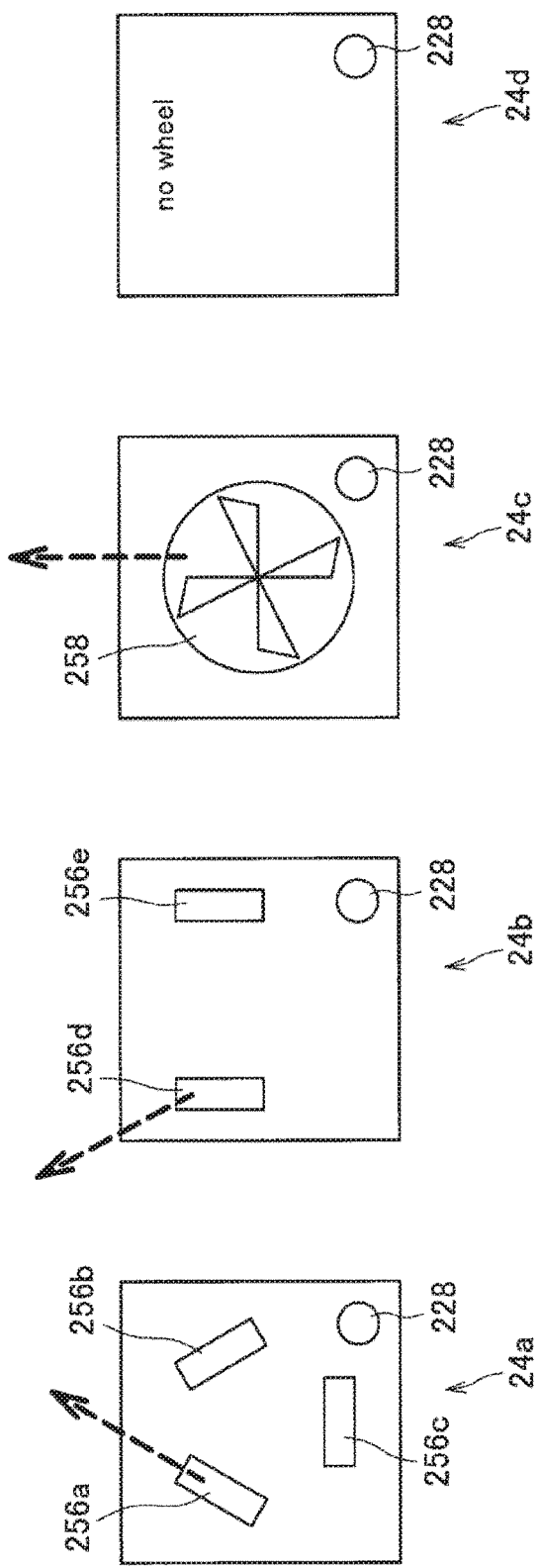
FIG. 51 is an example of bottom views of a ball trolley 24 according to the eleventh embodiment.

FIG. 51 is an example of bottom views of the ball trolley 24. As in a ball trolley 24a and a ball trolley 24b illustrated in FIG. 51, a plurality of omni wheels 256 may be installed on the bottom surface of the ball trolley 24. In this way, the ball trolley 24 can smoothly move in an arbitrary direction.

Alternatively, as in a ball trolley 24c illustrated in FIG. 51, a fan 258 may be installed on the bottom surface of the ball trolley 24, and the ball trolley 24 may be able to hover based on the rotation of the fan 258. For example, when the ball trolley 24 is floating, the information processing apparatus 10 forces the rotation of the fan 258 of the ball trolley 24 to stop. As a result, the ball trolley 24 falls down, and a movement of a bounding ball can be realized.

Alternatively, as in a ball trolley 24d illustrated in FIG. 51, the wheels and the like may not be installed on the bottom surface of the ball trolley 24, and a predetermined paint may be applied to reduce the coefficient of friction of the bottom surface. As a result, when the player trolley 20 collides with the ball trolley 24, the ball trolley 24 may slide on the mat 30.

12-2. Configuration

Next, a configuration according to the eleventh embodiment will be described. The constituent elements included in the information processing apparatus 10 according to the eleventh embodiment may be the same as in the ninth embodiment (illustrated in FIG. 46). Hereinafter, only the constituent elements with different functions from the ninth embodiment will be described.

12-2-1. Motion Control Unit 106

12-2-1-1. Controlling Player Trolley 20

For example, for each player trolley 20 associated with the operation unit 122, the motion control unit 106 according to the eleventh embodiment causes the player trolley 20 to move based on the operation of the user on the operation unit 122 associated with the player trolley 20. The motion control unit 106 further controls the motion of the individual player trolleys 20 not associated with the operation units 122 based on the position information acquired from the ball trolley 24 and based on, for example, a predetermined algorithm, results of machine learning, or the like.

Figure 52:
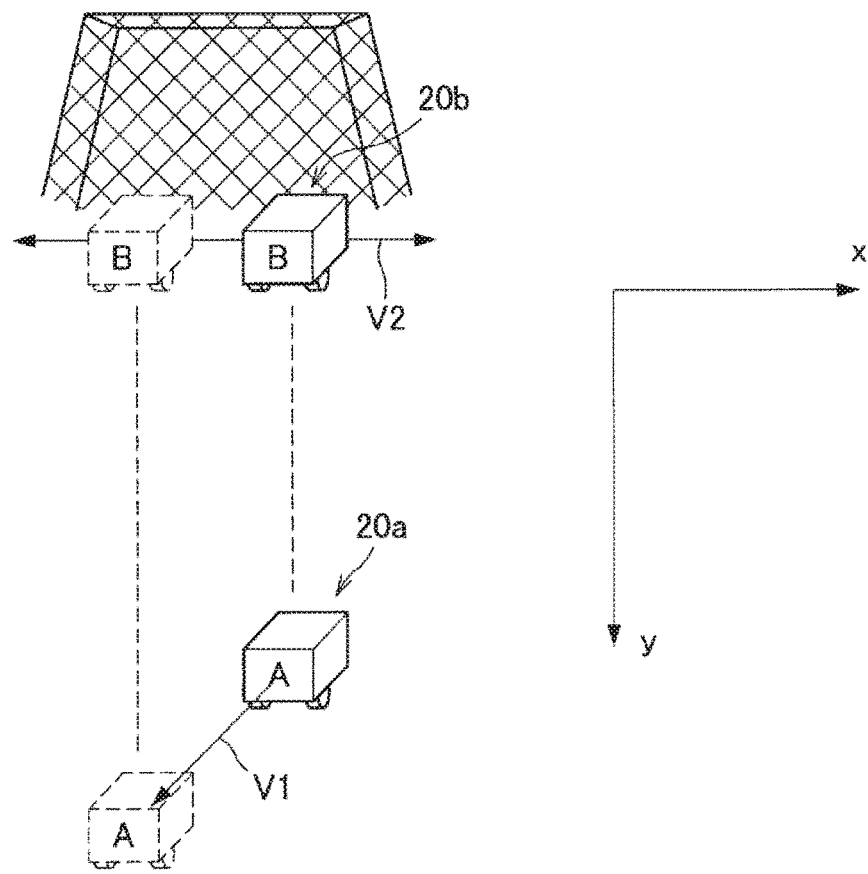
FIG. 52 is a diagram illustrating an example of controlling the motion of a player trolley 20 according to the eleventh embodiment.

In an example illustrated in FIG. 52, it is assumed that there is no user operating the player trolley 20b, and the role of a goalkeeper is set for the player trolley 20b. In this case, the motion control unit 106 may follow the movement of the player trolley 20a equivalent to an offensive player of the opponent to move the player trolley 20b only in one direction (x-direction in the example illustrated in FIG. 52). That is, the motion control unit 106 may successively move the player trolley 20b such that the x-coordinate of the player trolley 20b is always approximately the same as the x-coordinate of the player trolley 20a.

12-2-1-2. Controlling Ball Trolley 24

The motion control unit 106 can further control the motion of the ball trolley 24 according to a detection result of collision of the player trolley 20 with the ball trolley 24. For example, the motion control unit 106 causes the ball trolley 24 to move at a distance, a movement direction, and a speed according to a sensing result of the position of collision, the direction of position, the acceleration at collision, and the like of the player trolley 20 with respect to the ball trolley 24. This can move the ball trolley 24 as if the ball trolley 24 is actually kicked.

Alternatively, the information processing apparatus 10 may not control the movement of the ball trolley 24 (as described above). In this case, when the player trolley 20 collides with the ball trolley 24, the ball trolley 24 physically moves on the mat 30 according to the collision.

12-2-2. Control Unit 100

Figure 53:
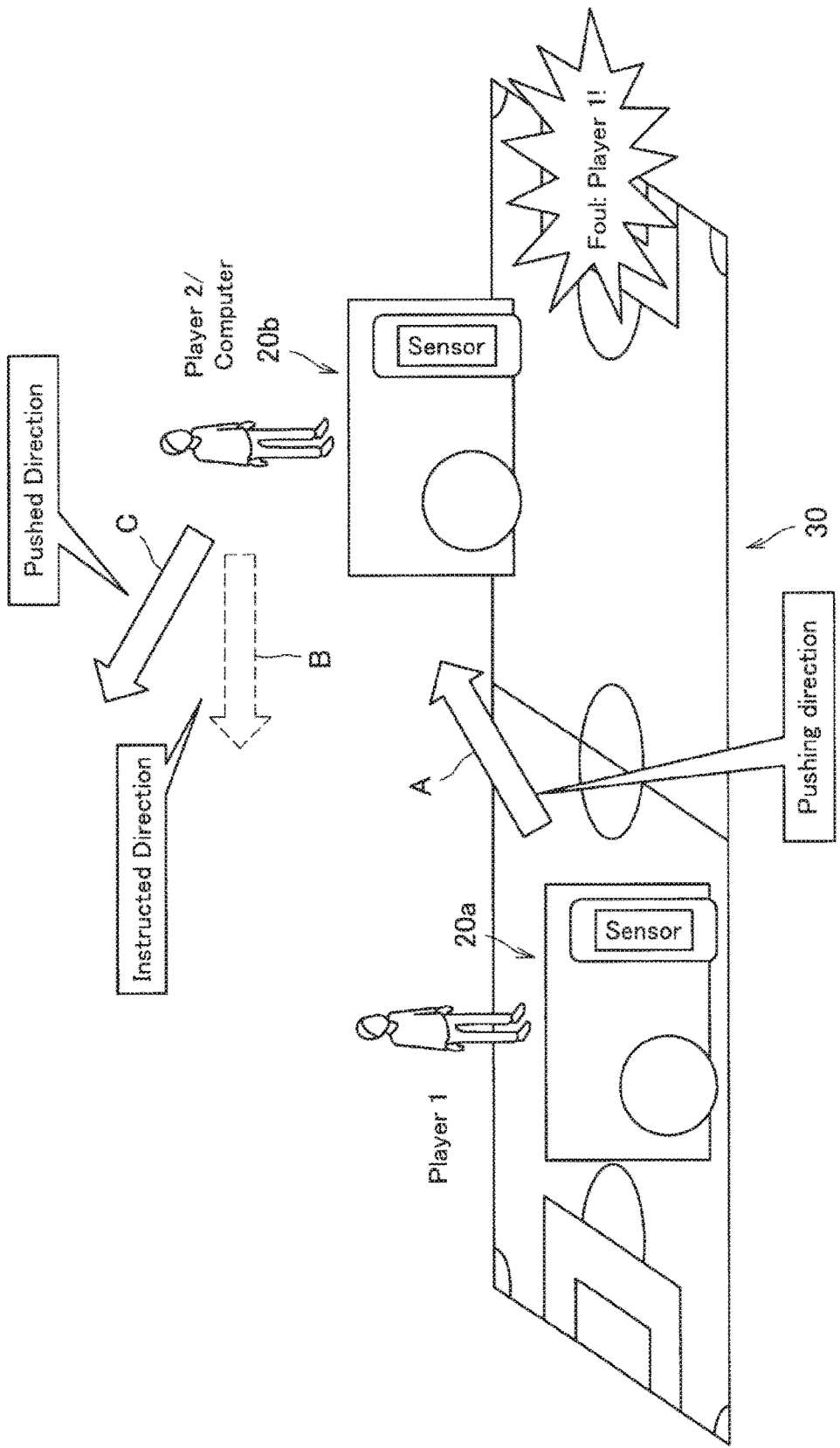
FIG. 53 is a diagram illustrating an example of determining a foul play according to the eleventh embodiment.

The control unit 100 according to the eleventh embodiment can determine whether or not there is a "foul play" based on detection results of collisions of a plurality of player trolleys 20 during the soccer game. For example, as illustrated in FIG. 53, it is assumed that the control unit 100 has detected a movement of the player trolley 20b operated by a user (hereinafter, referred to as "player 2") (or the player trolley 20b controlled by the information processing apparatus 10) in a direction (arrow C illustrated in FIG. 53) different from a direction (arrow B illustrated in FIG. 53) instructed by the player 2 (or the information processing apparatus 10). For example, the control unit 100 compares the movement direction indicated by the operation information of the player 2 for the player trolley 20b (or the control information of the information processing apparatus 10) and the movement direction specified from the sensing result of the acceleration sensor in the player trolley 20b to thereby detect the movement of the player trolley 20b in a direction different from the direction instructed by the player 2 (or the information processing apparatus 10).

In this case, the control unit 100 may determine that a user ("player 1") operating the player trolley 20a coming into contact with the player trolley 20b has conducted a "foul play." For example, the control unit 100 may determine that the user operating the player trolley 20a has conducted a "foul play" only in a case where the team corresponding to the player trolley 20a (coming into contact with the player trolley 20b) and the team corresponding to the player trolley 20b are different.

12-3. Advantageous Effects

As described above, according to the eleventh embodiment, a plurality of trolleys 20 arranged on the mat 30 can be used to inexpensively realize a soccer game. Furthermore, one or more player trolleys 20 not operated by the user can be automatically and appropriately moved during the soccer game.

13. Twelfth Embodiment

Figure 54:
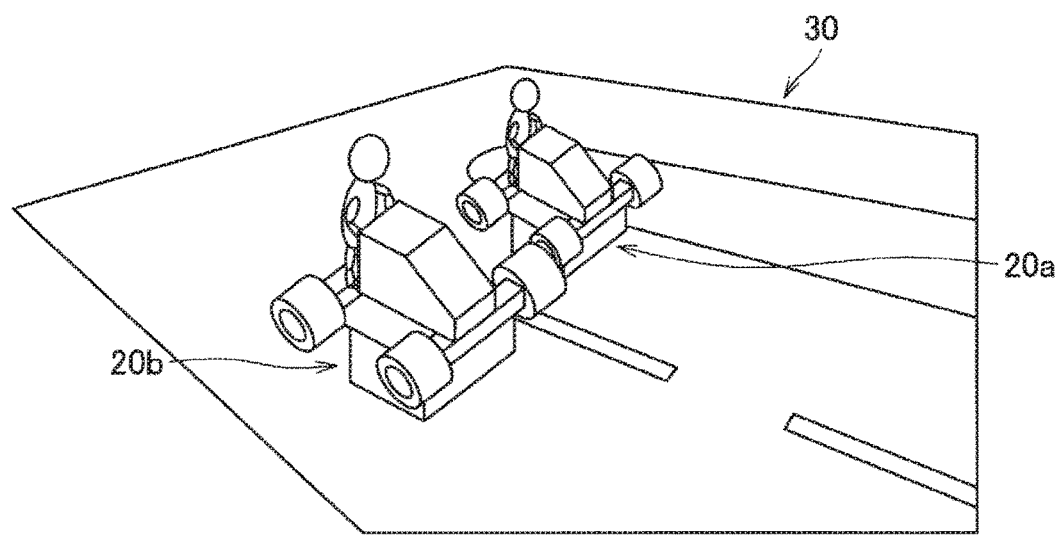
FIG. 54 is a diagram illustrating an example of a racing game according to a twelfth embodiment.

The eleventh embodiment has been described. Next, a twelfth embodiment will be described. As described later, according to the twelfth embodiment, a racing game using a plurality of trolleys 20 arranged on the mat 30 can be realized as illustrated in FIG. 54.

13-1. Configuration

First, a configuration according to the twelfth embodiment will be described. The constituent elements included in the information processing apparatus 10 according to the twelfth embodiment may be the same as in the ninth embodiment (illustrated in FIG. 46). Hereinafter, only the constituent elements with different functions from the ninth embodiment will be described.

13-1-1. Motion Control Unit 106

13-1-1-1. Motion Control When Passing Through Special Area

The motion control unit 106 according to the twelfth embodiment controls the motion of the trolley 20 based on the control information corresponding to the array pattern read by the trolley 20 from the sheet-like medium (such as paper and sticker) arranged on the mat 30. An array pattern associated with grant of an item (for example, "speed up," "obstacle," "weapon," or the like) to the trolley 20 may be recorded in the sheet-like medium.

Figure 55:
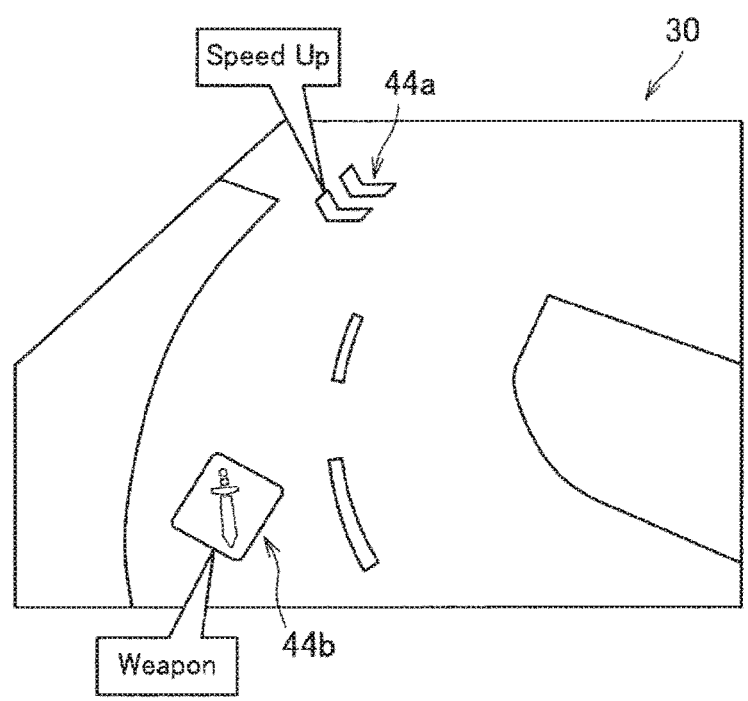
FIG. 55 is a diagram illustrating an example in which stickers 44 corresponding to items are arranged on the mat 30 according to the twelfth embodiment.

For example, as illustrated in FIG. 55, when the trolley 20 passes over the sticker 44a corresponding to "speed up," the motion control unit 106 controls the trolley 20 to increase the speed of the trolley 20 based on the information read by the trolley 20 from the sticker 44a. Alternatively, when the trolley 20 passes over the sticker 44b corresponding to "weapon," the motion control unit 106 stores, in the storage unit 130, the fact that the trolley 20 has acquired the "weapon" based on the information read by the trolley 20 from the sticker 44b.

Figure 56:
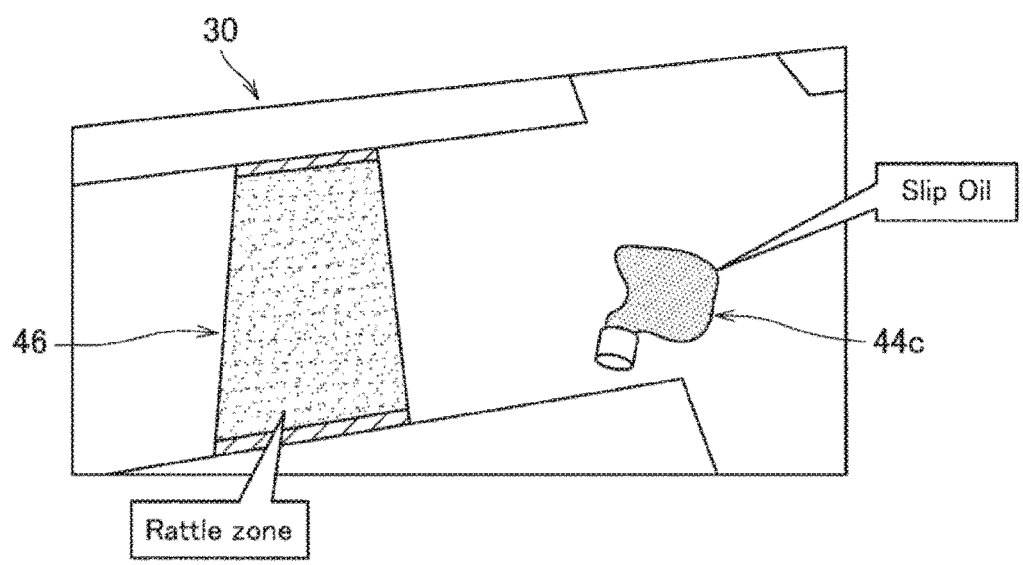
FIG. 56 is a diagram illustrating an example in which a sticker 44 corresponding to an item is arranged on the mat 30 according to the twelfth embodiment.

Alternatively, when the trolley 20 passes over the sticker 44 (or a predetermined area in the mat 30) corresponding to "obstacle," the motion control unit 106 causes the trolley 20 to rotate, reduces the speed, or controls the trolley 20 to slip based on the information read by the trolley 20 from the sticker 44 (or a predetermined area in the mat 30). For example, when the trolley 20 passes over the sticker 44c corresponding to "oil" as illustrated in FIG. 56, the motion control unit 106 controls the trolley 20 to slip. In addition, when the trolley 20 reaches a "rattle zone" 46 defined in the mat 30, the motion control unit 106 controls the movement of the trolley 20 to rattle (continuously) while it is recognized that the trolley 20 is positioned in the rattle zone 46.

13-1-1-2. Control of Start of Game

In another example of control, the motion control unit 106 may control the racing game so that the racing game is not started before, for example, all of the trolleys 20 placed on the mat 30 read the position information from the mat 30 (for example, the motion control unit 106 may suppress the movement of all of the trolleys 20). Alternatively, the motion control unit 106 may control the racing game so that the racing game is not started unless all of the trolleys 20 participating in the racing game are positioned at predetermined start positions on the mat 30. Alternatively, the motion control unit 106 may control the racing game so that the racing game is not started unless start sound of the racing game is output from, for example, the sound output unit 126.

13-1-1-3. Control of Attack

Figure 57:
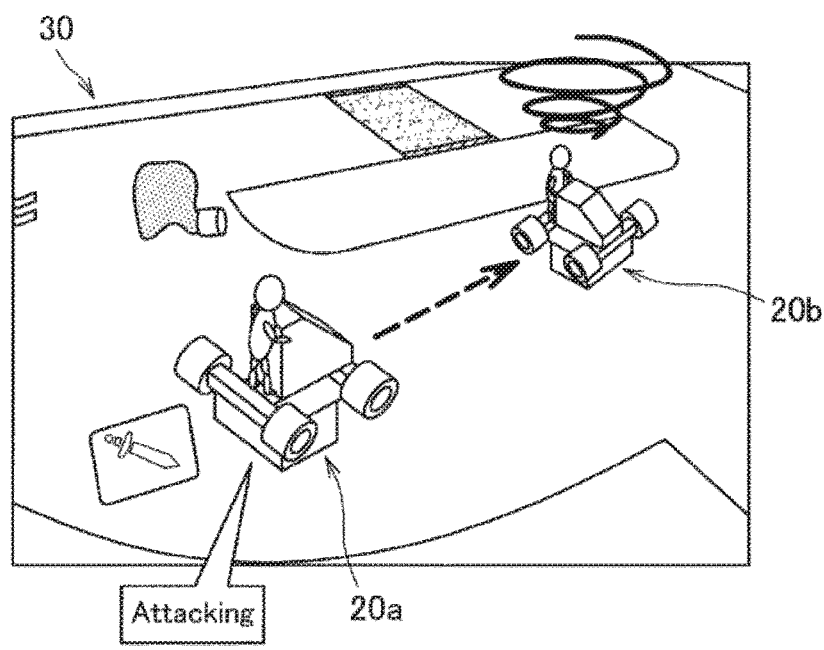
FIG. 57 is a diagram illustrating an example of controlling the motion of the trolley 20 attacked by another trolley 20 according to the twelfth embodiment.

In another example of control, in a case where the trolley 20a holds a certain item of "weapon," and the user presses a predetermined button (for example, "attack button" or the like) on the operation unit 122 (associated with the trolley 20a), the motion control unit 106 can determine the success or failure of the attack to another trolley 20b according to the positional relationship between the trolley 20b and the trolley 20a (for example, the direction of the trolley 20a with respect to the trolley 20b and the distance between the trolleys 20) and according to the type of "weapon." Furthermore, in a case where the motion control unit 106 determines that the attack to the trolley 20b is successful (for example, the "weapon" hits the trolley 20b), the motion control unit 106 may control the motion of the trolley 20b as if the trolley 20b is attacked as illustrated in FIG. 57. For example, the motion control unit 106 controls the rotation of the motor in the trolley 20b so that the trolley 20b spins. Note that the positional relationship between the trolley 20b and the trolley 20a may be specified based on the position information and the angle information of the individual trolleys 20.

13-1-2. Output Control Unit 108

In a case where the trolley 20 holds an item (such as "weapon"), the output control unit 108 according to the twelfth embodiment may display information indicating the type of item on the display unit 124. Alternatively, the output control unit 108 may cause the display unit 224 of the trolley 20 to emit light according to the type of item or may cause the display unit (such as LED) in the operation unit 122 associated with the trolley 20 to emit light. For example, the output control unit 108 may change the color or the pattern of the light emitted by the display unit 224 of the trolley 20 and/or the display unit in the operation unit 122 according to the type of item held by the trolley 20.

13-1-3. Change of Setting Information

13-1-3-1. Designation of Environmental Conditions

Figure 58:
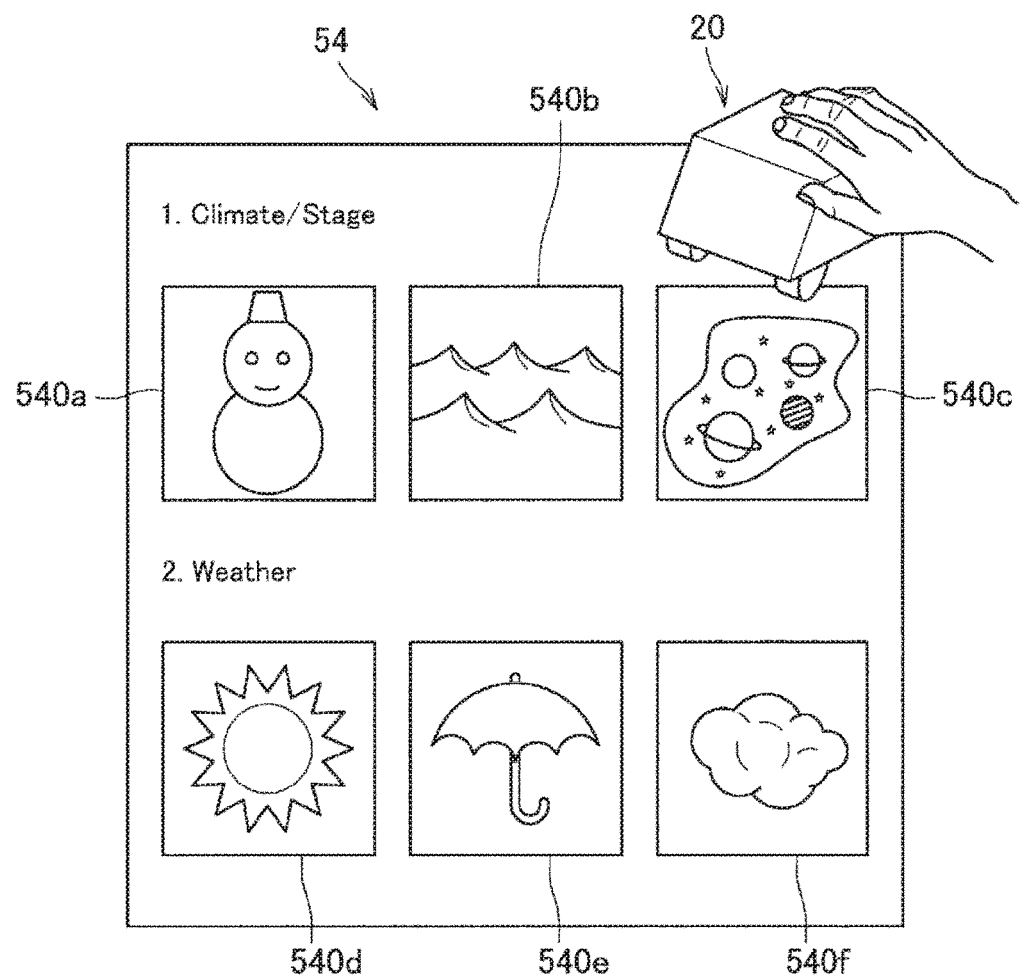
FIG. 58 is a diagram illustrating an example of a touch menu 54 for changing environmental conditions in a racing game according to the twelfth embodiment.

Note that the user may be able to change environmental conditions in the racing game (for example, weather, climate, stage, and the like) based on, for example, the operation of the user for a touch menu 54 as illustrated in FIG. 58. For example, the user may be able to designate the slipperiness of the course, the ease of acceleration, and the like on the touch menu 54. Furthermore, the user may be able to select the type of course (for example, mud course, dirt course, ice course, space course, and the like) on the touch menu 54. Furthermore, the user may be able to designate the weather (such as sunny and rainy), the strength of wind, and the like in the racing game on the touch menu 54.

In the case where the environmental conditions are designated on the touch menu 54, the motion control unit 106 may control the motion of all of the trolleys 20 in the racing game based on the designated environmental conditions (such as weather, climate, and stage). The output control unit 108 may further cause the display unit 124 to display information (such as a character string and an image) indicating the designated environmental conditions.

As illustrated in FIG. 58, the touch menu 54 may be printed on paper (such as a card). In this case, the user may bring the trolley 20 close to an area 540 corresponding to a desirable environmental condition among areas 540 corresponding to individual environmental conditions in the touch menu 54, and the user may cause the trolley 20 to read the information recorded in the area 540 to set the environmental condition. Alternatively, a screen corresponding to the touch menu 54 may be displayed on the display unit 124. In this case, the environmental condition may be set based on the operation of the user for the screen.

13-1-3-2. Designation of Difficulty

Alternatively, the user may be able to designate the difficulty of the racing game by using, for example, a menu screen, a predetermined card, or the like. Here, the designation regarding the difficulty may be, for example, selection of one of "easy," "normal," and "hard" or may be, for example, selection of one of "50 cc," "100 cc," and "150 cc."

In the case where the "designation regarding the difficulty" is performed, the motion control unit 106 may restrict the maximum value of the rotation speed of the motors of all of the trolleys 20 in the racing game according to the designated difficulty. In this way, the difficulty of the racing game can be changed.

13-2. Advantageous Effect

As described above, according to the twelfth embodiment, the racing game using the plurality of trolleys 20 arranged on the mat 30 can be realized.

14. Thirteenth Embodiment

The twelfth embodiment has been described. Next, a thirteenth embodiment will be described. First, the background of creating the thirteenth embodiment will be described. It is also desirable to be able to realize a battle game by using a plurality of trolleys 20 arranged on the mat 30. The battle game may be a game in which the victory is determined in a case where the trolley 20 of the opponent is pushed out of the mat 30 (or a predetermined area on the mat 30) first or in a case where the trolley 20 of the opponent tumbles first. In the battle game, the difficulty of the game may vary depending on the shapes of the toys 40 arranged on the individual trolleys 20. Therefore, if the user can freely select (or create) the toy 40 arranged on the trolley 20, the degree of freedom of the strategy improves.

Incidentally, in a case where a human determines the victory or defeat in the battle game, there may be a situation in which it is difficult to determine which trolley 20 has won. Therefore, there may be a case in which the other users feel that the determination result is unfair.

As described later, according to the thirteenth embodiment, the victory or defeat can be appropriately determined when a plurality of trolleys 20 arranged on the mat 30 are used to play the battle game.

14-1. Configuration

First, a configuration according to the thirteenth embodiment will be described. The constituent elements included in the information processing apparatus 10 according to the thirteenth embodiment may be the same as in the ninth embodiment (illustrated in FIG. 46). Hereinafter, only the constituent elements with different functions from the ninth embodiment will be described.

14-1-1. Control Unit 100

Figure 59:
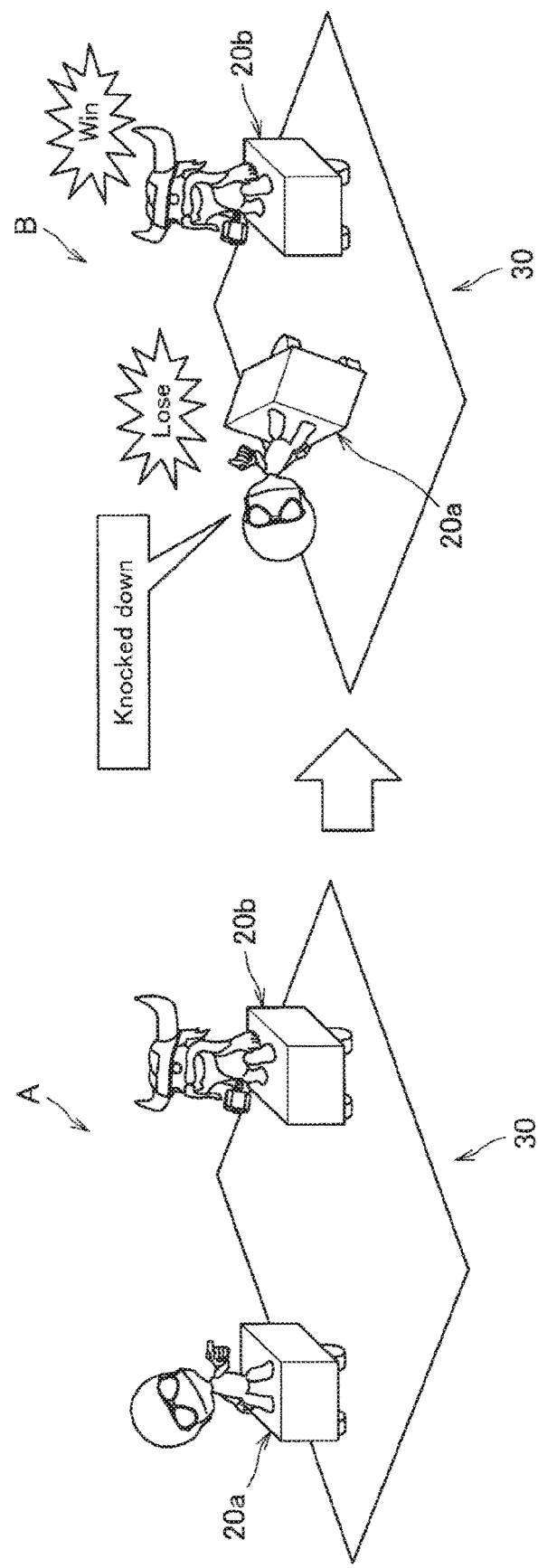
FIG. 59 is a diagram illustrating an example of determining the victory or defeat of the trolleys 20 according to a thirteenth embodiment.
Figure 60:
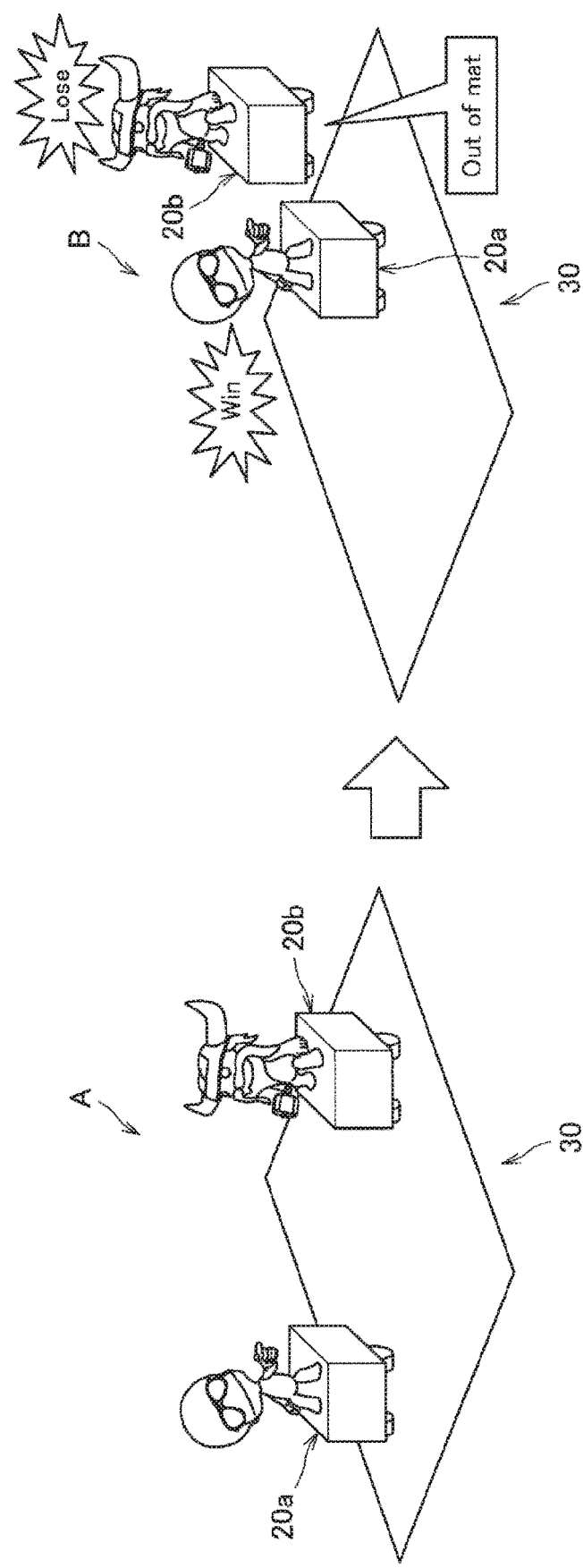
FIG. 60 is a diagram illustrating an example of determining the victory or defeat of the trolleys 20 according to the thirteenth embodiment.

The control unit 100 according to the thirteenth embodiment can determine the victory or defeat of a plurality of trolleys 20 playing the battle game based on sensing information acquired from the plurality of trolleys 20. For example, as illustrated in FIG. 59, the control unit 100 specifies that the trolley 20a has tumbled based on, for example, the measurement result of the acceleration sensor (sensor unit 228) in the trolley 20a to determine that the trolley 20a has lost (that is, the trolley 20b has won). Alternatively, as illustrated in FIG. 60, the control unit 100 specifies that the trolley 20b is pushed out of the mat 30 (while the trolley 20a is positioned in the mat 30) based on, for example, the history of the position information read by the trolley 20b to determine that the trolley 20b has lost (that is, the trolley 20a has won).

Figure 61:
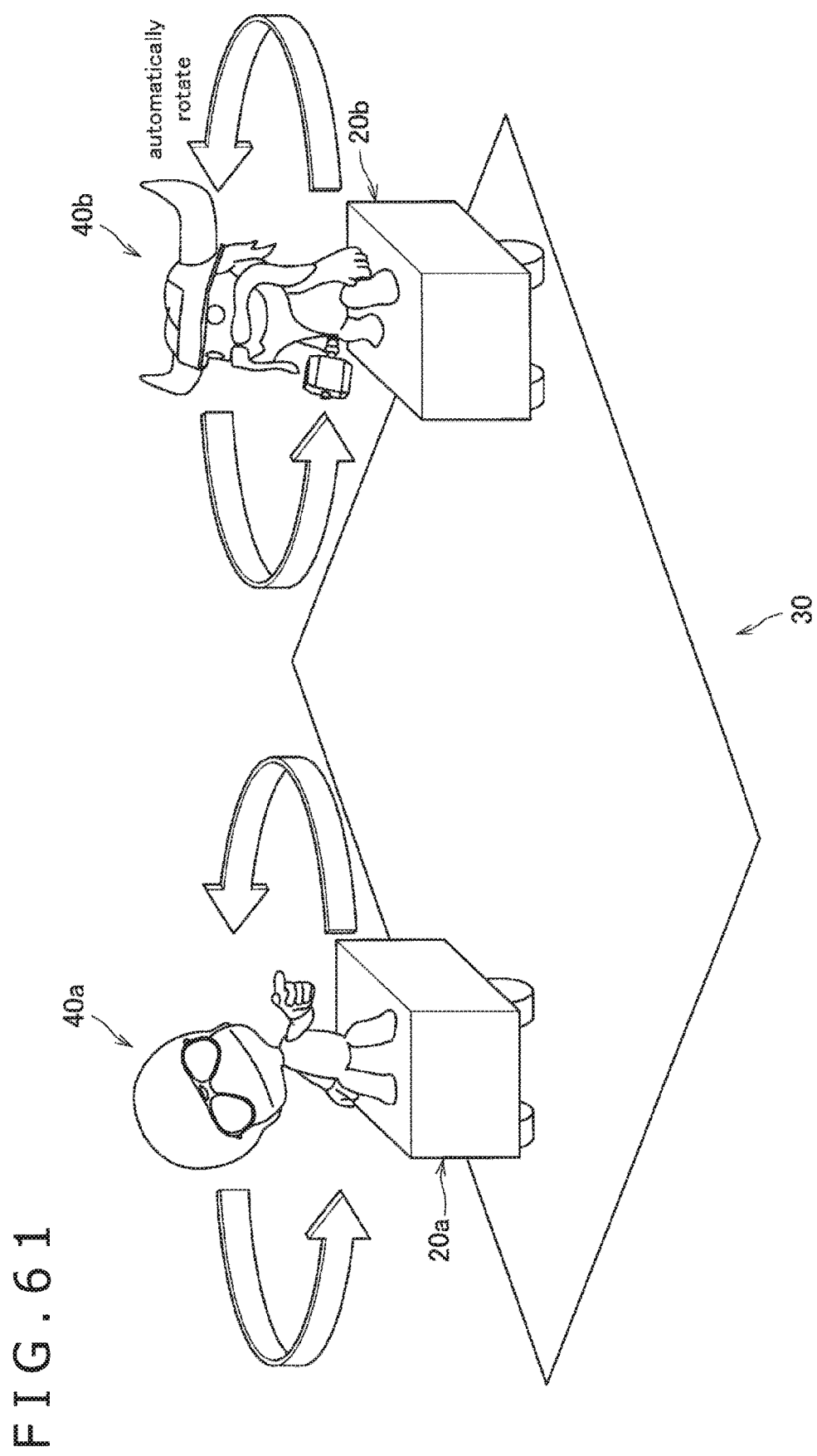
FIG. 61 is a diagram illustrating an example of a battle involving rotation of the toy 40 according to the thirteenth embodiment.

Note that instead of the users simply operating the individual trolleys 20 to fight a battle, the individual trolleys 20 may continuously rotate to fight a battle as illustrated in FIG. 61. In this case, user experience (UX) may be improved according to the toy 40 (such as shape) arranged on the trolley 20. Note that it is desirable to rotate only the toy 40 arranged on the trolley 20 (without rotating the trolley 20). Furthermore, the speed of the rotation may be changed by a barrage on the operation unit 122.

14-1-2. Motion Control Unit 106

Figure 62:
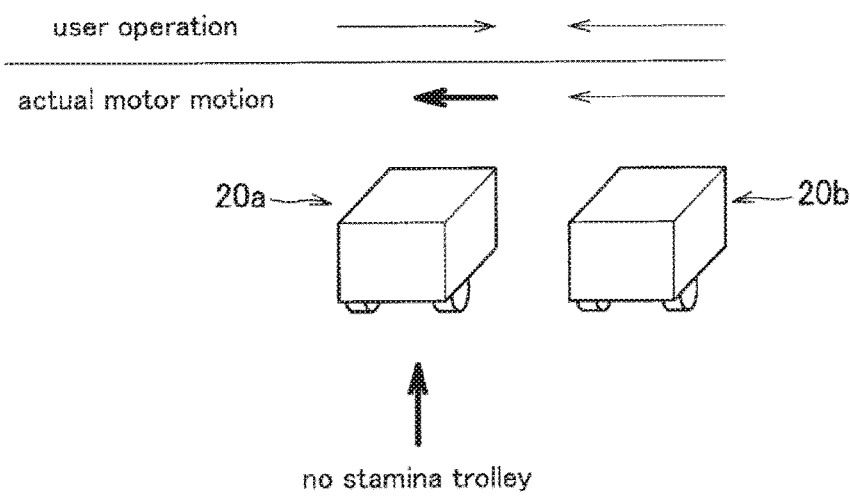
FIG. 62 is a diagram illustrating an example of controlling the trolleys 20 based on stamina values associated with the trolleys 20 according to the thirteenth embodiment.

The motion control unit 106 according to the thirteenth embodiment can control the motion of the individual trolleys 20 based on attribute information associated with the individual trolleys 20 playing the battle game. For example, the motion control unit 106 controls the motion of the individual trolleys 20 based on stamina values associated with the individual trolleys 20. For example, in a case where the stamina value associated with the trolley 20*a* is equal to or smaller than a predetermined threshold, and the trolley 20*a* collides with another trolley 20*b*, the motion control unit 106 automatically controls the trolley 20*a* such that the trolley 20*a* moves in the same direction as the movement direction of the trolley 20*b* (regardless of the operation of the user for the trolley 20*a*) as illustrated in FIG. 62. This can virtually express that the trolley 20*a* lacks stamina.

Note that the stamina value associated with the trolley 20 may be reduced according to, for example, the length of the rotation time of the motor in the trolley 20. For example, in a case where the motor in the trolley 20 rotates at 100% power, the stamina value associated with the trolley 20 may gradually decrease with an increase in the duration of the rotation of the motor.

14-1-3. Change of Attribute Information

Figure 63:
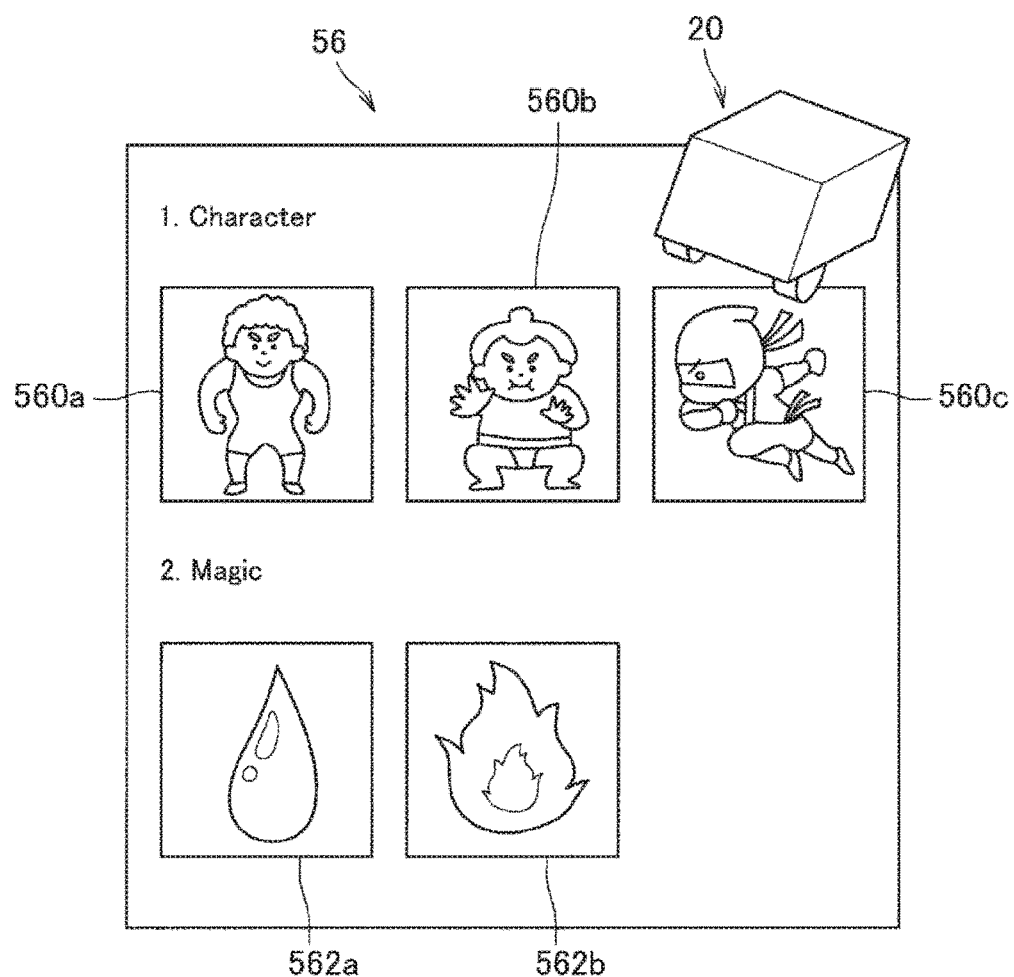
FIG. 63 is a diagram illustrating an example of an attribute card 56 for changing attribute information associated with the trolley 20 according to the thirteenth embodiment.

Note that the trolley 20 may be brought into contact with or close to an attribute card 56 as illustrated, for example, in FIG. 63 to change the attribute information associated with the trolley 20. More specifically, when the trolley 20 reads an array pattern recorded in the attribute card 56, the attribute information corresponding to the array pattern may be newly associated with the trolley 20. As illustrated in FIG. 63, the attribute card 56 may include a plurality of character areas 560 and a plurality of skill areas 562. When the trolley 20 is brought into contact with or close to one of the plurality of character areas 560, the attribute information corresponding to the area 560 may be newly associated with the trolley 20. In the example illustrated in FIG. 63, the attribute information corresponding to a character area 560*a* indicates that the speed is fast, and the power is weak. The attribute information corresponding to a character area 560*b* indicates that the power is strong, and the stamina is low. In addition, when the trolley 20 is brought into contact with or close to one of the plurality of skill areas 562, attribute information indicating that a skill (or magic or weapon) corresponding to the area 562 can be used at least once may be newly associated with the trolley 20. For example, the attribute information indicates that magic, such as water, ice, and flame, can be used. Note that a setting screen corresponding to the attribute card 56 may be displayed on, for example, the display unit 124 (instead of using the attribute card 56). In this case, for each trolley 20, the attribute information associated with the trolley 20 may be changed based on the operation for the setting screen.

14-1-3-1. Modification

Figure 64:
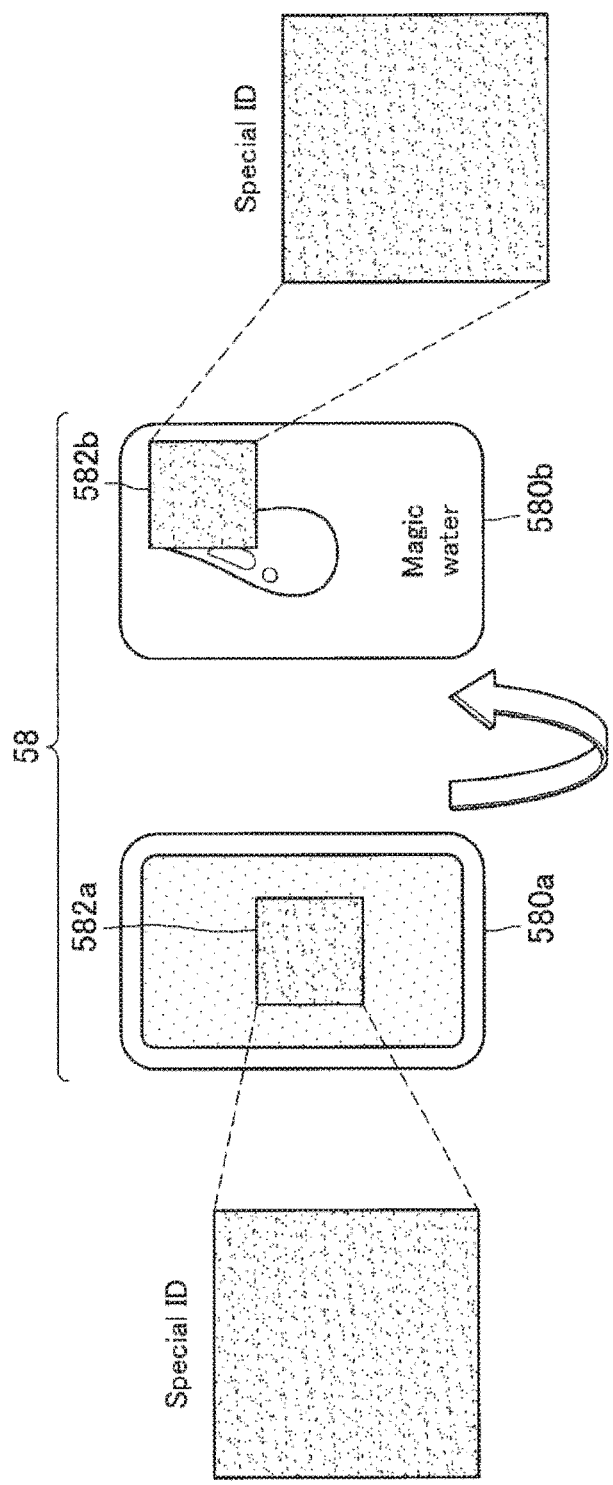
FIG. 64 is a diagram illustrating an example of an attribute card 58 including array patterns printed on both surfaces according to the thirteenth embodiment.

For a modification, array patterns (special information) 582 different from each other may be printed on surfaces 580 of an attribute card 58, individually, as illustrated in FIG. 64. Alternatively, the same array pattern 582 may be printed on both surfaces 580 of the attribute card 580.

Figure 65:
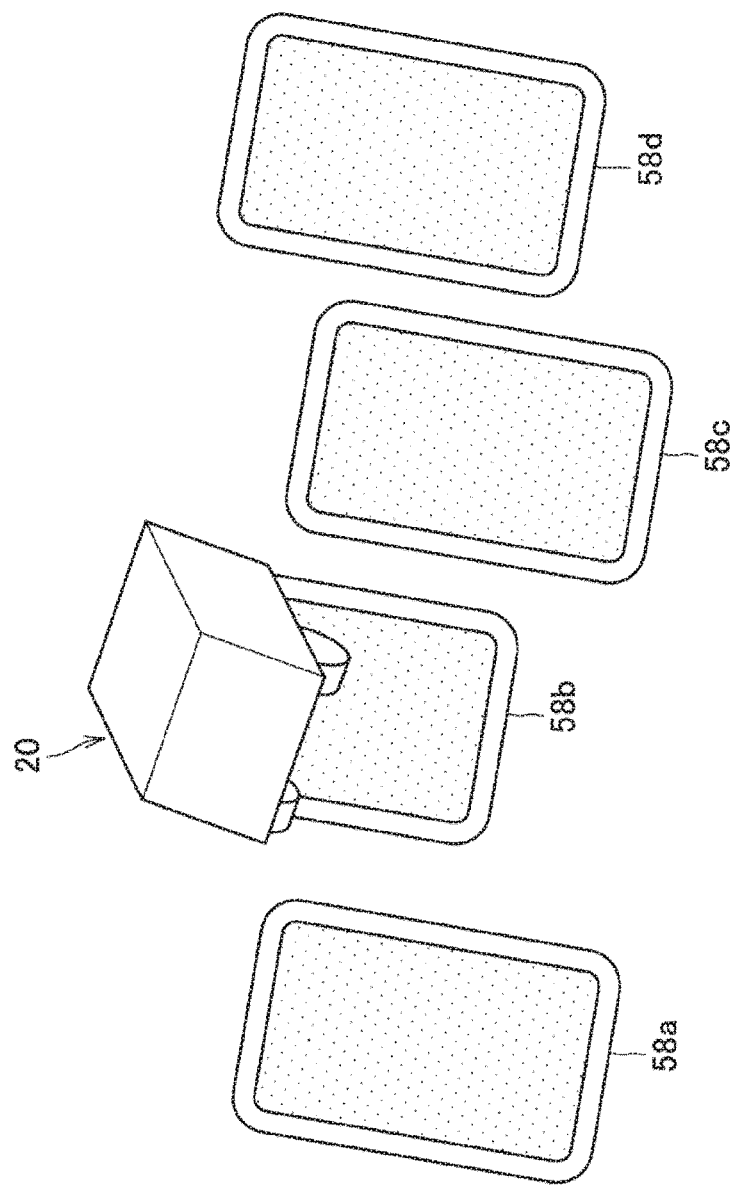
FIG. 65 is a diagram illustrating an example of associating information recorded in the attribute cards 58 and the trolley 20 according to the thirteenth embodiment.

Alternatively, the array patterns (special information) 582 different from each other may be individually recorded in a plurality of attribute cards 58 provided with the same printed illustration. In this case, as illustrated in FIG. 65, the user can associate the trolley 20 with the attribute information to play a game (such as a card game) without knowing the kinds of attribute information associated with the individual attribute cards 58. Note that each of the setting methods of attribute information can be similarly applied to the twelfth embodiment (racing game).

14-2. Advantageous Effects

As described above, according to the thirteenth embodiment, a battle game using a plurality of trolleys 20 arranged on the mat 30 can be realized. Furthermore, the victory or defeat in the battle game can be automatically and appropriately determined.

15. Fourteenth Embodiment

The thirteenth embodiment has been described. Next, a fourteenth embodiment will be described. As described later, according to the fourteenth embodiment, the user can set the rule of the game with a high degree of freedom.

Figure 66:
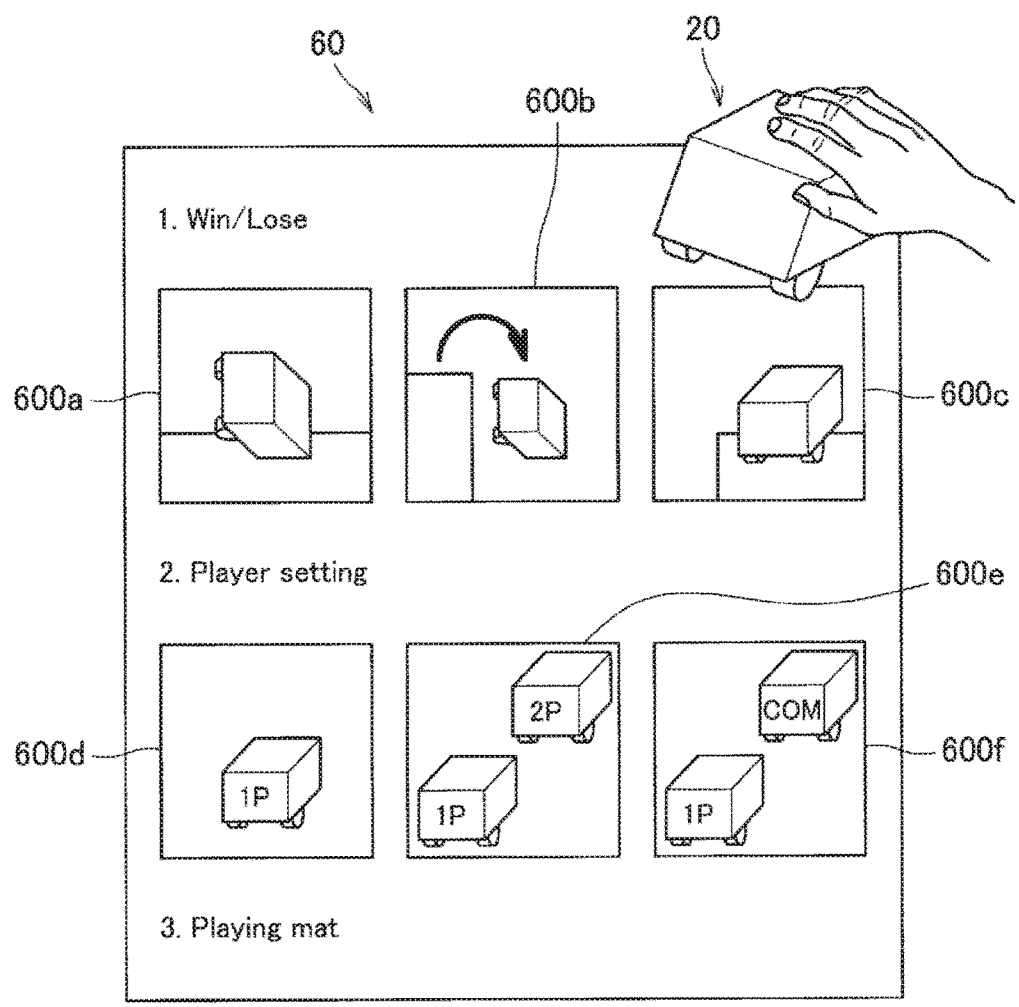
FIG. 66 is a diagram illustrating an example of a rule selection menu 60 according to a fourteenth embodiment.

In the fourteenth embodiment, the user can select the rule of the game based on, for example, the operation of the user for a rule selection menu 60 illustrated in FIG. 66. As illustrated in FIG. 66, for example, tumbling, falling down from the mat 30, moving out of the mat 30, and the like may be able to be selected for the conditions of the victory or defeat of the game. Furthermore, regarding the players of the game, for example, only one user, two users, a combination of one user and one computer player, a combination of one user and three computer players, a combination of two users and two computer players, and the like may be able to be selected. Furthermore, regarding the mat 30, for example, use of "mat A," use of "mat B," use of a combination of "mat A," "mat B," and "mat C," not using the mat 30, and the like may be able to be selected. Furthermore, regarding the operation setting, for example, a wheel control mode, a user control mode, and the like may be able to be selected. Furthermore, regarding the computer setting (for example, setting regarding computer player), for example, automatic escape, automatic chase, random movement, and the like may be able to be selected.

As illustrated in FIG. 66, the rule selection menu 60 may be printed on paper (such as a card). In this case, the user may bring the trolley 20 close to an area 600 corresponding to a desirable rule among areas 600 corresponding to individual rules in the rule selection menu 60 and may cause the trolley 20 to read the information recorded in the area 600 to thereby set the rule of the game. Alternatively, a screen corresponding to the rule selection menu 60 may be displayed on the display unit 124, and the rule of the game may be set based on the operation of the user for the screen.

As described above, according to the fourteenth embodiment, the user can set the rule of the game with a high degree of freedom.

16. Fifteenth Embodiment

The fourteenth embodiment has been described. Next, a fifteenth embodiment will be described. As described later, according to the fifteenth embodiment, a maze game including elements of education can be realized by using trolleys 20 and the mat 30.

16-1 Overview

FIG. 67 is a diagram illustrating an example of the maze game according to the fifteenth embodiment. As illustrated in FIG. 67, the mat 30 provided with a printed illustration of a maze and a plurality of types of tiles 62 for controlling the movement of the trolley 20 on the mat 30 may be used in the maze game. For example, the user first places one trolley 20*b* on the start position in the mat 30. As illustrated in FIG. 67, the user then arranges predetermined one or more tiles 62 in a line to form a command sequence 64. Subsequently, when the user places one trolley 20a on an edge of the command sequence 64, the trolley 20a automatically moves on the command sequence 64 and then reads commands (control information) recorded in the individual tiles 62 included in the command sequence 64. The movement of the trolley 20b is then controlled based on the read commands.

Figure 68:
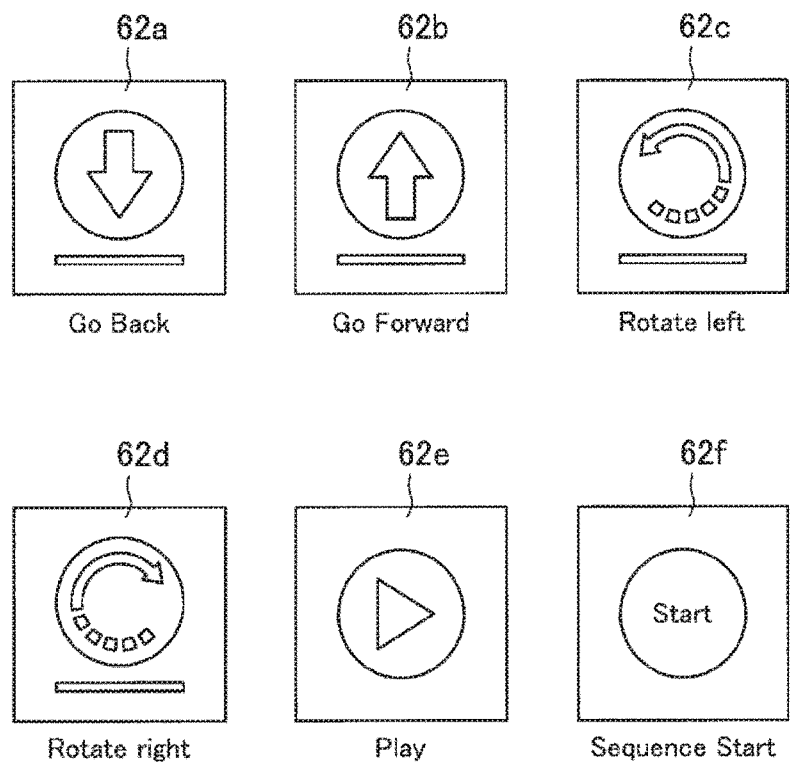
FIG. 68 is a diagram illustrating examples of tiles 62 according to the fifteenth embodiment.

FIG. 68 is a diagram illustrating examples of the tiles 62. As illustrated in FIG. 68, for example, "go back" 62a by one square, "go forward" 62b by one square, "rotate left" 62c, "rotate right" 62d, "play" 62e, "sequence start" 62f, and other types of tiles 62 may be prepared.

16-2. Configuration

Next, a configuration according to the fifteenth embodiment will be described. The constituent elements included in the information processing apparatus 10 according to the fifteenth embodiment may be the same as in the ninth embodiment (illustrated in FIG. 46). Hereinafter, only the constituent elements with different functions from the ninth embodiment will be described.

16-2-1. Motion Control Unit 106

The motion control unit 106 according to the fifteenth embodiment causes another trolley 20b to move on the mat 30 according to the series of commands read by the trolley 20a from the command sequence 64. For example, in a case where the command sequence 64 includes the play tile 62e, and it is detected that the trolley 20a has reached the play tile 62e, the motion control unit 106 causes the trolley 20b to move according to each of one or more commands in the order of the one or more commands read by the trolley 20a in the command sequence 64 before the detection.

Note that the same position information may be recorded in each square of the mat 30. In this way, even in a case where, for example, a rotation parameter of the motor in the trolley 20 is different from a standard value, the trolley 20 can be accurately moved in squares on the mat 30.

16-2-2. Control Unit 100

The control unit 100 according to the fifteenth embodiment can determine the victory or defeat of the user based on a preset rule and the movement of the trolley 20b on the mat 30. For example, the control unit 100 determines that the user has lost in a case where the trolley 20b passes through a "wall" defined on the maze, in a case where the trolley 20b reaches a "fire" mark before reaching a "water" mark, in a case where the trolley 20b reaches a "monster" mark before reaching a "sword" mark, in a case where the trolley 20b reaches a "treasure chest" mark before reaching a "key" mark, and in other cases. In addition, the control unit 100 determines that the user has won (that is, the game is cleared) in a case where the trolley 20b reaches the "treasure chest" mark before any of the conditions is met.

16-3. Advantageous Effect

As described above, according to the fifteenth embodiment, the movement of the trolley 20 in the maze game is controlled based on the command sequence including one or more tiles arranged by the user. That is, to clear the maze game, the user needs to arrange a plurality of different types of tiles in an appropriate order according to the type of maze. In this way, according to the fifteenth embodiment, the maze game including elements of education (such as programming) can be realized by using the trolleys 20 and the mat 30.

17. Sixteenth Embodiment

The fifteenth embodiment has been described. Next, a sixteenth embodiment will be described. First, the background of creating the sixteenth embodiment will be described. Conventionally, there are very few games including both play elements and puzzle elements.

As described later, according to the sixteenth embodiment, a "Castle Crush" game using the trolleys 20 and blocks (Construction set) can be realized. The castle crush game may include both the play elements and the puzzle elements.

Figure 69:
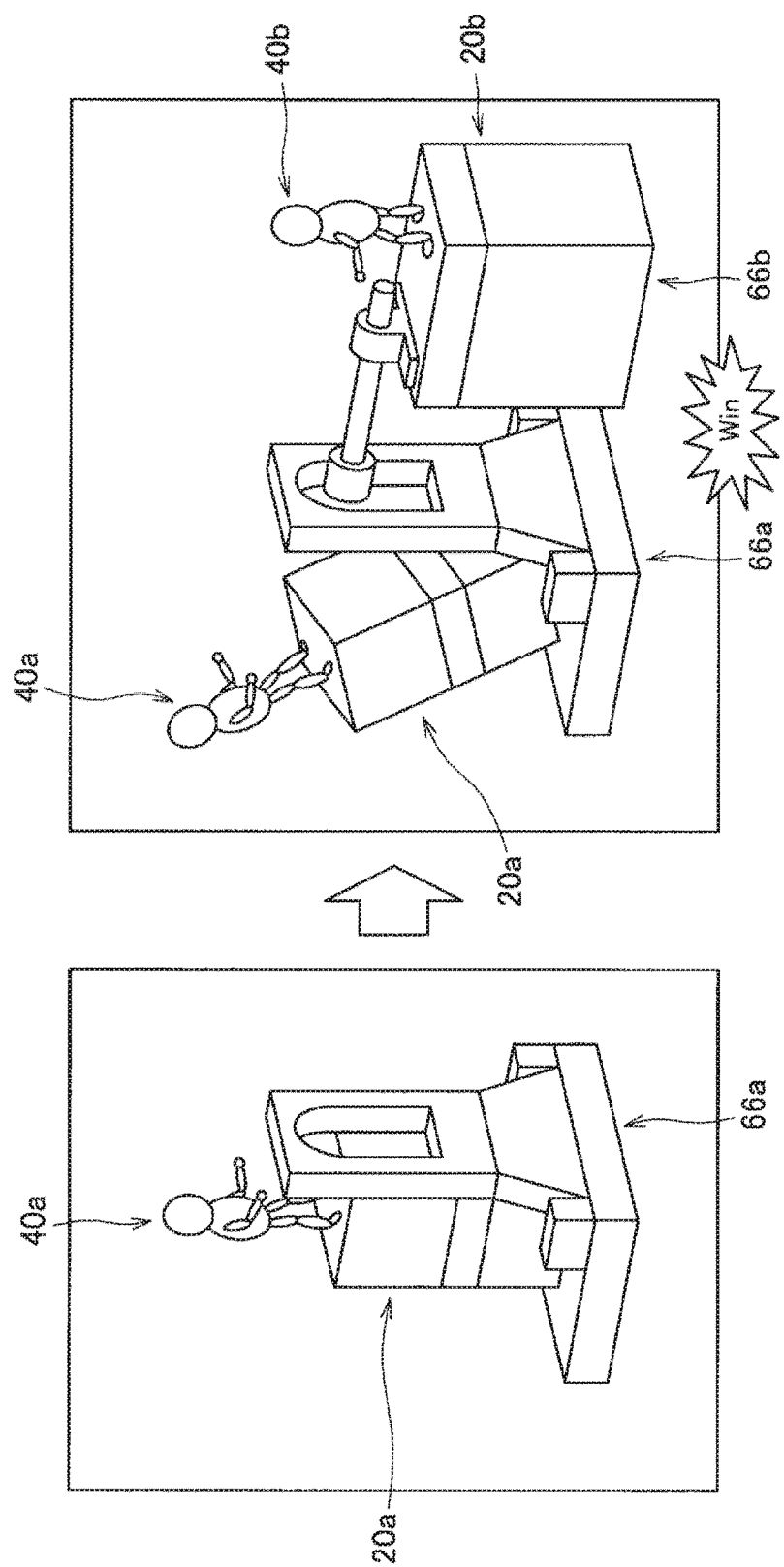
FIG. 69 is a diagram illustrating an example of a castle crush game according to a sixteenth embodiment.

In the castle crush game according to the sixteenth embodiment, the user first uses blocks to assemble a castle 66a as illustrated, for example, in the diagram on the left in FIG. 69. The user then places the trolley 20a on the assembled castle 66a. Subsequently, the user uses the operation unit 122 to move another trolley 20b provided with a toy (such as a weapon) 40b to thereby try to crush the castle 66a.

As illustrated in the diagram on the right in FIG. 69, in a case where a fall of the trolley 20a due to the crush of the castle 66a is detected, the information processing apparatus 10 determines that the castle crush game is cleared.

In the castle crush game, the difficulty of the game may vary depending on whether or not the castle is strongly assembled. That is, according to the sixth embodiment, the trolleys 20 and the blocks can be used to realize the game including both the play elements and the puzzle elements.

18. Seventeenth Embodiment

The sixteenth embodiment has been described. Next, a seventeenth embodiment will be described. As described later, according to the seventeenth embodiment, cooperative control of two trolleys 20 (that is, two trolleys 20 are moved in cooperation) is possible. As a result, for example, a movement of a creature can be realized.

18-1. Overview

In the seventeenth embodiment, the user first brings two trolleys 20 into contact with or close to a predetermined area recording special information (third array pattern) in a predetermined sheet-like medium (such as a picture book and a card). The third array pattern may be a pattern defining the cooperative control of the two trolleys 20. In this way, a motion pattern (cooperative motion pattern) corresponding to the third array pattern may be associated with the two trolleys 20.

18-2. Configuration

Next, a configuration according to the seventeenth embodiment will be described. The constituent elements included in the information processing apparatus 10 according to the seventeenth embodiment may be the same as in the ninth embodiment (illustrated in FIG. 46). Hereinafter, only the constituent elements with different functions from the ninth embodiment will be described. Note that as described above, the information processing apparatus 10 may be provided on each of the two trolleys 20. In addition, note that the cooperative control of the ninth embodiment may also be performed by communication between the information processing apparatuses 10 provided on the two trolleys 20. Furthermore, the example of cooperative control in the ninth embodiment may also be executed by communication between the information processing apparatus 10 including the operation unit 122 and a plurality of trolleys 20. For example, the information processing apparatus 10 including the operation unit 122 may first transmit movement information (instruction) only to one of the trolleys 20. Next, the one trolley 20 may provide the received movement information (or motion information based on the movement information) to the other trolley 20. The other trolley 20 may then execute cooperative motion according to the one trolley 20 based on the movement information provided from the one trolley 20.

18-2-1. Motion Control Unit 106

The motion control unit 106 according to the seventeenth embodiment can control the positional relationship between two trolleys 20 (hereinafter, also referred to as trolley set 26) based on information acquired on the basis of reading of the third array pattern by the two trolleys 20. For example, the motion control unit 106 controls the two trolleys 20 such that each of the two trolleys 20 moves in the motion pattern corresponding to the third array pattern.

As described above, the position information and the angle information may be recorded in the individual unit areas in the mat 30. For example, the motion control unit 106 controls the two trolleys 20 such that each of the two trolleys 20 moves based on the combination of the position information and the angle information read by each of the two trolleys 20 from the mat 30 and based on the motion pattern associated with the two trolleys 20.

18-2-1-1. First Example of Cooperative Control: Movement of Inch Worm

Figure 70:
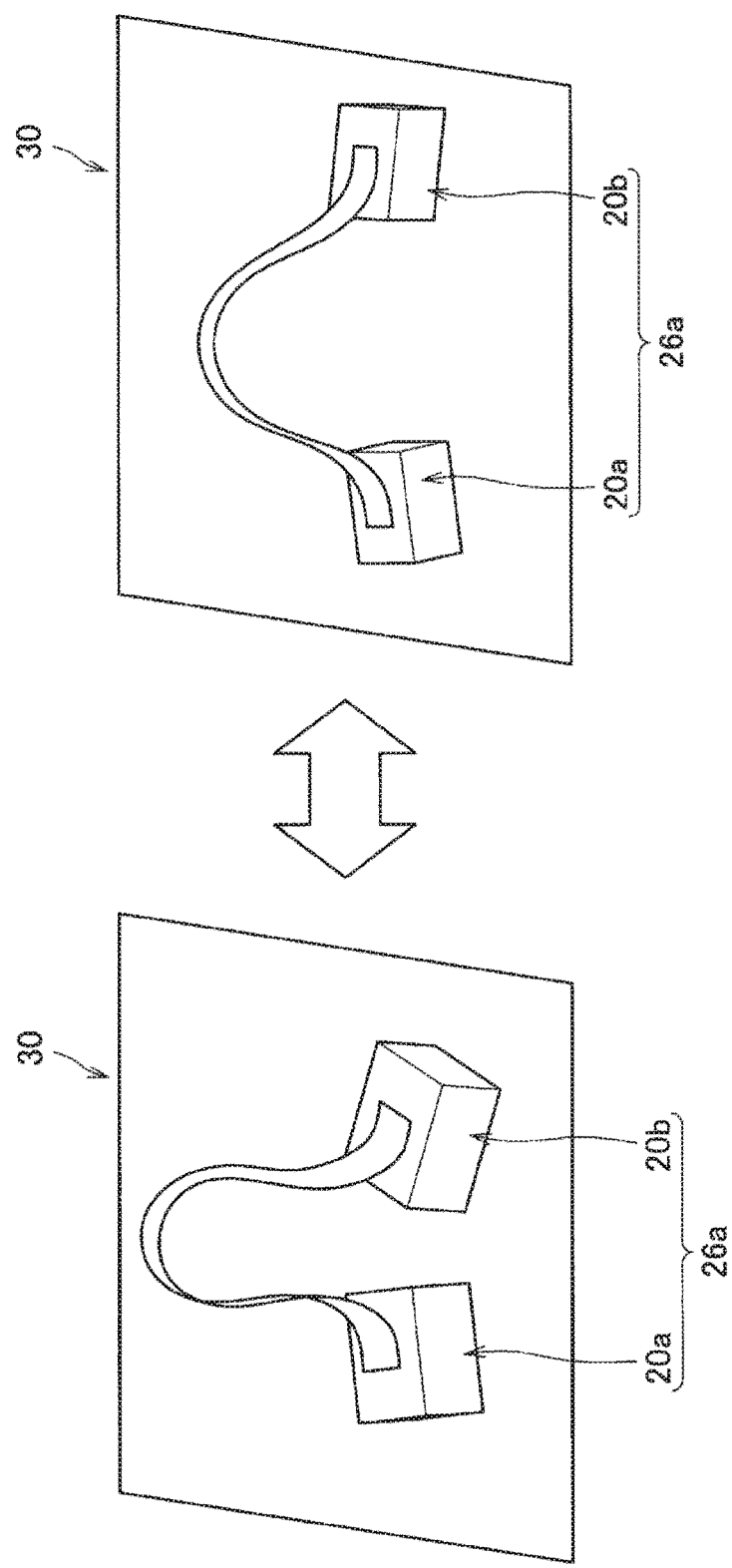
FIG. 70 is a diagram illustrating a first example of cooperative control of two trolleys 20 according to a seventeenth embodiment.

Here, specific examples of the cooperative control will be described with reference to FIGS. 70 to 77. FIG. 70 is a diagram illustrating a first example of cooperative control of the trolley set 26. As illustrated in FIG. 70, the first example of cooperative control is an example of controlling the two trolleys 20 (trolley set 26a) such that the two trolleys 20 move in a movement pattern (hereinafter, referred to as first movement pattern) like an inch worm, for example.

For example, the user may first bring the trolley set 26a close to the predetermined sheet-like medium, and based on this, the first movement pattern may be associated with the trolley set 26a. Subsequently, in the initial setting mode, the information processing apparatus 10 (control unit 100) may recognize that, for example, the distance between the two trolleys 20 at the time of the user placing the two trolleys 20 on the mat 30 is the maximum distance and may record the maximum distance in the storage unit 130. The control unit 100 may further determine which one of the two trolleys 20 is the trolley 20a on the head side based on the direction (angle information) of each of the two trolleys 20.

Subsequently, the motion control unit 106 causes the two trolleys 20 to repeat the movement of coming close to each other and separating from each other. For example, the motion control unit 106 first causes the trolley 20a on the head side to accelerate and go back until the distance from the trolley 20b on the tail side is, for example, one third of the maximum distance (that is, brings the trolley 20a on the head side close to the trolley 20b on the tail side). Subsequently, the motion control unit 106 causes the trolley 20a on the head side to go forward to a position where the distance from the trolley 20b on the tail side does not exceed the maximum distance. Subsequently, the motion control unit 106 causes the trolley 20b on the tail side to accelerate and go forward until the distance from the trolley 20a on the head side is, for example, one third of the maximum distance (that is, brings the trolley 20b on the tail side close to the trolley 20a on the head side). Subsequently, the motion control unit 106 repeats the process again. According to the example of cooperative control 1, the trolley set 26a can be moved with the movement like an inch worm.

18-2-1-2. Second Example of Cooperative Control: Movement of Human Walking

Figure 71:
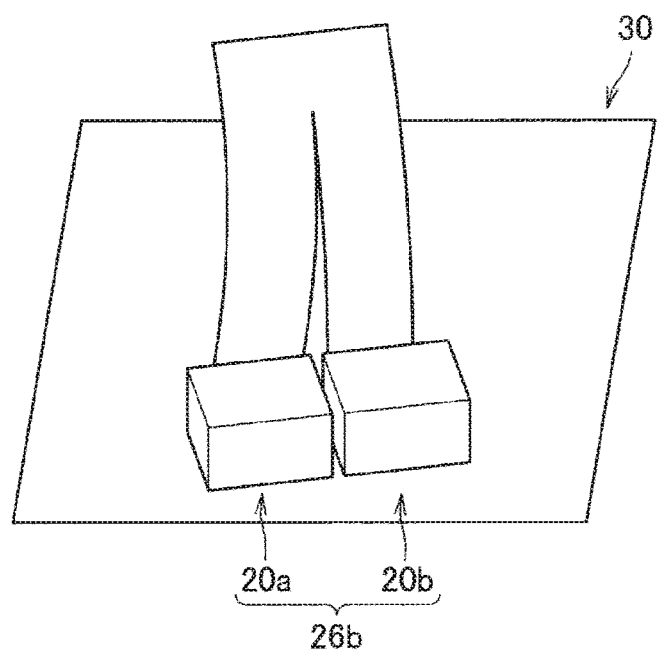
FIG. 71 is a diagram illustrating a second example of cooperative control of two trolleys 20 according to the seventeenth embodiment.
Figure 72:
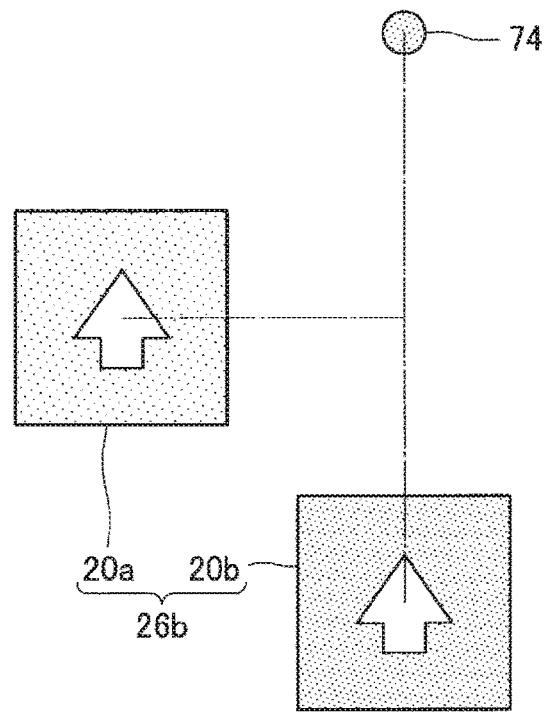
FIG. 72 is a diagram illustrating the second example of cooperative control of two trolleys 20 according to the seventeenth embodiment.
Figure 73:
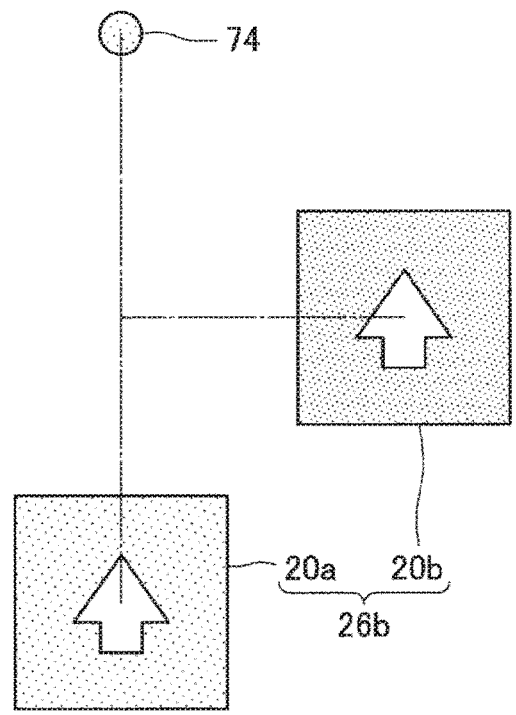
FIG. 73 is a diagram illustrating the second example of cooperative control of two trolleys 20 according to the seventeenth embodiment.

FIGS. 71 to 73 are diagrams illustrating a second example of cooperative control of the trolley set 26. As illustrated in FIG. 71, the second example of cooperative control is an example of controlling a trolley set 26b such that the trolley set 26b moves in a movement pattern (hereinafter, referred to as second movement pattern) like, for example, a human walking (bipedal walking).

For example, the user may first bring the trolley set 26b close to the predetermined sheet-like medium, and based on this, the second movement pattern may be associated with the trolley set 26b. Subsequently, in the initial setting mode, the control unit 100 may determine the trolley 20a on the right foot side and the trolley 20a on the left foot side (of the two trolleys 20) based on, for example, the positional relationship between the two trolleys 20 (trolley set 26b) at the time of the user placing the two trolleys 20 on the mat 30. Furthermore, the control unit 100 may automatically determine the setting distance between the left and right legs at the same time (that is, the distance between the trolley 20a on the right foot side and the trolley 20a on the left foot side) based on the distance between the two trolleys 20 at the timing of the placement of the two trolleys 20.

Subsequently, the motion control unit 106 causes the trolley 20a on the right foot side and the trolley 20a on the left foot side to alternately go forward (or go back) to move toward a virtual point 74 corresponding to a target position as illustrated, for example, in FIGS. 72 and 73. According to the example of control, the positions of the trolleys 20 can be easily corrected even if the positions are deviated a little from the target positions.

Figure 74:
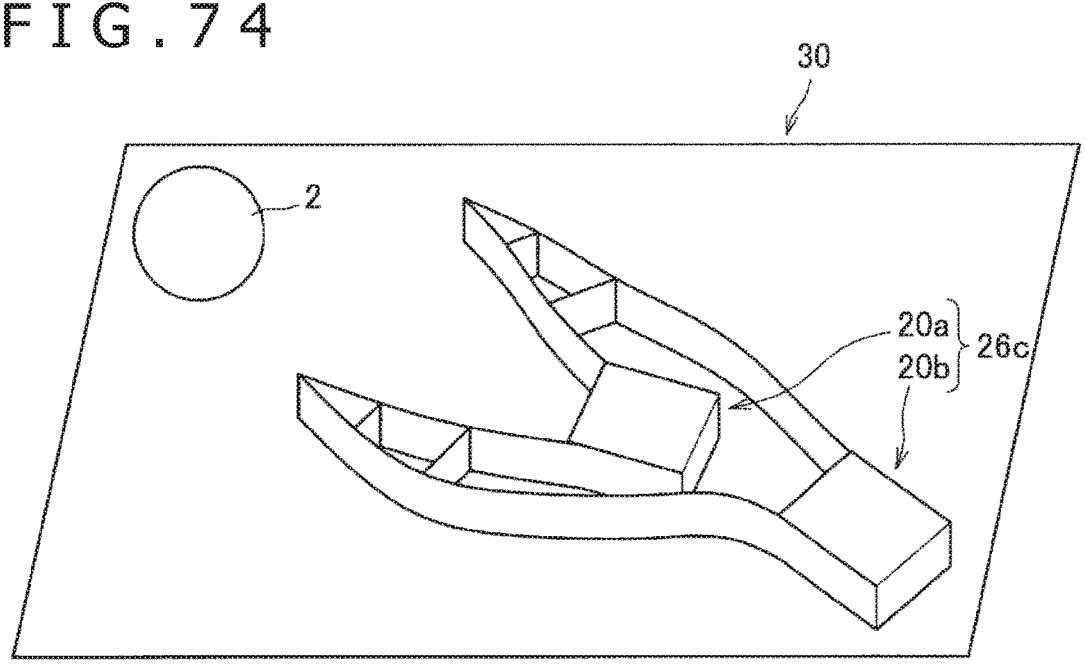
FIG. 74 is a diagram illustrating a third example of cooperative control of two trolleys 20 according to the seventeenth embodiment.
Figure 75:
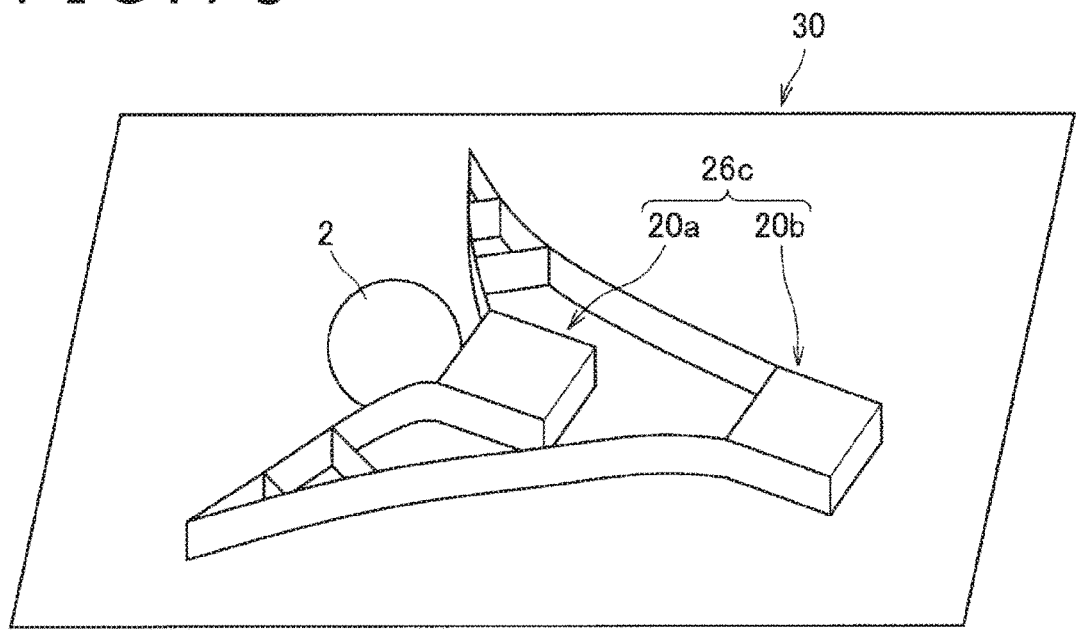
FIG. 75 is a diagram illustrating the third example of cooperative control of two trolleys 20 according to the seventeenth embodiment.
Figure 76:
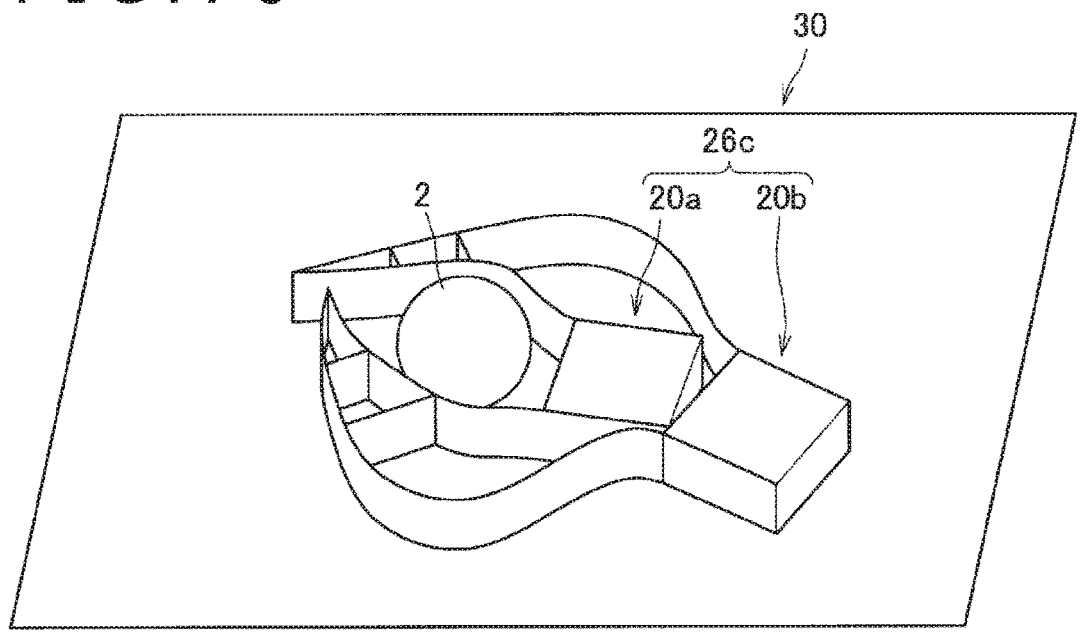
FIG. 76 is a diagram illustrating the third example of cooperative control of two trolleys 20 according to the seventeenth embodiment.

18-2-1-3. Third Example of Cooperative Control: Structure for Grabbing Object FIGS. 74 to 76 are diagrams illustrating a third example of cooperative control of the trolley set 26. As illustrated in FIGS. 74 to 76, the third example of cooperative control is an example of controlling a trolley set 26c such that the trolley set 26c moves in, for example, a movement pattern (hereinafter, referred to as third movement pattern) of jumping on to another object 2 arranged on the mat 30 to grab the object 2.

For example, the user may first bring the trolley set 26c close to the predetermined sheet-like medium, and based on this, the third movement pattern may be associated with the trolley set 26c. Subsequently, in the initial setting mode, when the user places two trolleys 20 (trolley set 26c) on, for example, the mat 30 and then presses, for example, a start button in the operation unit 122, the control unit 100 may automatically recognize the position of the trolley 20a in front and the position of the trolley 20b in back (of the two trolleys 20 as illustrated in FIG. 74). In this way, the handicraft size of the trolley set 26c (for example, size of paper to be pasted on two trolleys 20) may be confirmed.

Example of Control 1

Subsequently, when the trolley 20a in front is moved based on, for example, the operation on the operation unit 122 associated with the trolley 20a in front, the motion control unit 106 may control (automatically) the motion of the trolley 20b in back such that the trolley 20b in back follows the trolley 20a in front in a smooth curve.

Example of Control 2

Furthermore, when a predetermined condition is met, the motion control unit 106 controls the two trolleys 20 such that the two trolleys 20 jump on to and grab the object 2 positioned near the trolley 20a in front as illustrated in FIGS. 75 and 76. The predetermined condition may be that the user performs a predetermined operation on the operation unit 122 or may be that the distance between the trolley 20a in front and the trolley 20b in back becomes equal to or smaller than a predetermined distance. This can realize a motion of grabbing the object 2 when the distance between the trolley 20a in front and the trolley 20b in back becomes equal to or smaller than the predetermined distance.

Note that, for example, the trolley set 26c can also move while grabbing the object 2 (as illustrated in FIG. 76) based on the control of the motion control unit 106 or the operation of the user on the operation unit 122.

Figure 77:
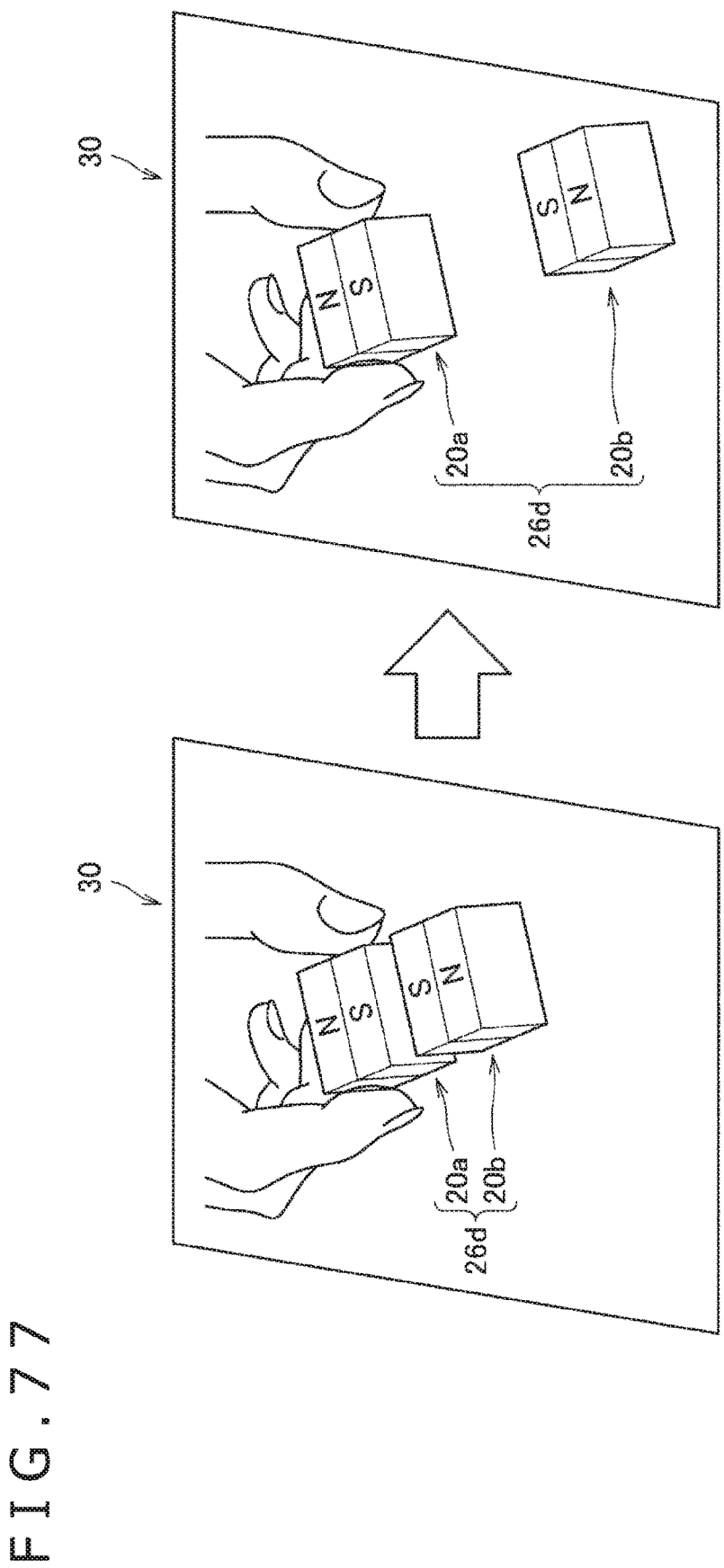
FIG. 77 is a diagram illustrating a fourth example of cooperative control of two trolleys 20 according to the seventeenth embodiment.

18-2-1-4. Fourth Example of Cooperative Control: Movement Replicating Physical Phenomenon FIG. 77 is a diagram illustrating a fourth example of cooperative control of the trolley set 26. As illustrated in FIG. 77, the fourth example of cooperative control is an example of controlling a trolley set 26d such that the trolley set 26d moves with a movement replicating a physical phenomenon (for example, movement pattern of repulsion and attraction of two permanent magnets (hereinafter, referred to as fourth movement pattern) or the like).

For example, the user may first bring the individual trolleys 20 close to the predetermined sheet-like medium, and based on this, the "attributes of magnet" may be associated with the trolleys 20. More specifically, the north pole may be associated with part (such as front half) of the trolley 20, and the south pole may be associated with the remaining part (such as back half) of the trolley 20.

Subsequently, as illustrated in FIG. 77, in a case where a plurality of trolleys 20 associated with the "attributes of magnet" are arranged on the mat 30, the motion control unit 106 controls, for each trolley 20a, the motion of the plurality of trolleys 20 based on the "magnetic pole" associated with part of the trolley 20a closer to the other trolley 20b and based on the distance between the trolley 20a and the other trolley 20b. For example, as illustrated in the diagram on the left in FIG. 77, when the part associated with the "south pole" in one trolley 20a and the part associated with the "south pole" in another trolley 20b come close to each other, the motion control unit 106 controls the trolley 20b such that the trolley 20b is repelled (for example, moved back) from the trolley 20a as illustrated in the diagram on the right in FIG. 77.

Modifications

For a modification, only one magnetic pole (that is, "north pole" or "south pole") may be associated with the individual trolleys 20. In this case, magnets with only one magnetic pole (not existing in the real world) can also be artificially created.

Alternatively, coefficients of static friction, coefficients of dynamic friction, or the like may be set as values of parameters. In this case, the motion control unit 106 may control the movement speed and the like of the individual trolleys 20 based on the values of the parameters.

Alternatively, the motion control unit 106 can also control the movement of two trolleys 20 as if there is elastic force of rubber between the two trolleys 20. For example, the motion control unit 106 may control one trolley 20a such that the trolley 20a follows another trolley 20b with a little delay. This can realize a movement as if the trolley 20a is pulled by the trolley 20b.

Alternatively, the motion control unit 106 can also control the numbers of rotations of both wheels of the trolley 20 to realize a movement as if the toy 40 arranged on the trolley 20 is stopped at the center of rotation.

18-3. Advantageous Effect

As described above, according to the seventeenth embodiment, two trolleys 20 can be cooperatively controlled. As a result, for example, movements of creatures can be realized as in the first to third examples of cooperative control. Note that as suggested above, the distance between two independent trolleys 20 may be restricted to equal to or smaller than a distance according to the size of the replicated creature, and the two trolleys 20 may move differently at the same time. It may be assumed that this increases the reproducibility of the creature reproduced by the two trolleys 20.

18-4. Modifications 18-4-1. Modification 1

The seventeenth embodiment is not limited to the examples. For example, depending on the type of movement pattern (for example, type of creature or the like) associated with the two trolleys 20 and the positional relationship between the two trolleys 20 at the start, the two trolleys 20 may become unable to move or may break down when the two trolleys 20 are operated.

Figure 78:
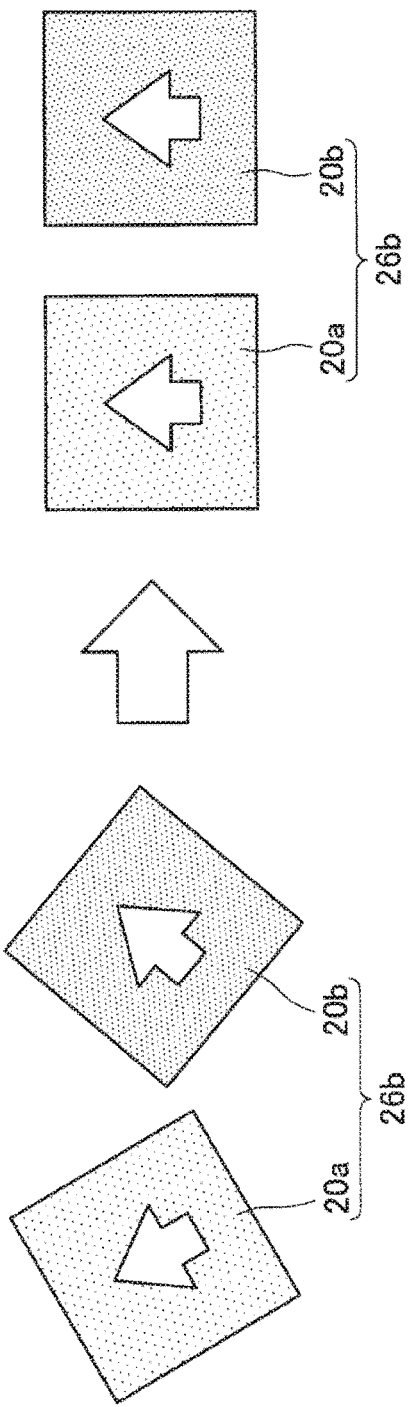
FIG. 78 is a diagram illustrating an example of changing the positional relationship between two trolleys 20 according to the seventeenth embodiment.
Figure 79:
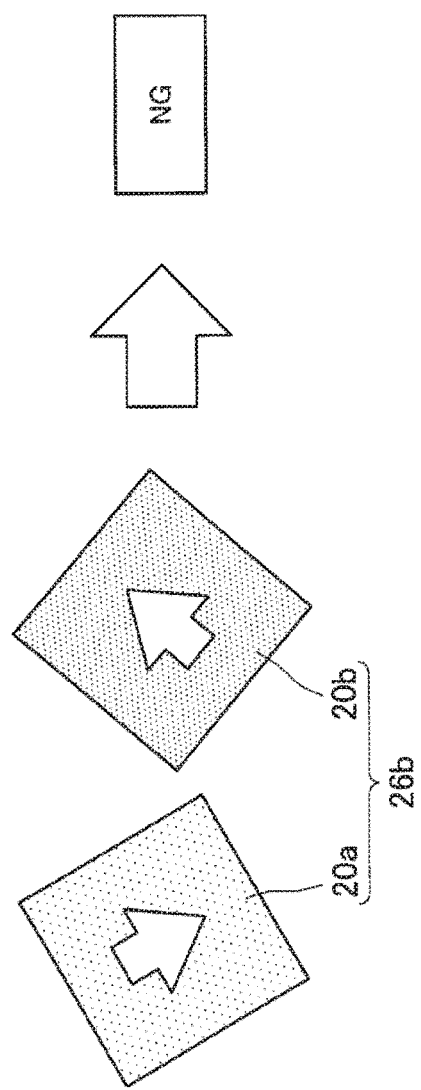
FIG. 79 is a diagram illustrating an example when the positional relationship between two trolleys 20 cannot be changed according to the seventeenth embodiment.

Therefore, the motion control unit 106 may first determine whether or not the positional relationship between the two trolleys 20 needs to be changed based on the type of movement pattern associated with the two trolleys 20 and the current positional relationship between the two trolleys 20. Then, in a case where the motion control unit 106 determines that the positional relationship between the two trolleys 20 needs to be changed, the motion control unit 106 may control the motion of the two trolleys 20 to change the positional relationship between the two trolleys 20 based on the determination result. In this case, as illustrated, for example, in FIG. 78, the motion control unit 106 may move or rotate both of (or only one of) the two trolleys 20 such that the positional relationship between the two trolleys 20 becomes a default positional relationship. Alternatively, in a case where the motion control unit 106 determines that it is impossible (or difficult) to automatically change the positional relationship between the two trolleys 20 to the default positional relationship, the output control unit 108 may cause the sound output unit 126 (or the trolley 20) to output an error sound or may cause the display unit 124 (or the trolley 20) to display an error as illustrated in FIG. 79.

18-4-2. Modification 2

Usually, the types and the characteristics of motors, motor drivers, gears, and the like in the individual trolleys 20 may vary. Therefore, even in a case where the information processing apparatus 10 controls each of the plurality of trolleys 20 such that, for example, the plurality of trolleys 20 move in the same direction, part of the plurality of trolleys 20 may move in different directions.

Figure 80:
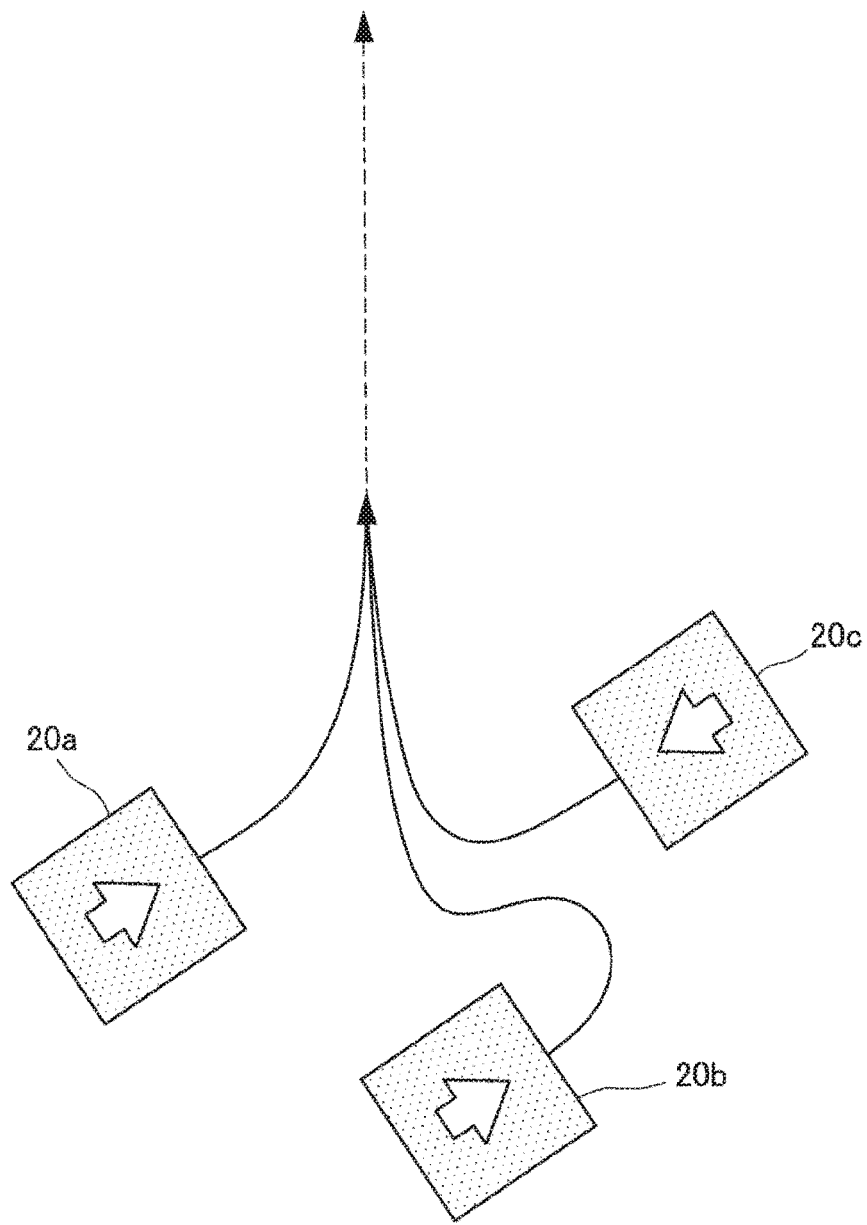
FIG. 80 is a diagram illustrating an example of correcting the movement directions of the trolleys 20 according to the seventeenth embodiment.

Therefore, for each trolley 20, the motion control unit 106 can use the angle information (and the position information) read by the trolley 20 from the mat 30 to control the movement direction of the trolley 20 as needed. For example, for each trolley 20, the motion control unit 106 can control the movement direction of the trolley 20 (such as by changing the movement direction) based on the angle information acquired by the trolley 20 such that the movement direction of the trolley 20 becomes the same as the movement instruction direction for the trolley 20 as illustrated in FIG. 80.

18-4-3. Modification 3

Figure 81:
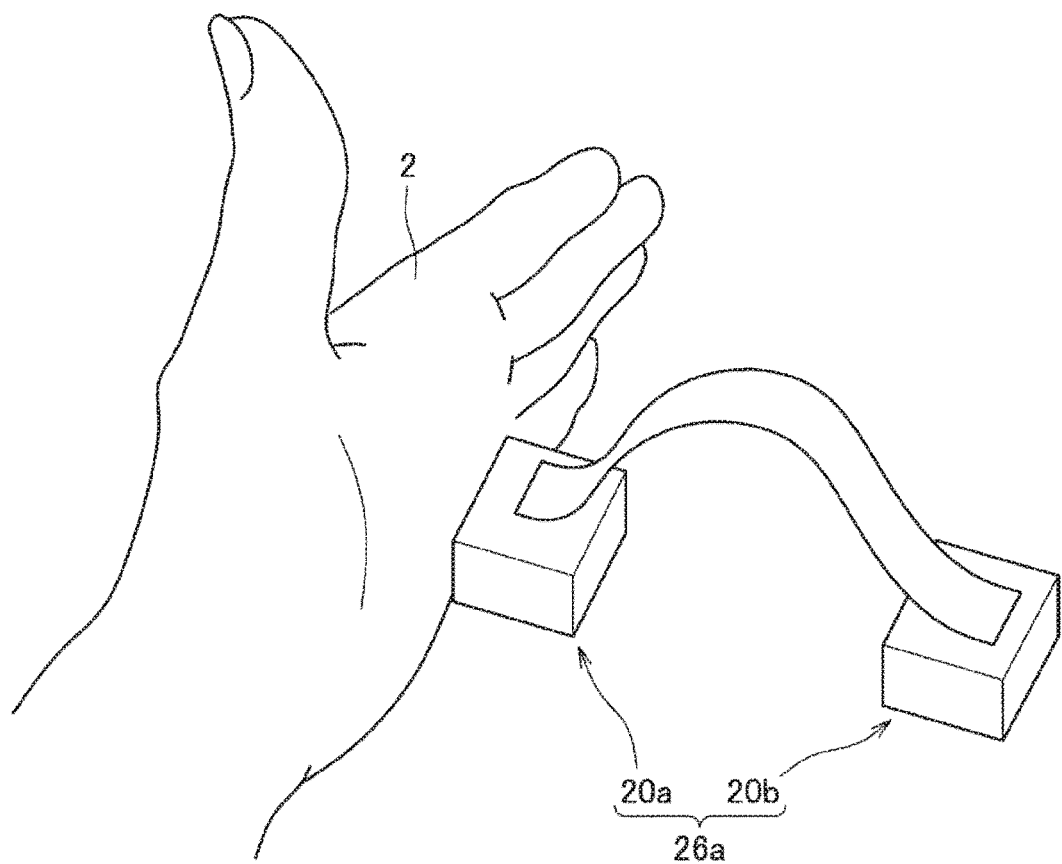
FIG. 81 is a diagram illustrating a situation in which the trolley 20 has touched another object.

As described above, whether or not the trolley 20 has touched another object can be determined based on, for example, the measurement result of the acceleration sensor in the trolley 20. On the other hand, it may be difficult to specify the type of object touched by the trolley 20. As a result, the movement of the trolley 20 may be restricted as illustrated in FIG. 81.

Therefore, when, for example, it is determined that the length of duration of the rotation of the motor in the trolley 20 has reached a predetermined time while it is determined that the amount of change in the position information of the trolley 20 is within a predetermined threshold, the motion control unit 106 may determine that the object restricting the movement of the trolley 20 is in the movement direction of the trolley 20. Furthermore, in this case, the motion control unit 106 may temporarily stop controlling the movement (such as control to go forward and control to rotate) of the trolley 20.

Furthermore, in the case of, for example, the control to go forward, the motion control unit 106 may cause the trolley 20 to temporarily go back and detour to the left and right. This can realize a movement that the trolley 20 has "detected an obstacle and avoided the obstacle." Therefore, a movement more similar to a creature can be realized.

19. Hardware Configuration

Figure 82:
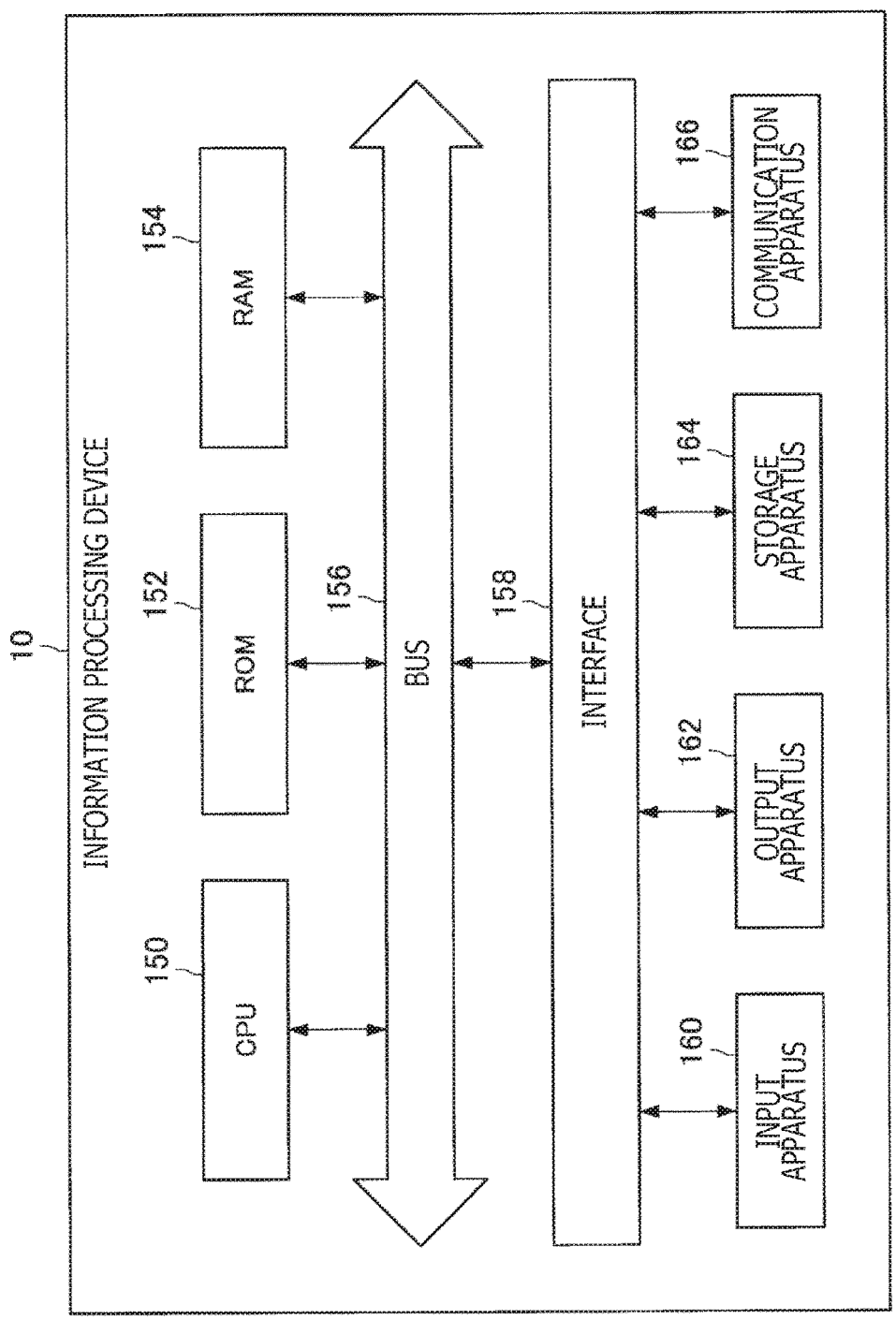
FIG. 82 is an explanatory diagram illustrating an example of hardware configuration of the information processing apparatus 10 common to the embodiments.

The embodiments have been described. Next, a hardware configuration of the information processing apparatus 10 common to the embodiments will be described with reference to FIG. 82. As illustrated in FIG. 82, the information processing apparatus 10 includes the CPU 150, a read only memory (ROM) 152, a random access memory (RAM) 154, a bus 156, an interface 158, an input apparatus 160, the output apparatus 162, the storage apparatus 164, and the communication apparatus 166.

The CPU 150 functions as an operation processing apparatus and a control apparatus and controls the entire operation in the information processing apparatus 10 according to various programs. The CPU 150 also realizes the functions of the control unit 100. The CPU 150 includes a processor such as a microprocessor.

The ROM 152 stores programs, control data such as operation parameters, and the like used by the CPU 150.

The RAM 154 temporarily stores, for example, programs executed by the CPU 150, data in use, and the like.

The bus 156 includes a CPU bus or the like. The bus 156 mutually connects the CPU 150, the ROM 152, and the RAM 154.

The interface 158 connects the storage apparatus 164 and the communication apparatus 166 to the bus 156.

The input apparatus 160 includes: input means for the user to input information (for example, a touch panel, a button, a switch, a dial, a lever, a microphone, or the like); an input control circuit that generates an input signal based on input by the user and that outputs the input signal to the CPU 150; and the like. The input apparatus 160 may realize the functions of the operation unit 122.

The output apparatus 162 includes, for example, a display apparatus, such as an LCD apparatus, an OLED apparatus, a projector, a lamp, and the like. The output apparatus 162 also includes a sound output apparatus such as a speaker. The output apparatus 162 may realize the functions of the display unit 124 and the sound output unit 126.

The storage apparatus 164 is an apparatus for data storage that functions as a storage unit 130. The storage apparatus 164 includes, for example, a storage medium, a recording apparatus that records data in the storage medium, a reading apparatus that reads data from the storage medium, a deletion apparatus that deletes the data recorded in the storage medium, and the like.

The communication apparatus 166 is, for example, a communication interface including a communication device (for example, a network card) for connection to a communication network, such as the Internet and a local area network (LAN). The communication apparatus 166 may also be a communication apparatus corresponding to wireless LAN, a communication apparatus corresponding to long term evolution (LTE), or a wire communication apparatus for wired communication. The communication apparatus 166 may realize the functions of the communication unit 120.

20. Modifications

Although the preferred embodiments of the present disclosure have been described in detail with reference to the attached drawings, the present disclosure is not limited to the examples. It is apparent that those with normal knowledge in the technical field of the present disclosure can conceive various changes or modifications within the scope of the technical concept described in the claims, and it is understood that the changes or the modifications obviously belong to the technical scope of the present disclosure.

20-1. Modification 1

Figure 83:
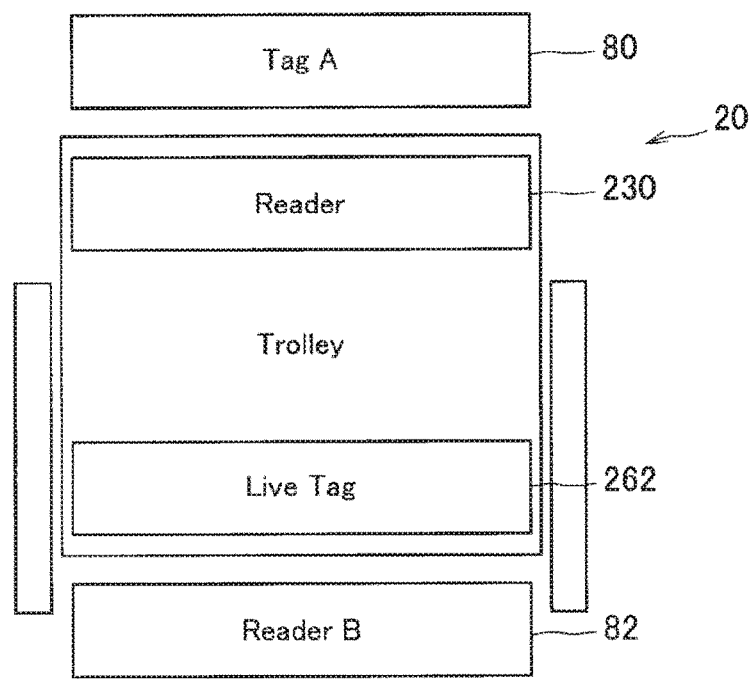
FIG. 83 is a diagram illustrating an example of the trolley 20 provided with a near field wireless communication unit 230 according to modification 1 of the present disclosure.

For example, as illustrated in FIG. 83, the near field wireless communication unit 230 (for example, NFC reader/writer) may be installed near the upper surface in the trolley 20, and a live tag 262 (for example, software tag) may be installed near the bottom surface in the trolley 20. A reader 82 (for example, NFC reader) may be further installed in the mat 30. In this case, when the user brings a tag 80 (for example, NFC tag) close to the upper surface of the trolley 20 as illustrated in FIG. 83, the trolley 20 can transmit information read from the tag 80 to the reader 82. For example, the near field wireless communication unit 230 first reads the information stored in the tag 80. Next, the control unit 200 rewrites the information stored in the live tag 262 with the information read from the tag 80. The information newly stored in the live tag 262 is then transmitted to the reader 82 positioned directly under the trolley 20. In this way, the user can transmit the information of the tag 80 to the area of the position of the trolley 20 in the mat 30.

For example, when the toy 40 (such as a doll) provided with NFC is placed on the trolley 20, the trolley 20 may read the information indicating the type of toy 40 from the toy 40 and then transmit the read information to the reader 82 in the mat 30. In this way, the information processing apparatus 10 or the mat 30 can recognize the type of toy 40 placed on the trolley 20.

20-2. Modification 2

20-2-1. Change of Parameters

Figure 84:
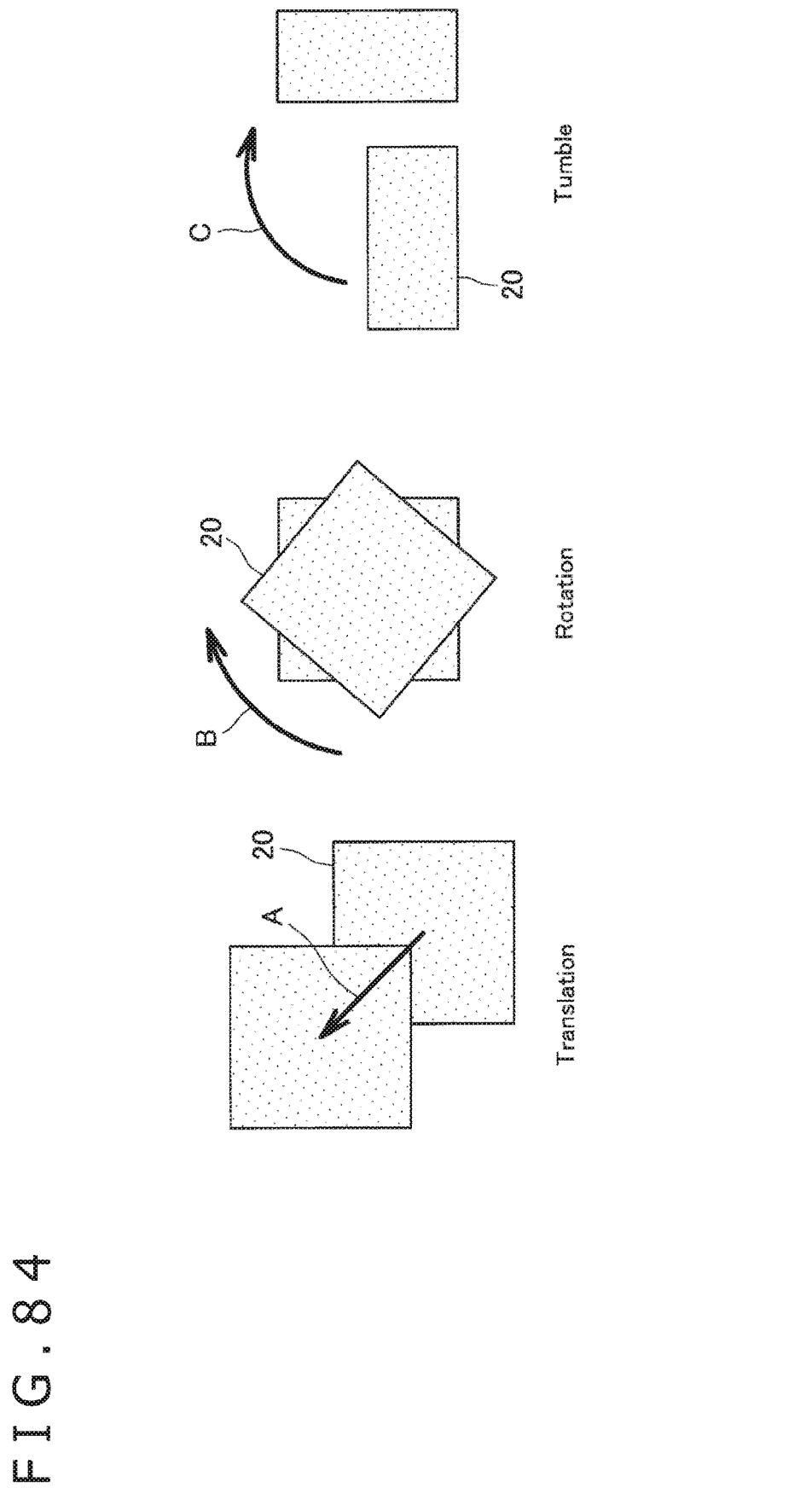
FIG. 84 is a diagram illustrating an example of using the trolley 20 as a user interface.

In another modification, the trolley 20 can also be used as a certain user interface. For example, as indicated by an arrow A in FIG. 84, the values of parameters associated with the trolley 20 (or the translation of the trolley 20) may be dynamically changed according to the movement distance and the movement direction when the user translates the trolley 20. Alternatively, as indicated by an arrow B illustrated in FIG. 84, the values of parameters associated with the trolley 20 (or the rotation of the trolley 20) may be dynamically changed according to the amount of rotation (such as rotation angle and rotation direction) when the user rotates the trolley 20. Alternatively, as indicated by an arrow C illustrated in FIG. 84, the values of parameters associated with the trolley 20 (or the tumble state of the trolley 20) may be dynamically changed in a case where the user tumbles the trolley 20 or raises up the trolley 20. Note that the movement information (translation, rotation, tumble, and the like) may be specified according to the position information or the acceleration sensed by the trolley 20.

Furthermore, in a case where the trolley 20 includes a force sensor, the values of parameters associated with the trolley 20 may be dynamically changed according to the strength of force sensed by the force sensor.

Figure 85:
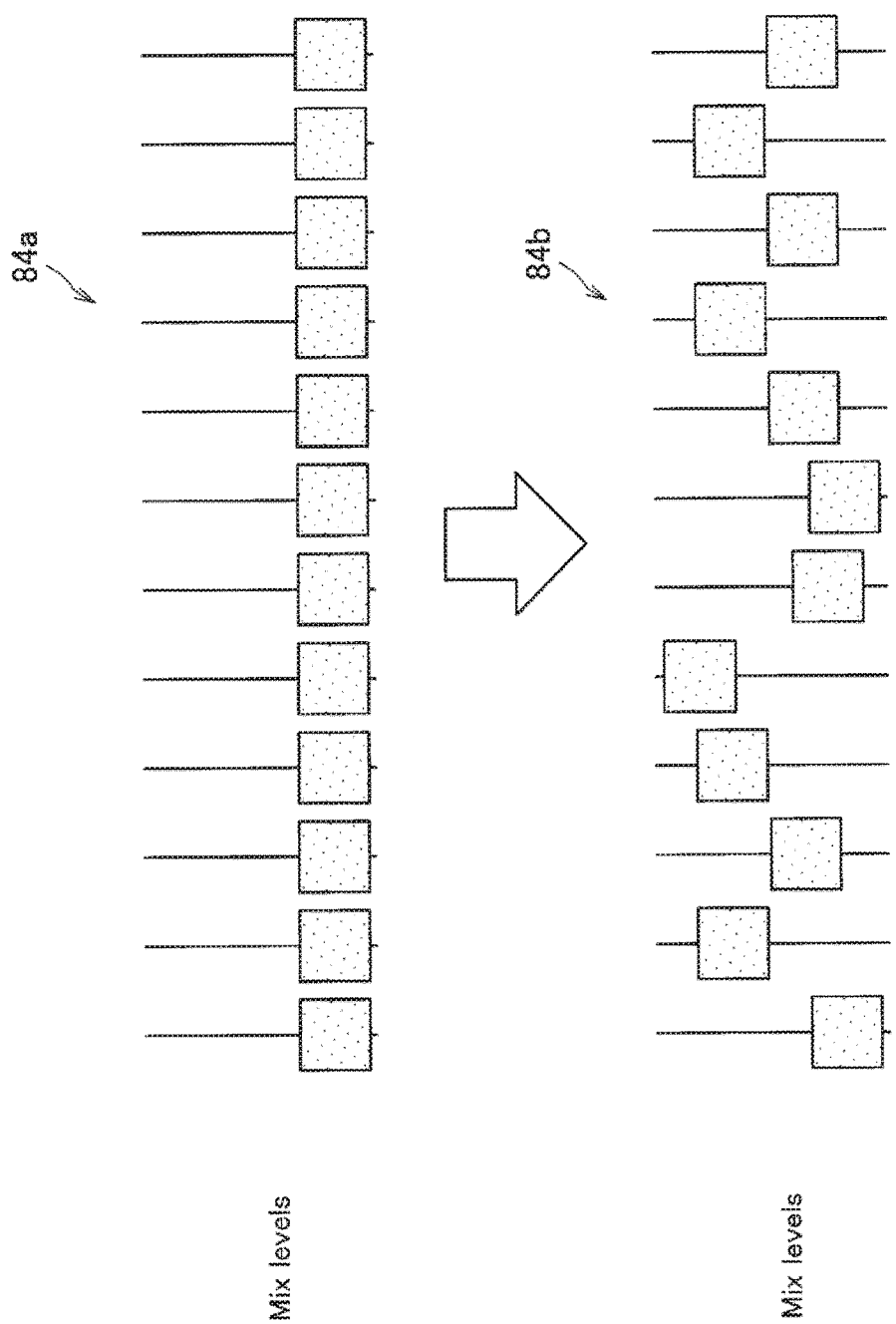
FIG. 85 is a diagram illustrating an example of using the trolley 20 as a user interface.

For example, the movement information may be used as a user interface for a music application. For example, the pitch of sound, the volume, the tempo, the tone, and the like may be dynamically changed as the user moves the trolley 20. Alternatively, level values of various parameters in a mixer may be dynamically changed as illustrated in FIG. 85 as the user moves the trolley 20.

20-2-2. Feedback of Change of Parameters

Furthermore, when the values of parameters are changed, the trolley 20 may cause the display unit 224 (of the trolley 20) to display the display indicating the changed values of parameters. For example, the trolley 20 may change the color, the pattern, and the like of the light emitted by the display unit 224 according to the changed values of parameters. Alternatively, the trolley 20 may cause the sound output unit 226 to output sound corresponding to the changed values of parameters. For example, the trolley 20 may change the type, the volume, and the like of the sound output by the sound output unit 226 according to the changed values of parameters.

20-3. Modification 3

Figure 86:
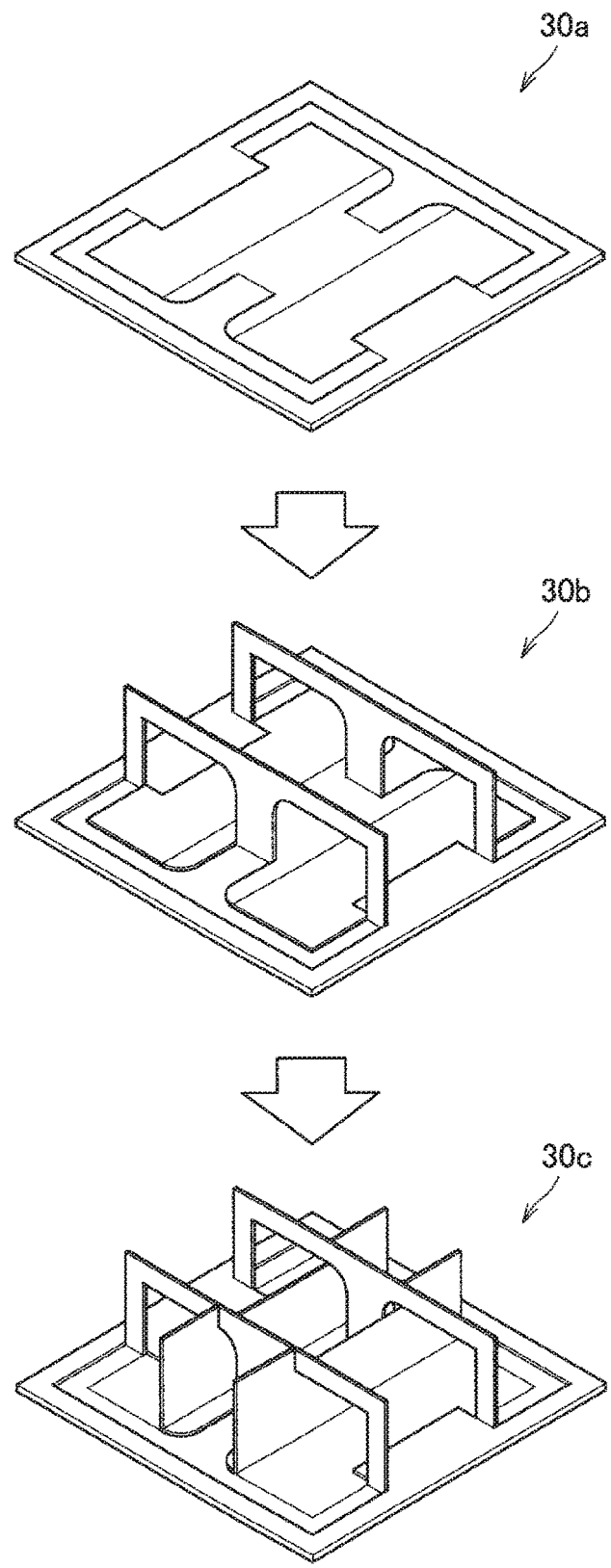
FIG. 86 is a diagram illustrating an example of the shape of the mat 30 according to modification 3 of the present disclosure.

Although the shape of the mat 30 is like a plate in the example illustrated in FIG. 1, the shape is not limited to the example. In a modification, the mat 30 may have a foldable shape to allow raising the mat 30 as illustrated in FIG. 86. In the example illustrated in FIG. 86, the mat 30 is formed to allow similarly raising the height of the bottom regardless of whether the mat 30 is folded in the vertical direction or in the horizontal direction. Note that the folding pattern is not limited to the example.

Figure 87:
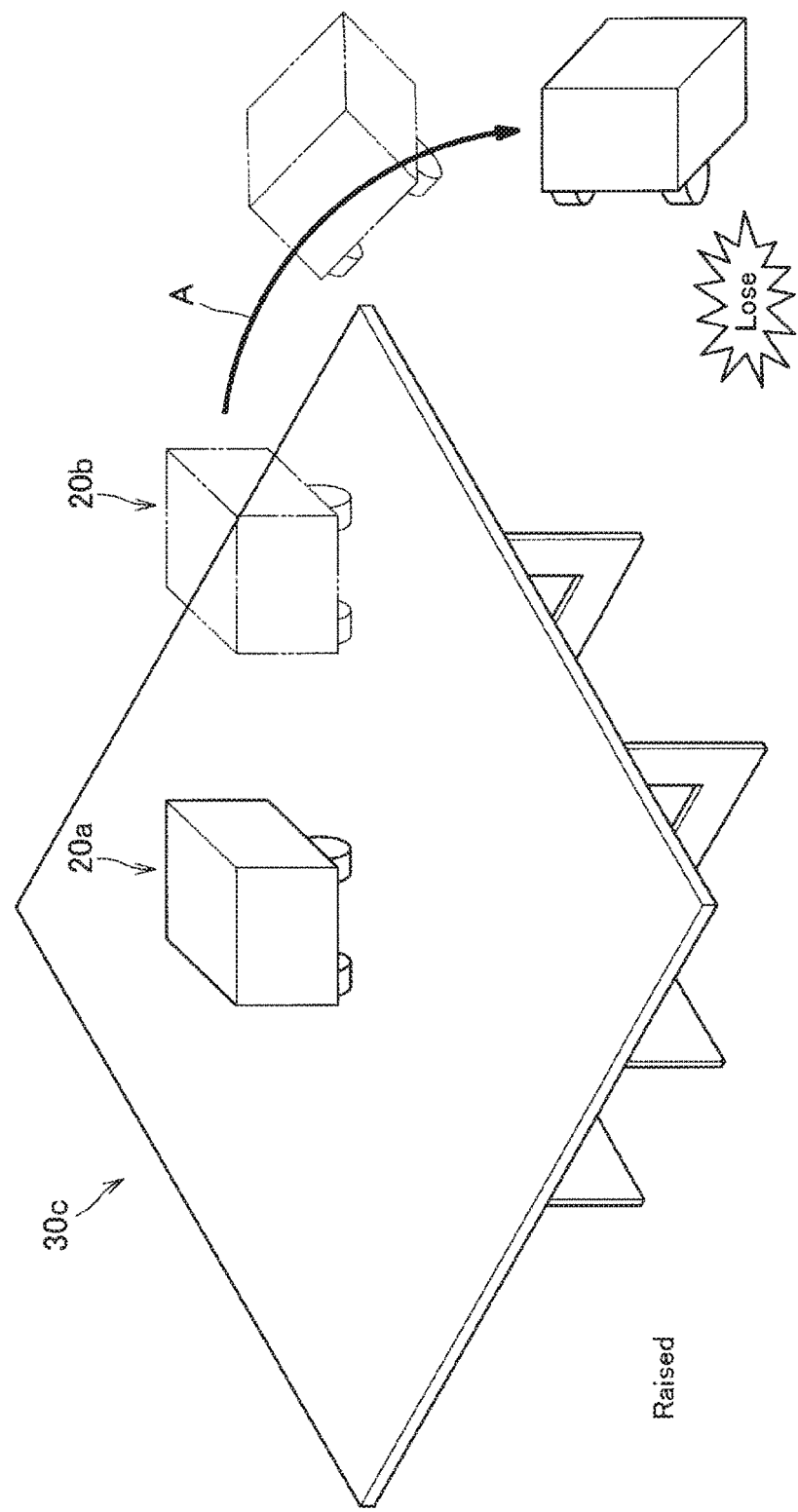
FIG. 87 is a diagram illustrating an example of the shape of the mat 30 according to modification 3 of the present disclosure.

FIG. 87 is a diagram illustrating a situation in which the mat 30 illustrated in FIG. 86 is folded to raise the bottom, and the trolley 20 is placed on the upper surface of the mat 30. As illustrated in FIG. 87, according to the modification, one mat 30 can realize a shape like a wrestling ring. This can further utilize the advantage of the game played in the real space.

Note that as described above, the information processing apparatus 10 can specify whether or not the trolley 20 has fallen off from the mat 30 based on the measurement value of the acceleration sensor in the trolley 20, the history of the position information read by the trolley 20 from the mat 30, and the like.

20-4. Modification 4

Figure 88:
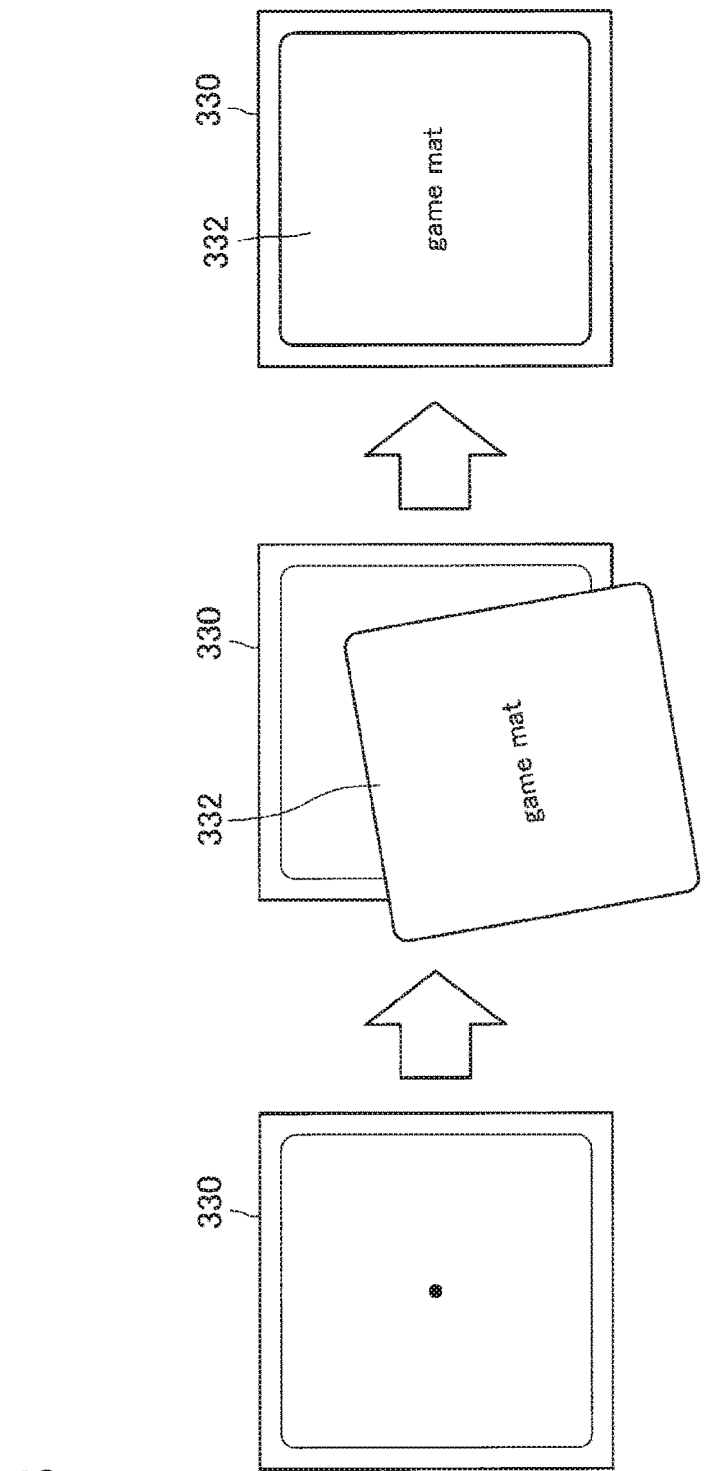
FIG. 88 is a diagram illustrating an example of the shape of the mat 30 according to modification 4 of the present disclosure.
Figure 89:
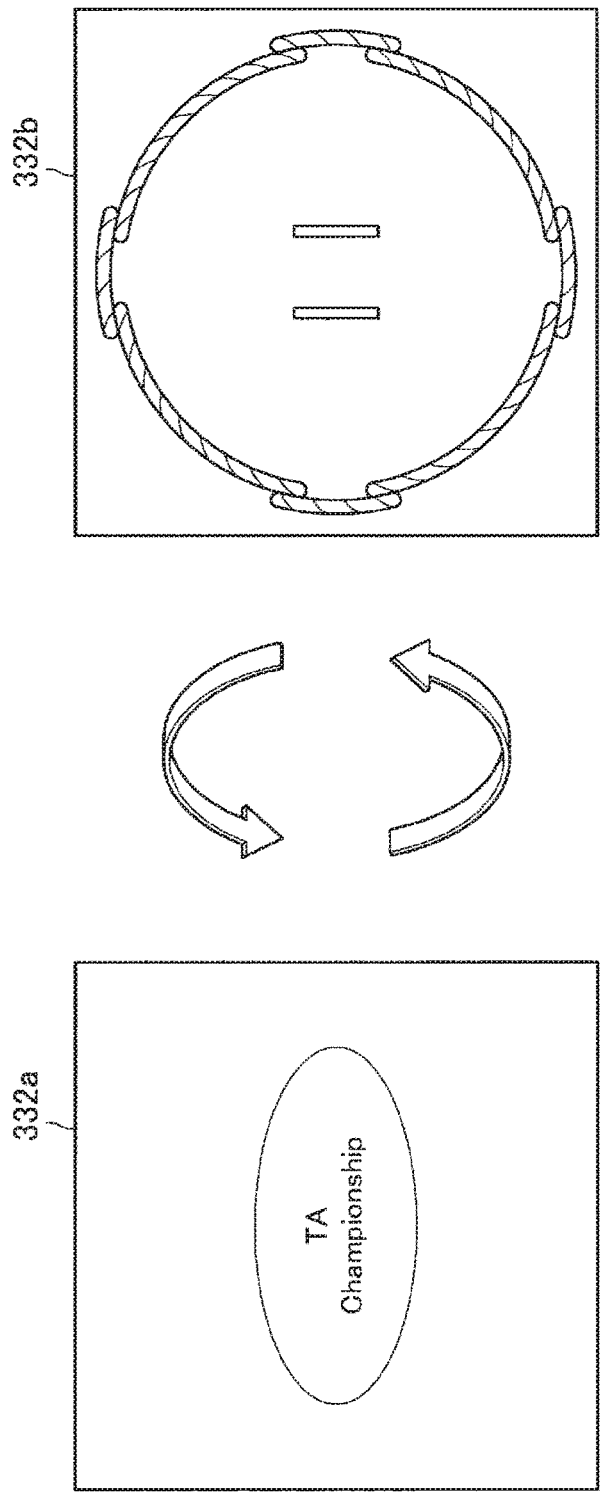
FIG. 89 is a diagram illustrating an example of the shape of the mat 30 according to modification 4 of the present disclosure.
Figure 90:
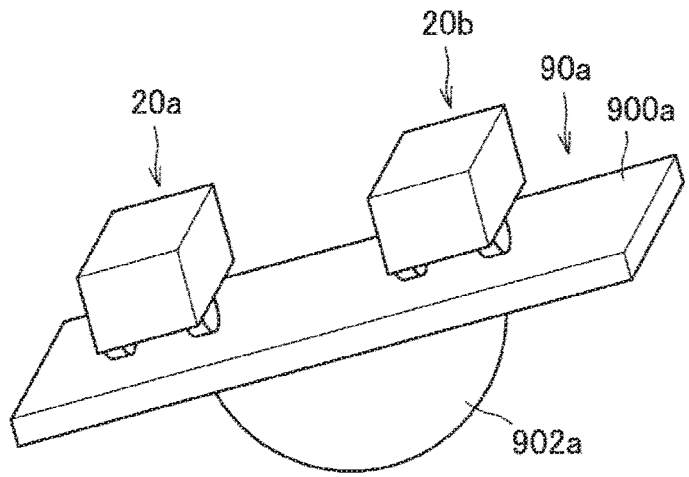
FIG. 90 is a diagram illustrating an example of the shape of a mat 90 according to modification 5 of the present disclosure.
Figure 91:
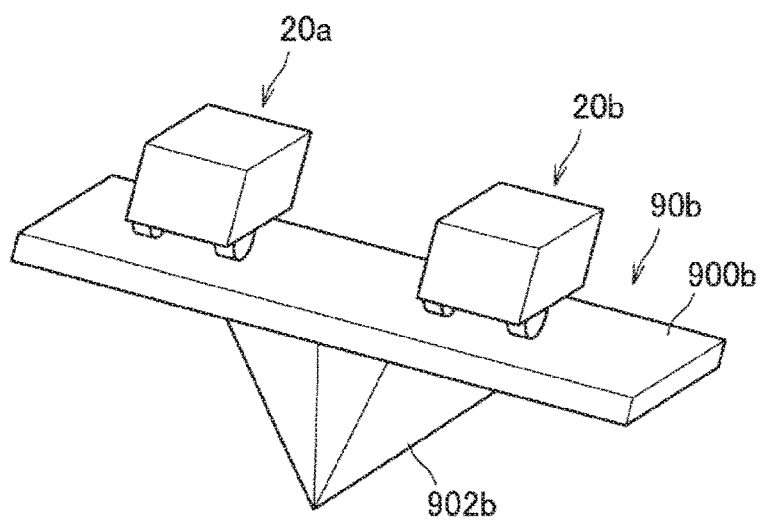
FIG. 91 is a diagram illustrating an example of the shape of the mat 90 according to modification 5 of the present disclosure.
Figure 92:
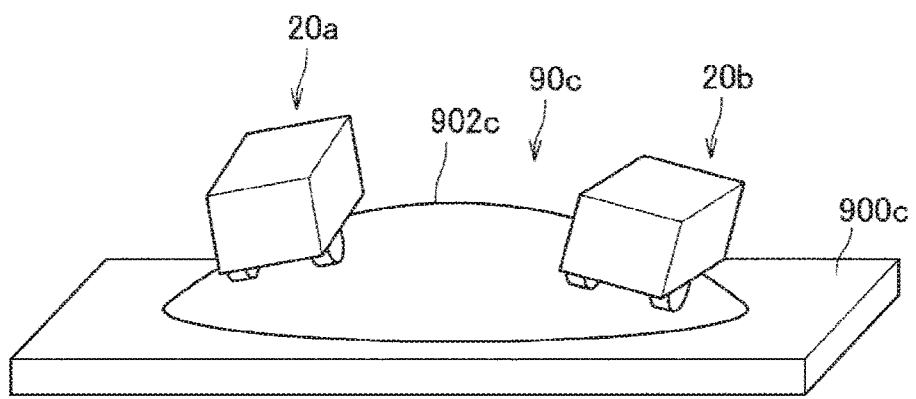
FIG. 92 is a diagram illustrating an example of the shape of the mat 90 according to modification 5 of the present disclosure.
Figure 93:
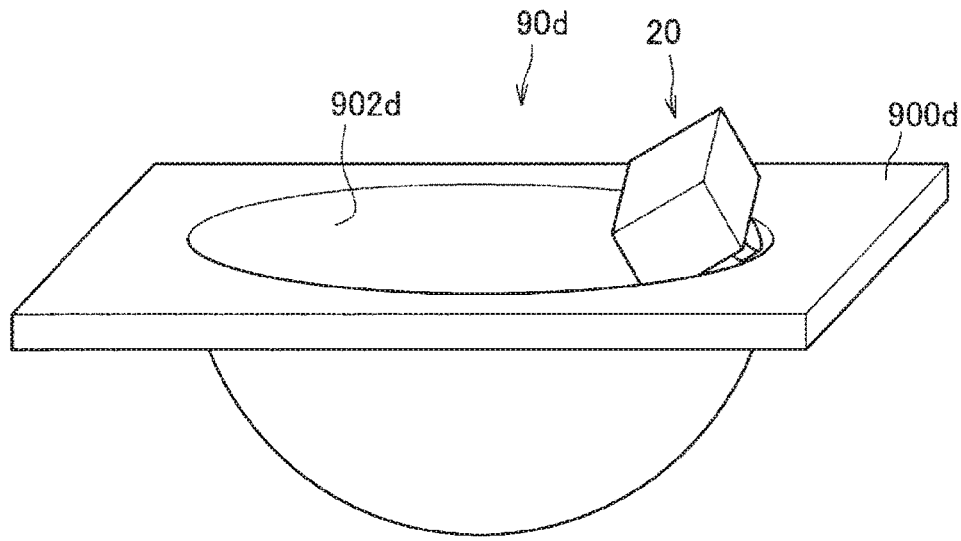
FIG. 93 is a diagram illustrating an example of the shape of the mat 90 according to modification 5 of the present disclosure.

In another modification, the mat 30 may include three layers (a medium 330 (for example, chipboard paper or the like) and two mats 332) as illustrated in FIG. 88. Specifically, the mats 332 may be fixed to both surfaces of the medium 330. The position information is recorded in the individual mats 332 in, for example, a grid pattern (as in the mat 30). According to the modification, two types of games can be realized by one mat 30 as illustrated in FIG. 89. That is, different games can be realized by placing a front surface 332*a* facing up and placing a back surface 332*b* facing up.

20-5. Modification 5

Figure 94:
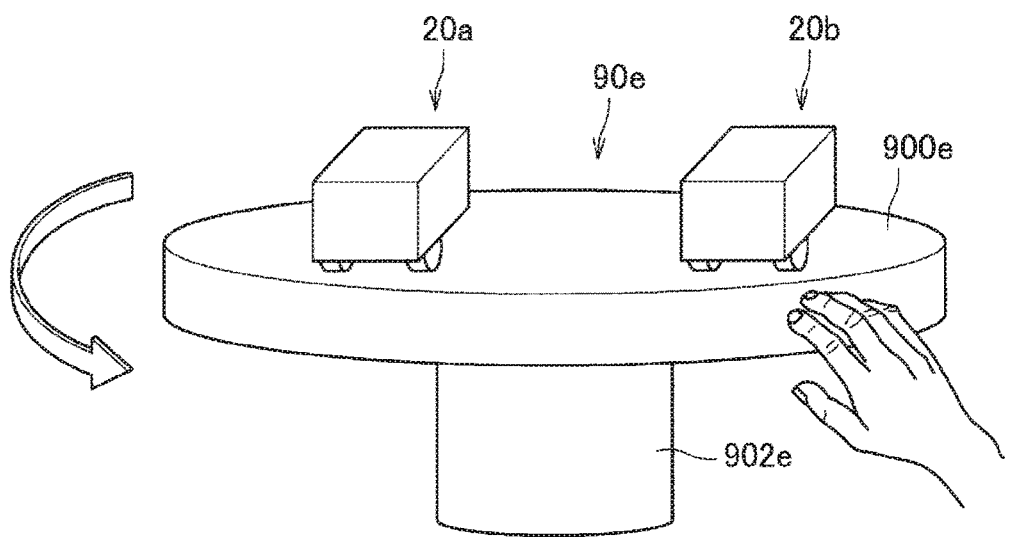
FIG. 94 is a diagram illustrating an example of the shape of the mat 90 according to modification 5 of the present disclosure.

In another modification, a mat 90 in another shape as illustrated in FIGS. 90 to 94 may be used in place of the mat 30 illustrated in FIG. 1. For example, a hemispherical object 902*a* may be fixed under a mat portion 900*a* as in a mat 90*a* illustrated in FIG. 90. Alternatively, an object 902*b* in a pyramid shape (for example, quadrangular pyramid, hexagonal pyramid, or the like) may be fixed under a mat portion 900*b* as in a mat 90*b* illustrated in FIG. 91. Alternatively, for example, a protrusion 902*c* on which the trolley 20 can move may be installed on a mat portion 900*c* as in a mat 90*c* illustrated in FIG. 92. Alternatively, for example, a hole 902*d* larger than the size of the trolley 20 may be provided in a mat portion 900*d* as in a mat 90*d* illustrated in FIG. 93. Alternatively, the mat 90 may be shaped like a turntable. For example, as illustrated in FIG. 94, a mat portion 900*e* may be installed on a base 902*e*, and the mat portion 900*e* may be automatically or manually rotatable. In the cases of using the mats 90, further physical advantageous effects can be introduced in the games.

20-6. Modification 6

The functions of the information processing apparatus 10 according to the embodiments may be realized by one computer or may be realized by a plurality of computers operating together. In addition, the information processing apparatus 10 may include a plurality of apparatuses.

20-7. Modification 7

Although the information processing apparatus 10 is a gaming device as illustrated in FIG. 1 in the examples described in the embodiments, the information processing apparatus 10 is not limited to the example. For example, the information processing apparatus 10 may be a server, a general-purpose personal computer (PC), a tablet terminal, a mobile phone such as a smartphone, a portable music player, a television receiver, a wearable device such as a head mounted display (HMD), a robot, or the like.

20-8. Modification 8

In another modification, a drone (flying object) may be adopted in place of the trolley 20. The drone is an example of a moving body according to the present disclosure. Note that the information processing apparatus 10 may be incorporated into the drone or may be incorporated into a device such as a smartphone.

Hereinafter, details of the modification will be more specifically described. Conventionally, there is a known method in which a marker indicating the takeoff and landing of the drone or indicating a specific place is installed, and an imaging apparatus that is provided on the drone and that takes an image of a region below takes an image of the installed marker to thereby assist the motion control of the drone. In addition, sensor data obtained from an image sensor, a global positioning system (GPS) sensor, an inertial sensor, an ultrasonic sensor, a barometer, and the like is independently or integrally used in the conventional drone to detect the position of the drone in an outdoor space. However, the position detection accuracy of the sensor data for outdoor space is not sufficient for controlling the position of the drone in a relatively narrow space such as an indoor space. Therefore, an improvement in the position detection accuracy of the drone is expected to control the flight of the drone in the indoor space.

For the flight control of the drone, the position information indicating the array pattern in the present disclosure may be used to control the flight path of the drone. Note that the "array pattern" here includes conventionally used markers. In addition, the motion control in the trolley 20 may be applied to the flight control of the drone in the present disclosure unless otherwise explicitly mentioned.

In the present disclosure, the flight of the drone is controlled based on a plurality of pieces of position information included in the array pattern. The array pattern may be printed on a single mat or may be printed on a plurality of mats as in the embodiments regarding the trolley 20. Alternatively, an information medium other than the mat may be appropriately adopted. In addition, the flight of the drone may be controlled such that the drone autonomously moves between mats separated from each other and arranged in a predetermined positional relationship. Each mat may indicate at least one piece of position information of the mat that the drone will go next. Alternatively, a data table including the data of each mat recorded in advance may be downloaded from the network to the drone, and the flight between the mats may be controlled by comparing the code of each mat and the data table.

The embodiments in which the mats are separately arranged are suitable not only for the flight control in the indoor space, but also for the flight control in the outdoor space. Specifically, an array pattern indicating the position information corresponding to an intermediate point may be installed on each of a plurality of intermediate points on the flight path connecting the takeoff point and the landing point of the drone in the outdoor space. Then, the autonomous flight or the manual flight of the drone can be controlled based on the intermediate points installed in this way. Note that the flight control through the intermediate points provided with the array patterns may be applied in combination (in an integrated manner) with the flight control using the conventionally used GPS.

The configuration can provide flight control of the drone with a higher position detection accuracy than the position detection accuracy of the drone based on the GPS or the like.

The array pattern of the present disclosure may be used to detect the altitude of the flying drone. Specifically, the altitude of the drone can be detected based on the size of the array pattern acquired by image recognition, and the flight of the drone can be controlled based on the detected altitude. More specifically, it can be recognized that the smaller the size of the array pattern, the higher the altitude.

Note that in the case of controlling the altitude of the drone based on the array pattern of the takeoff and landing, the approach or the separation of the drone and the array pattern may cause the array pattern to become too large in the image so that the array pattern does not fall within the angle of view or may cause the array pattern to become too small in the image so that the array pattern is not recognized. To solve the problem, a first array pattern in a first size and a second array pattern in a second size larger than the first size can be arranged at substantially the same position in the real space. More specifically, the first array pattern and the second array pattern can be arranged such that the center of the first array pattern and the center of the second array pattern substantially coincide. When the combination of the array patterns is adopted, the center of the first array pattern is arranged at the center of the second array pattern. Therefore, to recognize the combination of the array patterns, the center of each array pattern can be recognized (ignored) by the drone as an area not provided with the control information including the position information. In addition, the size of the first array pattern can be equal to or smaller than the size of the area not including the control information in the second array pattern.

According to the configuration of the first array pattern and the second array pattern, the first array pattern will be recognized when the drone approaches the landing surface even in the case where the second array pattern does not fall within the angle of view in the landing of the drone. Therefore, the altitude of the drone can be highly accurately detected. As a result, the impact on the drone in the takeoff and landing, particularly in the landing, is reduced, and, for example, the product life cycle of the drone can be extended.

Regarding the control of the altitude of the drone, the altitude may be controlled according to the number of unit array patterns included in the angle of view, instead of the control of referencing the sizes of the individual array patterns. More specifically, it can be recognized that the larger the number of unit array patterns included in the angle of view, the higher the altitude. Note that the unit array pattern here can be understood as a minimum unit of the pattern indicating the position information, and it can be assumed that a plurality of unit array patterns are arranged on, for example, a single mat (information medium).

20-9. Modification 9

The steps in the flows of the processes in the embodiments may not be processed in the described orders. For example, the orders of the steps may be appropriately changed and processed. In addition, part of the steps may be processed in parallel or processed individually instead of processing the steps in chronological order. In addition, part of the steps may be skipped, or other steps may be further added.

According to the embodiments, a computer program for the hardware, such as the CPU 150, the ROM 152, and the RAM 154, to attain the functions equivalent to the components of the information processing apparatus 10 according to the embodiments can also be provided. In addition, a storage medium recording the computer program is also provided.

In addition, the advantageous effects described in the present specification are explanatory or illustrative only and are not intended to be restrictive. That is, the technique according to the present disclosure can attain other advantageous effects apparent to those skilled in the art from the description of the present specification, in addition to or in place of the advantageous effects described above.

Note that the following configuration also belongs to the technical scope of the present disclosure.

(1) An information processing apparatus including: an information acquisition unit that acquires position information from a sensor configured to read a predetermined array pattern; and a motion control unit that controls motion of a first moving body including movement in a real space based on the position information.

(2) The information processing apparatus according to (1), further including: a position correction unit that corrects the position information acquired from the sensor based on an attachment position of the sensor on the first moving body, in which the motion control unit controls the motion of the first moving body based on the corrected position information.

(3) The information processing apparatus according to (2), in which the position correction unit corrects the position information acquired from the sensor to position information that is specified from the attachment position and that corresponds to a substantial center of the first moving body, and the motion control unit controls the motion of the first moving body based on the corrected position information.

(4) The information processing apparatus according to (3), in which the sensor is attached to the first moving body apart from the substantial center of the first moving body in a horizontal direction.

(5) The information processing apparatus according to (4), in which the sensor is attached to a front part of the first moving body in the horizontal direction.

(6) The information processing apparatus according to any one of (1) to (5), in which in a case where there is an abnormality in the acquisition of the position information, the motion control unit controls the first moving body such that the first moving body automatically moves to a predetermined position.

(7) The information processing apparatus according to (6), in which in the case where there is an abnormality in the acquisition of the position information, the motion control unit controls the first moving body such that the first moving body moves back.

(8) The information processing apparatus according to (6), in which in the case where there is an abnormality in the acquisition of the position information, the motion control unit controls the first moving body such that the first moving body automatically moves until the position information is acquired.

(9) The information processing apparatus according to (6), in which the motion control unit controls a movement direction of the first moving body based on a movement direction of the first moving body just before occurrence of the abnormality in the acquisition of the position information.

(10) The information processing apparatus according to any one of (1) to (9), in which the predetermined array pattern includes: a first array pattern including a plurality of different patterns defining at least position information regarding the real space; and a second array pattern defining control information regarding motion of a moving body, and the motion control unit controls the motion of the first moving body based on the position information acquired based on reading of the first array pattern by the sensor and the control information acquired based on reading of the second array pattern by the sensor.

(11) The information processing apparatus according to (10), in which the control information is information for controlling at least one of a movement speed, a motion pattern, and a rotation motion of the first moving body.

(12) The information processing apparatus according to any one of (1) to (11), further including: an external force detection unit that detects external force to the first moving body, in which the motion control unit controls the motion of the first moving body further based on a detection result of the external force.

(13) The information processing apparatus according to any one of (1) to (12), further including: a communication unit that communicates with a second moving body, in which the motion control unit controls a positional relationship between the first moving body and the second moving body based on the communication by the communication unit.

(14) The information processing apparatus according to (13), in which the predetermined array pattern includes a third array pattern defining cooperative control of the first moving body and the second moving body, and the motion control unit controls the positional relationship between the first moving body and the second moving body based on information acquired based on reading of the third array pattern by the sensor.

(15) The information processing apparatus according to any one of (1) to (14), in which the predetermined array pattern includes a fourth array pattern regarding motion of an object different from the first moving body, and the motion control unit is electrically connected to the first moving body and is configured to control the motion of the object attached to the first moving body based on information acquired based on reading of the fourth array pattern by the sensor.

(16) An information processing method including: acquiring position information from a sensor configured to read a predetermined array pattern; and using a processor to control motion of a first moving body including movement in a real space based on the position information.

(17) An information medium including: a first array pattern including a plurality of different patterns defining position information regarding a real space, the first array pattern having a first area; and a second array pattern defining control information regarding motion of a moving body, the second array pattern having a second area smaller than the first area.

(18) The information medium according to (17), in which the second array pattern defines a combination of the plurality of different patterns of the first array pattern.

(19) The information medium according to (17) or (18), in which the control information includes information for controlling at least one of a movement speed, a motion pattern, and a rotation motion of the moving body.

(20) The information medium according to any one of (17) to (19), in which the information medium includes: a first information medium; and a second information medium independent from the first information medium and having an area smaller than the first information medium, the first array pattern is provided on the first information medium, and the second array pattern is provided on the second information medium.

REFERENCE SIGNS LIST

10 Information processing apparatus
20 Trolley
22 Cassette
24 Ball trolley
30, 90 Mat
40 Toy
100, 200 Control unit
102 Information acquisition unit
104 Mat information specification unit
106 Motion control unit
108 Output control unit
110 External force detection unit
112 Position information correction unit
120, 220 Communication unit
122 Operation unit
124, 224 Display unit
126, 226 Sound output unit
128 Cassette connection unit
130 Storage unit
222 Input unit
228 Sensor unit
230 Near field wireless communication unit
232 Drive unit
234 Servo motor

The invention claimed is:

1. An information processing apparatus comprising:
an information acquisition unit that acquires position information from a sensor configured to read a predetermined array pattern presented in one of a plurality of physical media, each medium having a respective one of a plurality of types, each type being useful for a respective game application; and
a motion control unit that controls motion, of a first movable body having the sensor, according to a process of the game application, including movement in relation to the physical medium based on the position information; wherein
the position information includes a start position that after occupied by the movable body causes the type of the medium to be indicated to the information acquisition unit; wherein
the type of medium indicated to the information acquisition unit differs depending on an angle at which the movable body occupies the start position.

2. The information processing apparatus according to claim 1, wherein in a case where there is an abnormality in the acquisition of the position information, the motion control unit controls the first movable body such that the first movable body automatically moves to a predetermined position.

3. The information processing apparatus according to claim 2, wherein in the case where there is an abnormality in the acquisition of the position information, the motion control unit controls the first movable body such that the first movable body moves back.

4. The information processing apparatus according to claim 2, wherein in the case where there is an abnormality in the acquisition of the position information, the motion control unit controls the first movable body such that the first movable body automatically moves until the position information is acquired.

5. The information processing apparatus according to claim 2, wherein the motion control unit controls a movement direction of the first movable body based on a movement direction of the first movable body just before occurrence of the abnormality in the acquisition of the position information.

6. The information processing apparatus according to claim 1, further comprising:
an external force detection unit that detects external force to the first movable body,
wherein the motion control unit controls the motion of the first movable body further based on a detection result of the external force.

7. The information processing apparatus according to claim 1, further comprising:
a communication unit that communicates with a second movable body,
wherein the motion control unit controls a positional relationship between the first movable body and the second movable body based on the communication by the communication unit.

8. The information processing apparatus according to claim 7, wherein
the predetermined array pattern includes a third array pattern defining cooperative control of the first movable body and the second movable body, and
the motion control unit controls the positional relationship between the first movable body and the second movable body based on information acquired based on reading of the third array pattern by the sensor.

9. The information processing apparatus according to claim 1, wherein
the predetermined array pattern includes a fourth array pattern regarding motion of an object different from the first movable body, and
the motion control unit is electrically connected to the first moving body and is configured to control the motion of the object attached to the first movable body based on information acquired based on reading of the fourth array pattern by the sensor.

10. An information processing method comprising:
acquiring position information from a sensor configured to read a predetermined array pattern presented in one of a plurality of physical media, each medium having a respective one of a plurality of types, each type being useful for a respective game application; and
using a processor to control motion of a first movable body having the sensor, according to a process of the game application, including movement in relation to the physical medium based on the position information; wherein
the position information includes a start position that after occupied by the movable body causes the type of the medium to be indicated to the information acquisition unit; wherein
the type of medium indicated to the information acquisition unit differs depending on an angle at which the movable body occupies the start position.

11. An information medium comprising:
a first array pattern including a plurality of different patterns defining position information regarding a real space, the first array pattern having a first area and being presented in one of a plurality of physical media, each medium having a respective one of a plurality of types, each type being useful for a respective game application; and a second array pattern presented in the one physical medium, the second array pattern defining control information regarding motion of a movable body according to a process of the game application, including movement in relation to the one physical medium based on the position information, the second array pattern having a second area smaller than the first area; wherein the position information includes a start position that after occupied by the movable body causes the type of the medium to be indicated to the information acquisition unit; wherein the type of medium indicated to the information acquisition unit differs depending on an angle at which the movable body occupies the start position.

12. The information medium according to claim 11, wherein the second array pattern defines a combination of the plurality of different patterns of the first array pattern.

13. The information medium according to claim 11, wherein the control information includes information for controlling at least one of a movement speed, a motion pattern, and a rotation motion of the movable body.

14. The information medium according to claim 11, wherein the information medium includes:

a first information medium; and a second information medium independent from the first information medium and having an area smaller than the first information medium, the first array pattern is provided on the first information medium, and the second array pattern is provided on the second information medium.

\* \* \* \* \*